United States Patent
Steils et al.

(10) Patent No.: US 12,295,381 B2
(45) Date of Patent: May 13, 2025

(54) PROCESSES FOR THE MANUFACTURE OF PERCHLORATE DEPLETED MILK

(71) Applicant: HIPP & CO, Sachseln (CH)

(72) Inventors: Jan-Michael Steils, Wolnzach (DE); Matthias Parusel, Bremen (DE)

(73) Assignee: HIPP & CO, Sachseln (CH)

( * ) Notice: Subject to any disclaimer, the term of this patent is extended or adjusted under 35 U.S.C. 154(b) by 489 days.

(21) Appl. No.: 17/641,891

(22) PCT Filed: Sep. 12, 2020

(86) PCT No.: PCT/EP2020/075577
§ 371 (c)(1),
(2) Date: Mar. 10, 2022

(87) PCT Pub. No.: WO2021/048427
PCT Pub. Date: Mar. 18, 2021

(65) Prior Publication Data
US 2023/0000097 A1    Jan. 5, 2023

(30) Foreign Application Priority Data

Sep. 12, 2019 (EP) .................................... 19196925
Sep. 12, 2019 (EP) .................................... 19196926

(51) Int. Cl.
| A23C 9/142 | (2006.01) |
| A23C 7/04 | (2006.01) |
| A23C 9/16 | (2006.01) |
| A23L 33/00 | (2016.01) |

(52) U.S. Cl.
CPC .............. *A23C 9/1422* (2013.01); *A23C 7/04* (2013.01); *A23C 9/16* (2013.01); *A23L 33/40* (2016.08)

(58) Field of Classification Search
CPC ........... A23C 9/1422; A23C 7/04; A23C 9/16; A23L 33/40
USPC ......................................................... 426/491
See application file for complete search history.

(56) References Cited

U.S. PATENT DOCUMENTS

2014/0302219 A1* 10/2014 Tikanmaki ........... A23C 9/1425
426/491

FOREIGN PATENT DOCUMENTS

| CN | 101589739 B | 5/2011 |
| CN | 106324144 A | 1/2017 |
| WO | 2000/030461 A1 | 6/2000 |
| WO | 2013/068653 A2 | 5/2013 |

OTHER PUBLICATIONS

International Search Report for International Application No. PCT/EP2020/075577, mailed Jan. 19, 2021, (3 pages).

(Continued)

*Primary Examiner* — Brent T O'Hern
(74) *Attorney, Agent, or Firm* — Kagan Binder, PLLC

(57) ABSTRACT

The invention relates to a process for the manufacture of a perchlorate depleted milk based on nanofiltration of dairy raw materials. The invention further relates to methods for the preparation of an infant formula base using said perchlorate depleted milk. The invention also envisages a perchlorate depleted retentate fraction used to produce a perchlorate depleted milk and infant formula, an assortment comprising said formula and a system for the manufacture of an infant formula comprising a nanofiltration module.

19 Claims, 11 Drawing Sheets

(56) References Cited

OTHER PUBLICATIONS

International Preliminary Report on Patentability for International Application No. PCT/EP2020/075577, mailed Feb. 22, 2022, (26 pages).
Han et al., "Removal of Perchlorate Using Reverse Osmosis and Nanofiltration Membranes," Environmental Engineering Research, vol. 17, No. 4, pp. 185-190, 2012, (6 pages).
E-Space English Abstract for CN 101589739 B.
Determination of the lactose and galactose content of milk and dairy products, AmtL Collection § 64 LFGB, DIN 10344, 2016, 16 pages (8 pages of Official Copy & 8 pages of English Translation).
Investigation of foodstuffs—Determination of the nitrogen content in milk and milk products—Part 1: Kjeldahl procedure and calculation of the crude protein content, DIN EN ISO 8968-1, 2016, 42 pages (21 pages of Official Copy & 21 pages of English Translation).
Water quality—Determination of dissolved $Li$, $Na$, $NH_4$, $K$, $Mn^2$, $Ca^2$, $Mg^2$, $Sr^2$ and $Ba^2$ using ion chromatography—Method for water and waste water, European Standard EN ISO 14911, 1999, 22 pages of English Version.
Arcella et al., Dietary exposure assessment to perchlorate in the European population, EFSA Journal vol. 15(10), 2017, 24 pages.
Brinkmann et al., Best Available Techniques (BAT) Reference Document for the Production of Chlor-alkali, European Commission, 2014, 344 pages.
Brandhuber et al., A review of perchlorate occurrence in public drinking water systems, Journal (American Water Works Association), vol. 101, No. 11 (Nov. 2009), pp. 63-73.
Commission Regulation (EC) No. 889/2008, Official Journal of the European Union, Sep. 5, 2008, 84 pages.
Commission Regulation (EC) No. 1235/2008, Official Journal of the European Union, Dec. 8, 2008, 28 pages.
Commission Directive 2006/141/EC, Official Journal of the European Union, Dec. 22, 2006, 33 pages.
Council Regulation (EC) No. 834/2007, Official Journal of the European Union, Jun. 28, 2007, 23 pages.
Han et al., Removal of Perchlorate Using Reverse Osmosis and Nanofiltration Membranes, Environ. Eng. Res. vol. 17 (4), Dec. 2012, pp. 185-190.
Kirk et al., Perchlorate in Milk, Environ. Sci. Technol. vol. 37, 2003, pp. 4979-4981.
Raymond D. Letterman, Water Quality and Treatment, A Handbook of Community Water Supplies, Fifth Edition, 1999, 1163 pages.
Bo Lönnerdal, Biochemistry and physiological function of human milk proteins, The American Journal of Clinical Nutrition 42: Dec. 1985, pp. 1299-1317.
Anastassiades et al., Quick Method for the Analysis of numerous Highly Polar Pesticides in Foods of Plant Origin via LC-MS/MS involving Simultaneous Extraction with Methanol (QuPPe-Method), Version 8.1, EU Reference Laboratory for pesticides requiring Single Residue Methods (EURL-SRM), Mar. 2015, 60 pages.
Regulation (EU) 2018/848 Of the European Parliament and of the Council, Official Journal of the European Union, May 30, 2018, 92 pages.
Roy et al., Effect of temperature on ion transport in nanofiltration membranes: Diffusion, convection and electromigration, Desalination 420 (2017) pp. 241-257.
Srinivasan et al., Perchlorate: Health Effects and Technologies for Its Removal from Water Resources, Int. J. Environ. Res. Public Health, vol. 6, 2009, pp. 1418-1442.
Vogt et al., Chlorine Oxides and Chlorine Oxygen Acids, 2005, 47 pages.
German Food, Commodities and Feed Code, German Food and Feed Code—LFGB, 2005, 72 pages.

* cited by examiner

Figure 5
(A)
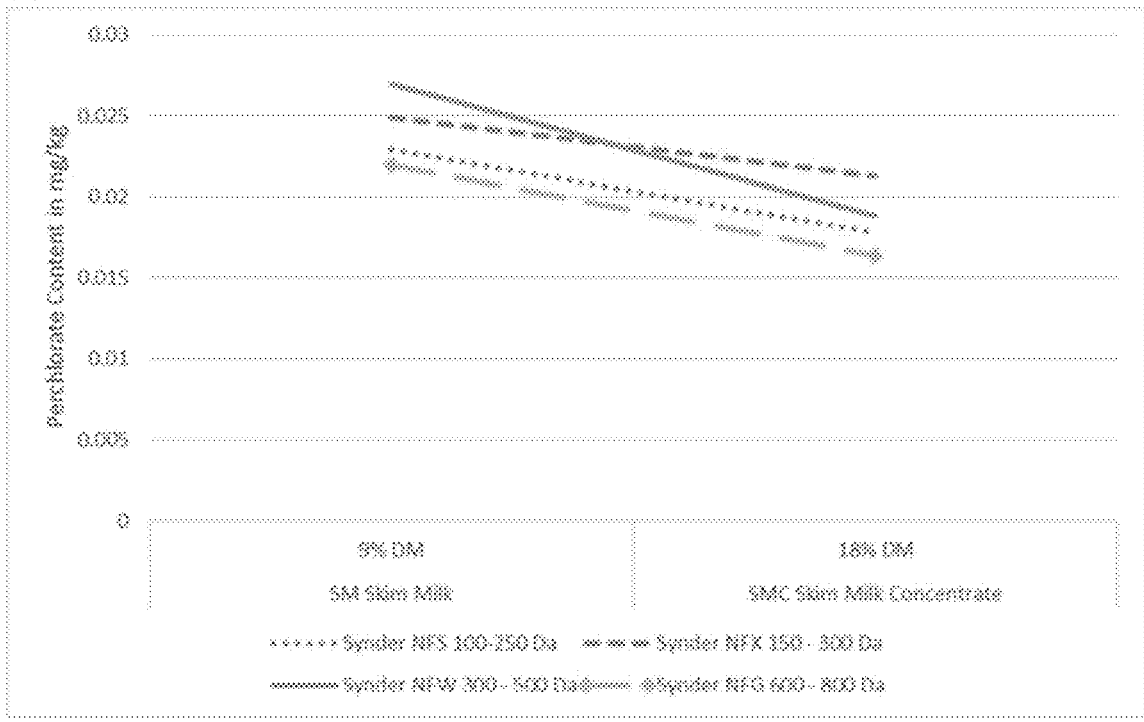
(B)
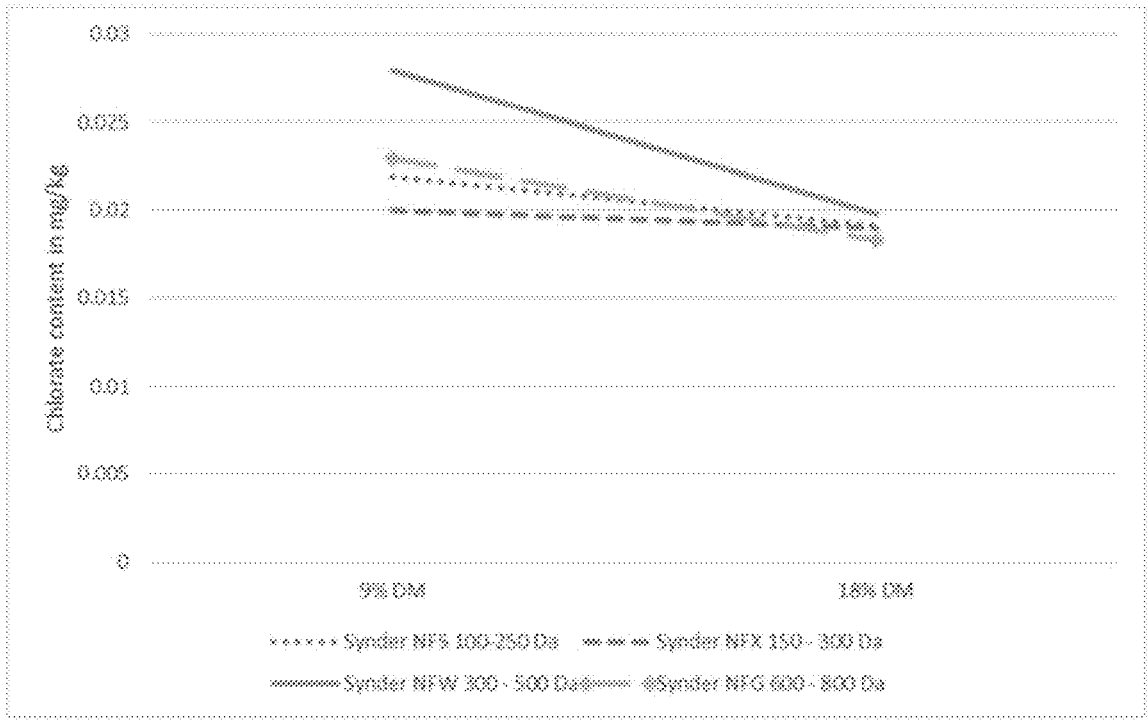

Figure 5 continued
(C)
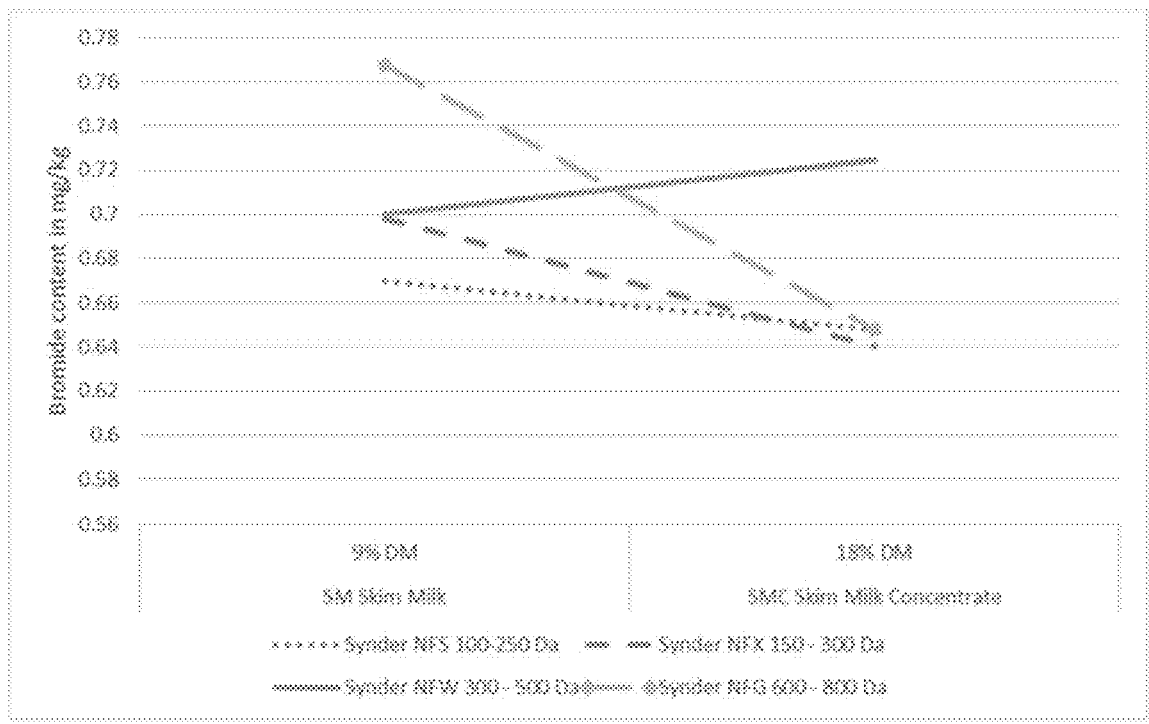
(D)
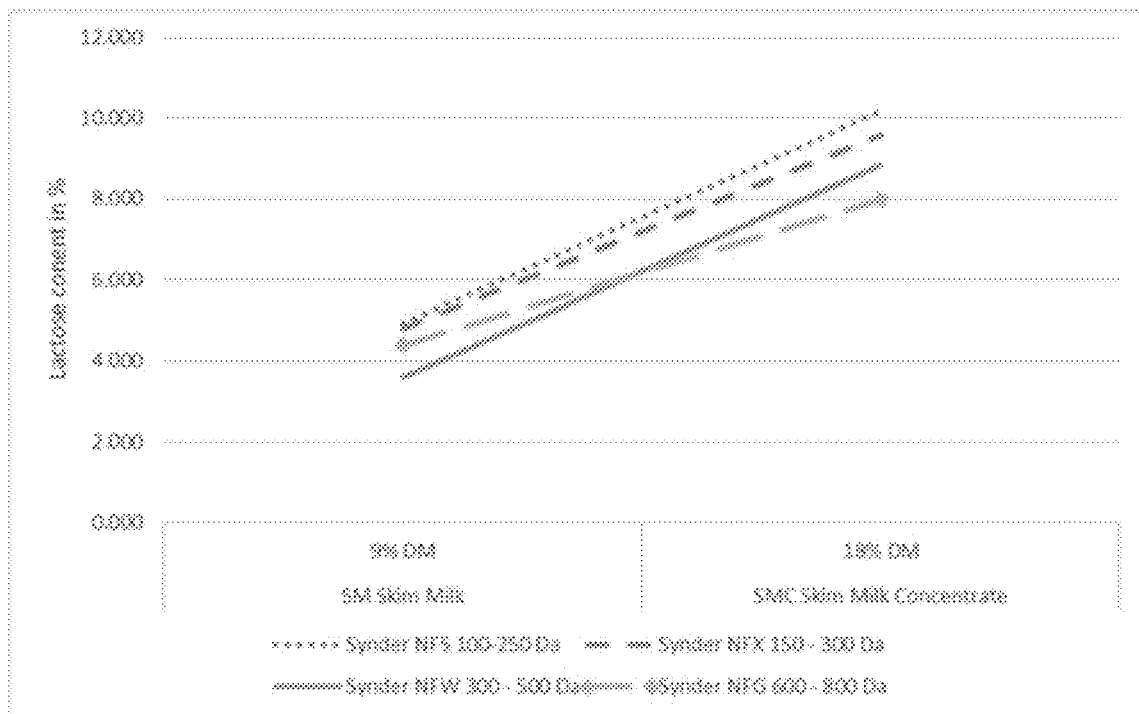

Figure 6
(A)
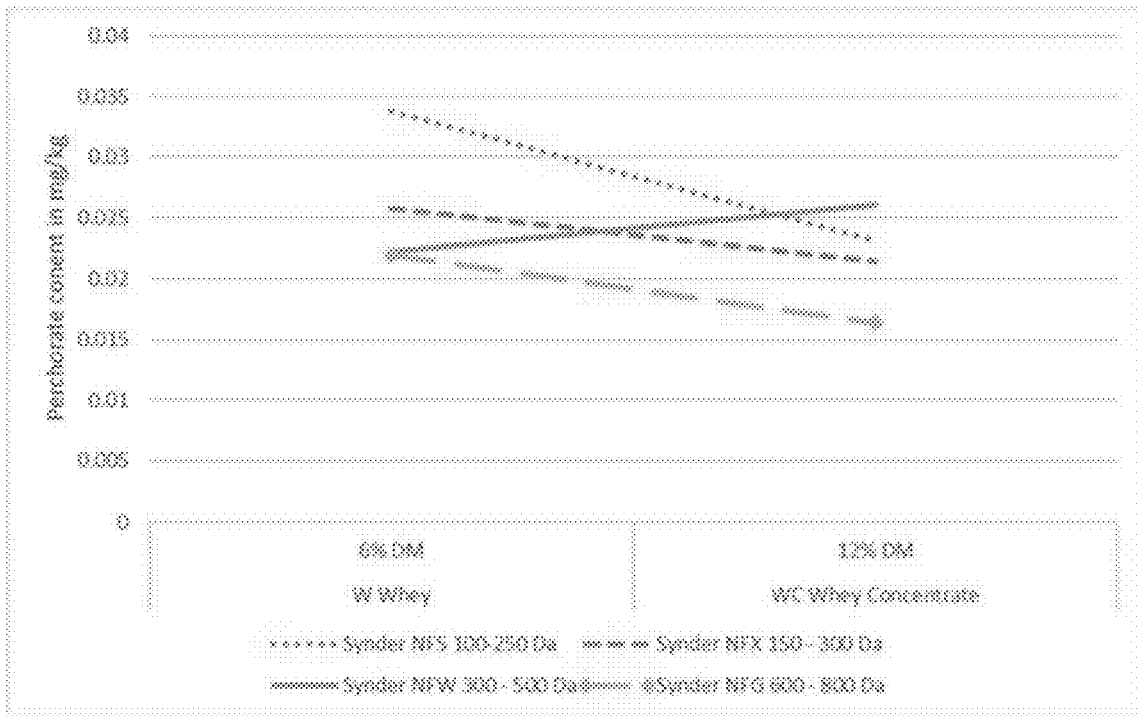
(B)
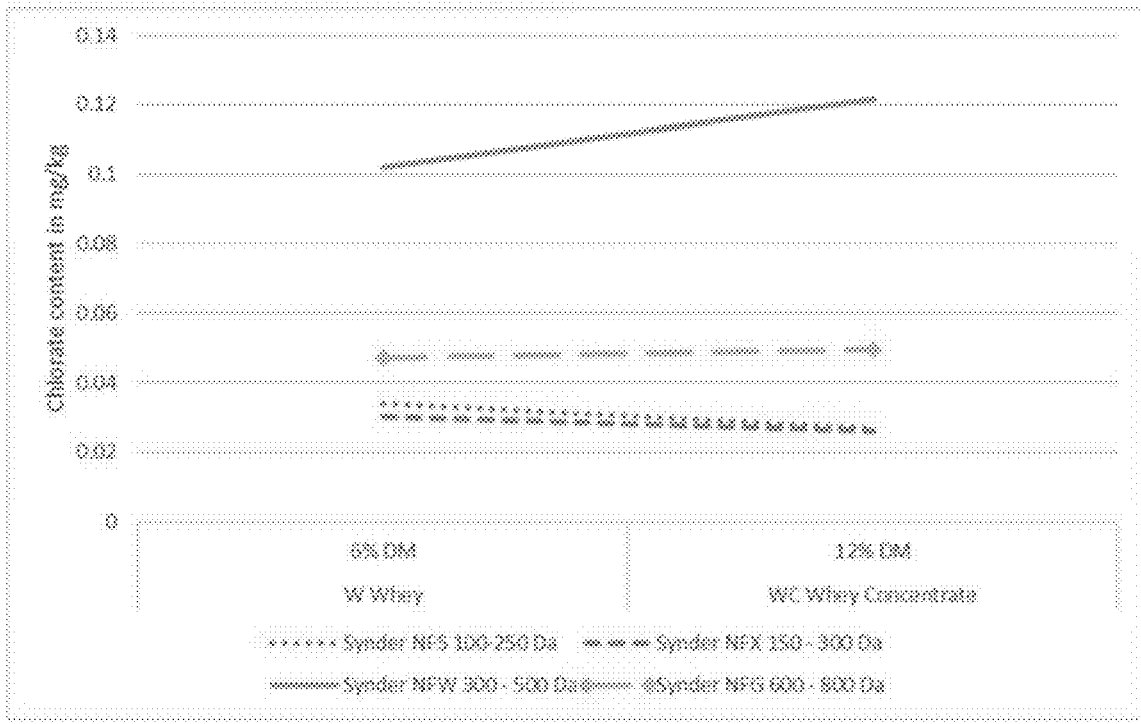

Figure 6 continued
(C)
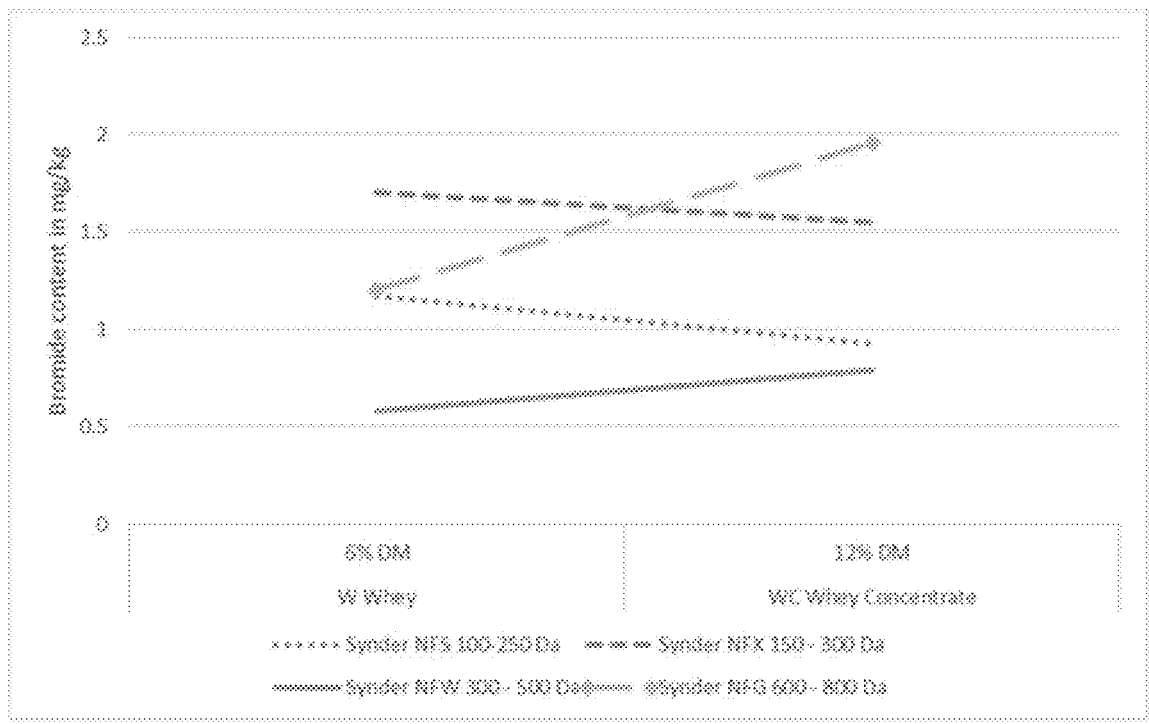
(D)
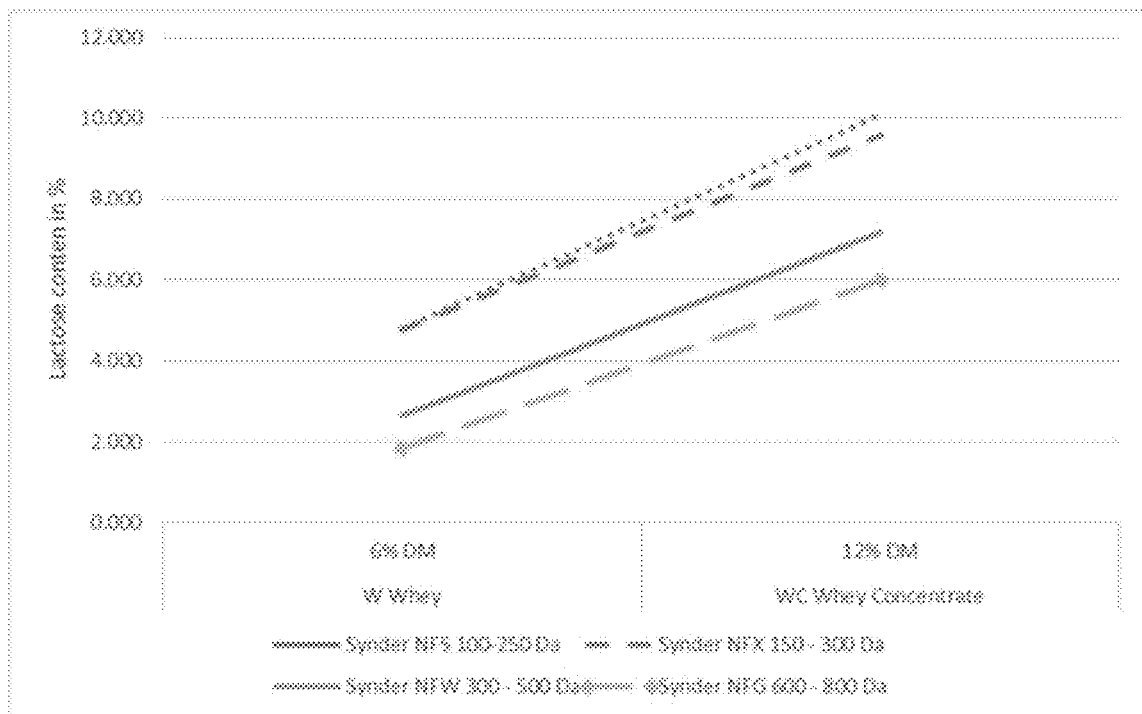

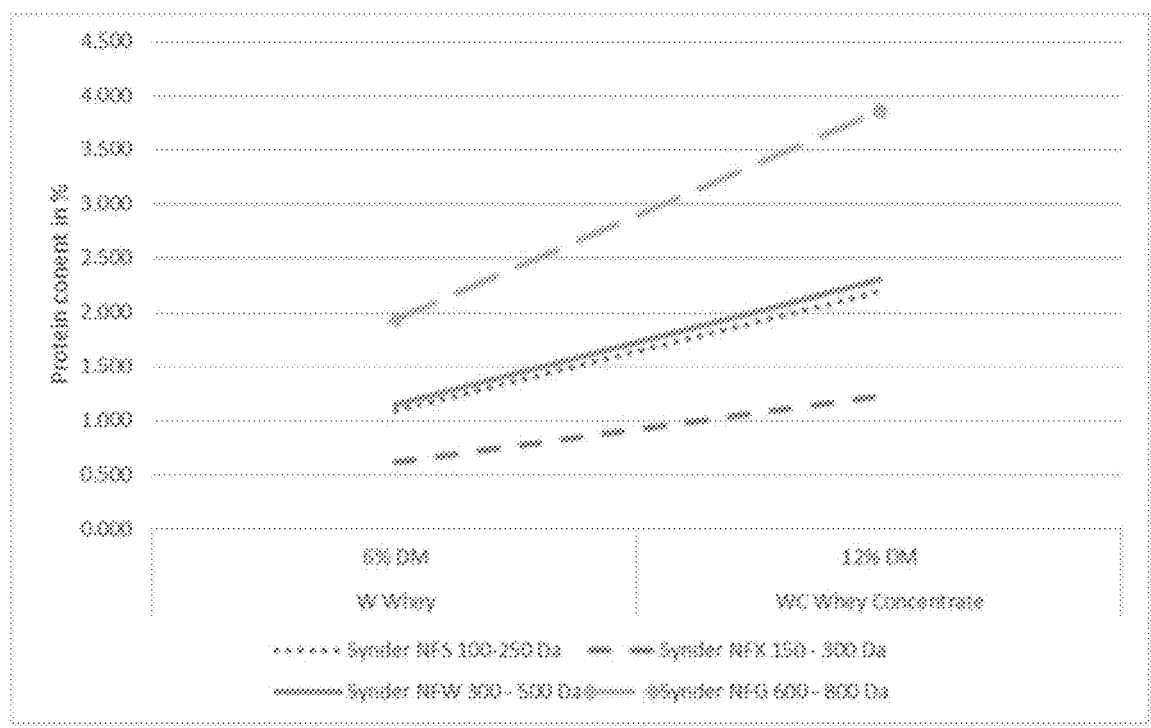

PROCESSES FOR THE MANUFACTURE OF PERCHLORATE DEPLETED MILK

CROSS-REFERENCE TO RELATED APPLICATIONS

This application claims priority to International Application No. PCT/EP2020/075577, filed Sep. 12, 2020 and titled "PROCESSES FOR THE MANUFACTURE OF PERCHLORATE DEPLETED MILK," which in turn claims priority from a European Patent Application having Ser. No. 19/196,926.0, filed Sep. 12, 2019, and European Patent Application having Ser. No. 19/196,925.2, filed Sep. 12, 2019, all of which are incorporated herein by reference in their entireties.

FIELD OF THE INVENTION

The invention relates to a process for the manufacture of a perchlorate depleted milk comprising the step of (a) subjecting perchlorate containing milk and/or milk assumed to contain perchlorate to nanofiltration step to obtain a perchlorate depleted retentate fraction and a perchlorate containing permeate fraction of said milk. The invention further relates to a process for the manufacture of a milk-based infant formula comprising said process for the manufacture of perchlorate depleted milk. Also provided herein is a process for the manufacture of a milk-based infant formula comprising perchlorate depleted milk. The present invention further relates to a process for the manufacture of an infant formula base comprising the step of composing an infant formula base from the perchlorate depleted retentate fraction obtained by the processes of the invention. The invention also relates to the use of the produced perchlorate depleted retentate fraction for the manufacture of an infant formula base or an infant formula. Also provided is a perchlorate depleted retentate fraction produced according to the processes of the invention and an infant formula base or an infant formula comprising said perchlorate depleted retentate fraction. The invention further relates to the use of a nanofiltration membrane for the manufacture of a perchlorate depleted retentate fraction and a system for the manufacture of an infant formula comprising a nanofiltration module. Further provided is an assortment consisting of at least two infant formulas of the invention.

BACKGROUND OF THE INVENTION

Perchlorate ($ClO_4^-$), the anion of a salt of the perchloric acid ($HClO_4$), is a contaminant which has been found in drinking water, groundwater and surface water. It is primarily associated with release from defense and military operations, fireworks, certain fertilizers, plant food and by using chlorine-containing substances for cleaning or disinfecting. Perchlorate can also occur naturally in nitrogen-rich mineral deposits. Although it is a strong oxidant, perchlorate is very persistent in the environment and salts of perchlorate are extremely soluble. According to the current state of knowledge, the first entry pathway is likely to be the contact of food with water, which has previously been treated with chlorine-containing biocidal products for disinfection purposes, while the second entry pathway is via feed and drinking water of the animals. There are health concerns associated to perchlorate, since at high concentrations it was demonstrated to affect the thyroid gland by inhibiting the uptake of iodine by the sodium iodide symporter (NIS). Iodine deficiency can lead to developmental delays in fetuses and infants. In 2005, the Environmental Protection Agency established a dietary reference dose (RfD) for perchlorate at 0.0007 mg/kg body weight/day to account for perchlorate exposure from both food and water. However, the European Food Safety Authority (EFSA) has lately derived an even lower tolerable daily intake (TDI) of 0.0003 mg/kg body weight/day perchlorate based on impaired iodine intake in healthy adults (Arcella et. al. 2017 EFSA Journal, 15(10):5043). Nonetheless, no maximum residue levels in foods have been established up to now, but perchlorate levels in foods should be kept as low as possible and should follow the ALARA (as low as reasonably achievable) principle.

Perchlorate is measured in environmental water samples primarily by ion exchange chromatography. This contaminant can be removed from water, for example by employing anion exchange or membrane filtration. Biological and chemical processes are also effective in removing this species from water (Srinivasan et al. 2009 Int J Environ Res Public Health, 6(4):1418-1442).

In connection with the detection of perchlorate as an inorganic contaminant, numerous studies have reported the presence of $ClO_4^-$ at various concentrations (from <1 to >1.000 µg/L) in groundwater, surface water, and drinking water, tea and soft drinks, milk, saliva, leafy vegetables, tobacco plants and tobacco products, and wastewater effluent. These reports of $ClO_4^-$ in water and food have given rise to serious concerns among regulatory agencies and among the general public. In particular, water contamination by $ClO_4^-$ has become a major environmental and health concern in recent years, as evidence has emerged that the toxicological effects of $ClO_4^-$ are associated with abnormal endocrine function.

Detectable levels of perchlorate have been observed in both drinking water and groundwater in US and in Europe (for example France) according to the Environmental Protection Agency (EPA), (Brandhuber et al. 2009 J American Water Works Association, 101 (11): 63-73.). Perchlorate was also found in cow's milk in France which may have entered the cows through feeding on crops exposed to water containing perchlorates. Drinking water for cattle is mostly of local origin, which means that the perchlorate content of milk should be closely related with perchlorate dispersed in the local environment. This is of particular concern, given that milk products are largely used to produce formulas intended to feed infants in need of a substitute of breast milk. Further, perchlorate was detected in supermarket milk samples in the UK, and a sample cleanup procedure involving protein removal by ethanol and sequential passage though activated alumina and C-18 silica has been discussed as possible way of decontamination (Kirk et al. 2003 Environ. Sci. Technol., 37 (21), pp 4979-4981). Regarding perchlorate content in milk products, CN106324144 discloses a method for detecting chlorate, perchlorate and bromate from milk powder and infant formula milk powder by hydrophilic interaction chromatography-tandem mass spectrometry.

However, up to date there are no methods provided for an effective, energy saving and economical depletion of endocrine disruptors like perchlorate from milk. One current strategy is for example to subject the entire milk constituents to fractionation, which can then be re-assembled by selectively choosing the nutritional elements and leaving out the contaminants. Such application comprises the production of a protein fraction by, for example, ultrafiltration. This filtrate fraction can then be purified by diafiltration, but then a second technical step is required to purify the lactose from perchlorate. However, the fractionation processes and diafiltration are cost and energy intensive. Equally conceivable would be an ion exchanger or possibly electrodialysis, but the drawback of these processes is their influence on the pH value which must be therefore buffered in a subsequent step. However, due to the new EU legislation "Industrial Emissions Directive 2015/75/EU" and its corresponding "Best Available Techniques (BAT) Reference Document for the production of chlor-Alkali" the necessary purity of the buffer solutions normally used in this process is no longer achieved. This technology conversion has inevitably led to an increase of chlorate and perchlorate in food alkalis. Hence, by the usage of alkaline solutions problems are caused.

Further, described in the art are methods for preparing an infant formula, wherein permeate from microfiltration is concentrated and demineralized by electrodialysis and mixed with a microfiltration retentate or casein. Also, WO2013/068653 discloses a combination of microfiltration, ultrafiltration and nanofiltration that enables milk to be split into a casein fraction, a whey protein fraction and a lactose fraction. These fractions can be combined in a desired manner and in appropriate proportions to provide an infant formula base in which the amino acid composition is close to that of human milk. However, here nanofiltration is merely applied as follow-up step after micro- and ultrafiltration, and the document does not aim to, nor address, the depletion of dangerous contaminants from milk such as perchlorate.

Han et al. 2012 (Han et al. Environ. Eng. Res. 2012 17(4):185-190) describes the rejection characteristics of perchlorate ($ClO_4^-$) in water when subjected to commercially available reverse osmosis (RO) and nanofiltration (NF) membranes. This study particularly aimed at the decontamination of perchlorate from model water prepared with pure water from commercial laboratory purification systems, either alone or mixed with other salts. The decontamination of milk is however not investigated. CN101589739 discloses methods for removing melamine from dairy products using nanofiltration. However, this document is silent regarding the use of nanofiltration for the depletion of perchlorate from dairy products. Moreover, CN101589739 does not specify the used nanofiltration membrane and is equally silent regarding the production of organic dairy products from organic perchlorate depleted milk.

It therefore remains a need in the art to provide means and methods for achieving an effective and energy saving reduction of perchlorate from milk. The technical problem underlying the present application is thus to comply with these needs. The technical problem is solved by providing the embodiments reflected in the claims, described in the description and illustrated in the examples and figures that follow.

SUMMARY OF THE INVENTION

The present invention is based at least partly on the unexpected finding that nanofiltration is a suitable technique to reliably deplete perchlorate from perchlorate containing milk or milk assumed to be contaminated with perchlorate. This is unexpected, since for example Han et al. 2012 (Han et al. Environ. Eng. Res. 2012 17(4):185-190) described the rejection of perchlorate in water, while the inventors of the present invention surprisingly observed that perchlorate contained in milk permeates nanofiltration membranes, thereby allowing to produce a perchlorate depleted retentate fraction and a perchlorate containing permeate fraction. This perchlorate depleted retentate fraction can then be further used for composing an infant formula base or the production of an infant formula. Accordingly, the present invention provides for an easy applicable, as well as energetically and economically convenient decontamination procedure for the manufacture of milk-based (infant) edibles such as milk based infant formula which are essentially free of perchlorate.

In sum, in a first aspect the present invention refers to a method or process for the manufacture of a perchlorate depleted milk, comprising the steps of (a) subjecting perchlorate containing milk and/or milk assumed to contain perchlorate to a nanofiltration step to obtain a perchlorate depleted retentate fraction and a perchlorate containing permeate fraction of said milk, and (b) optionally supplying a manufacturing process of a milk based infant formula with said perchlorate depleted retentate fraction. In another aspect, the present invention also relates to a process for the manufacture of a perchlorate depleted milk, comprising the steps of (a) subjecting perchlorate containing milk and/or milk assumed to contain perchlorate to a nanofiltration step to obtain a perchlorate depleted retentate fraction and a perchlorate containing permeate fraction of said milk, b) evaluating the perchlorate content in said retentate fraction and/or said permeate fraction, and c) optionally supplying a manufacturing process of a milk based infant formula with said perchlorate depleted retentate fraction. In a further aspect, a process for the manufacture of a perchlorate depleted milk, comprising the steps of (a) subjecting perchlorate containing milk and/or milk assumed to contain perchlorate to a nanofiltration step to obtain a perchlorate depleted retentate fraction and a perchlorate containing permeate fraction of said milk, wherein said nanofiltration is conducted with predetermined process parameters that are suitable to deplete at least 40%, preferably at least 45% of the contained perchlorate, b) optionally evaluating the perchlorate content in said retentate fraction and/or said permeate fraction, and c) optionally supplying a manufacturing process of a milk based infant formula with said perchlorate depleted retentate fraction. Specifically, the perchlorate content is reduced in relation to the dry mass increase by loss of aqueous fluid. That means the process is able to reduce at least 40%, preferably at least 45% of the perchlorate in the perchlorate containing milk when referring to the initial dry mass content. Specifically, when doubling the dry mass of the starting raw material the perchlorate content basically remains unchanged or is even reduced (see Tables 1A-C, Tables 3A-H and FIGS. 4-6).

In this respect, it is envisaged that said perchlorate containing milk contains 2 ppb or more than 2 ppb perchlorate when the dry mass of the milk is between about 5% and about 13%. Preferably, said perchlorate containing milk contains 2 ppb or more than 2 ppb perchlorate when the dry mass of the milk is about 6 or 9%. Preferably, said perchlorate containing milk contains 2 ppb or more than 2 ppb perchlorate when the dry mass of the milk is 9.2%. The perchlorate depleted retentate fraction of step (a) of the processes for the manufacture of a perchlorate depleted milk can optionally be contacted with a perchlorate free solvent and subjected to a further nanofiltration step. It is thus envisaged that said contacting and nanofiltration step is repeated. Preferably, the process of the present invention is for the manufacture of a perchlorate depleted milk, which is for the manufacture of a perchlorate depleted milk containing less than 2 ppb perchlorate when the dry mass of the milk is between about 5% and about 13%. More preferred, the process of the present invention is for the manufacture of a perchlorate depleted milk, which is for the manufacture of a perchlorate depleted milk containing less than 2 ppb perchlorate, less than 2 ppb chlorate and less than 2 ppb bromide when the dry mass of the milk is between about 5% and about 13%

According to the processes for the manufacture of a perchlorate depleted milk of the present invention, it is further envisaged that the perchlorate containing permeate fraction is discarded, i.e. can be used for nonfood applications or the perchlorate containing permeate fraction can be purified for further production steps. The perchlorate depleted retentate fraction is preferably further processed. In some embodiments the processes or methods of the present invention further comprise a demineralization step. It is also envisaged that said perchlorate depleted retentate fraction is diluted. Preferably, the processes for the manufacture of a perchlorate depleted milk of the present invention comprise at least the step of formulating said perchlorate depleted milk into a milk based infant formula.

Accordingly, another aspect of the present invention relates to a process for the manufacture of a milk-based infant formula, comprising the processes for the manufacture of a perchlorate depleted milk of the present invention as described herein above. Also provided by the present invention is a process for the manufacture of a milk-based infant formula comprising perchlorate depleted milk containing less than 2 ppb perchlorate when the dry mass of the milk is between about 5% and about 13%, comprising the processes for the manufacture of a perchlorate depleted milk of the present invention. Specifically, the present invention provides a process for the manufacture of a milk-based infant formula comprising perchlorate depleted milk containing less than 2 ppb perchlorate, less than 2 ppb chlorate and less than 2 ppb bromide when the dry mass of the milk is between about 5% and about 13%, comprising the processes for the manufacture of a perchlorate depleted milk of the present invention. Preferably, said manufacturing process comprises at least the step of formulating said perchlorate depleted milk into a milk-based infant formula. Preferably, said milk-based infant formula is spray dried or processed to powder. Further, said milk-based infant formula can be produced as a liquid infant formula.

In this respect it is further envisaged that the nanofiltration step to obtain a perchlorate depleted retentate fraction according to the processes for the manufacture of a perchlorate depleted milk, the process for the manufacture of a perchlorate depleted milk-based infant formula or the process for the manufacture of a perchlorate depleted milk-based infant formula base of the present invention make use of a nanofiltration membrane. Preferably, the nanofiltration step to obtain a perchlorate depleted retentate fraction according to the processes for the manufacture of a perchlorate depleted milk, the processes for the manufacture of a perchlorate depleted milk-based infant formula or the processes for the manufacture of a perchlorate depleted milk-based infant formula base of the present invention makes use of a nanofiltration membrane having a molecular weight cut-off about or below 500 Daltons (Da), more preferred between 100 and 500 Daltons. It is further envisaged that the processes for the manufacture of a perchlorate depleted milk of the present invention, the process for the manufacture of a perchlorate depleted milk-based infant formula or the process for the manufacture of a perchlorate depleted milk-based infant formula base make use of a nanofiltration membrane characterized by lactose and protein rejection. It is further envisaged that the processes for the manufacture of a perchlorate depleted milk, the process for the manufacture of a perchlorate depleted milk-based infant formula or the process for the manufacture of a perchlorate depleted milk-based infant formula base of the present invention make use of a nanofiltration membrane characterized by magnesium rejection by at least 80% and/or calcium rejection by at least 90%, preferably by a nanofiltration step as defined herein. It is further envisaged that the processes for the manufacture of a perchlorate depleted milk of the present invention make use of a nanofiltration membrane characterized in that it depletes at least 40% of the contained chlorate and/or at least 30% of the contained bromide, preferably by a nanofiltration step as defined herein. That means the process is able to reduce at least 40% of the contained chlorate and/or at least 30% of the contained bromide in the perchlorate containing milk when referring to the initial dry mass content. In this respect it is envisaged that the perchlorate depleted milk and/or milk assumed contain perchlorate contains 2 ppb or more than 2 ppb chlorate and/or 2 ppb or more than 2 ppb bromide when the dry mass of the milk is between about 5% and about 13%. Hence, the processes for the manufacture of a perchlorate depleted milk of the present invention are preferably for the manufacture of a perchlorate depleted milk containing less than 2 ppb perchlorate when the dry mass of the milk is between about 5% and about 13%. It if further envisaged that the processes for the manufacture of a perchlorate depleted milk of the present invention are for the manufacture of a perchlorate depleted milk containing less than 2 ppb perchlorate, less than 2 ppb chlorate and/or less than 2 ppb bromide when the dry mass of the milk is between about 5% and about 13%.

Preferably, the nanofiltration membrane used in the processes for the manufacture of a perchlorate depleted milk of the present is made out of polyamide or is polyamide-coated. It is envisaged in this respect that said nanofiltration membrane is characterized in that it depletes at least 40%, preferably at least 45% of the contained perchlorate by a nanofiltration step as specified herein. That means the process is able to reduce at least 40%, preferably at least 45% of the perchlorate in the perchlorate containing milk when referring to the initial dry mass content.

Specifically, when doubling the dry mass of the starting raw material the perchlorate content basically remains unchanged. For example, 50.000 kg of skim milk with a dry mass of 9.2% and a perchlorate content of 3 ppb can be operated by a nanofiltration unit equipped with 30 nanofiltration membranes/modules stacked in parallel as described elsewhere herein, thereby providing 25.842 kg skim milk concentrate with a dry mass of 19.35% and a perchlorate content of 3 ppb. That means, when adjusting the dry mass of the obtained skim milk concentrate to the dry mass content of the perchlorate containing milk before nanofiltration in order to assess perchlorate reduction, the perchlorate content corresponds to only 1.4 ppb, i.e. has been reduced by more than 50% (see Example 1 and Table 1C). Similarly, 100 kg of perchlorate containing whey with a dry mass of about 6% and a perchlorate content of 22 to 34 ppb was subjected to nanofiltration using a nanofiltration unit equipped with a pair of each nanofiltration membrane type stacked in parallel as described elsewhere herein, which led to the production of 50 kg whey concentrate with a dry mass of 12% and a perchlorate content of 16 to 26 ppb. That means, when adjusting the dry mass of the obtained whey concentrate to the dry mass content of the perchlorate containing whey before nanofiltration in order to assess perchlorate reduction, the perchlorate content has been reduced by up to 66% by a nanofiltration step as defined herein (see Example 2 and Table 3E).

In the context of the present invention, the perchlorate containing milk and/or milk assumed to contain perchlorate is preferably organic milk. It is further preferred that said perchlorate containing milk and/or milk assumed to contain perchlorate is skim milk or whey. Most preferred, the perchlorate containing milk and/or milk assumed to contain perchlorate is organic skim milk or organic whey.

Another aspect of the invention provides for a process for the manufacture of an infant formula base comprising the step of composing said infant formula base from the perchlorate depleted retentate fraction obtained by the processes and methods of the present invention. Preferably, said infant formula base is dried into a powder. More preferably, said infant formula base is spray dried or processed to powder.

It is envisaged that the infant formula base is formulated to an infant formula having an energy content of about 60 to 80 kcal/100 ml as consumed, preferably of about 62 to 75 kcal/100 ml as consumed.

According to another aspect, the present invention relates to the use of the perchlorate depleted retentate fraction as produced according to the processes of the present invention for the manufacture of an infant formula base. In another aspect, the present invention relates to the use of the perchlorate depleted retentate fraction as produced according to the processes of the present invention for the manufacture of an infant formula.

A further aspect of the present invention relates to the use of the nanofiltration membrane as defined according to the processes of the invention for the manufacture of a perchlorate depleted retentate fraction. In another aspect the present invention also relates to the use of the nanofiltration membrane as defined according to the processes of the invention for the manufacture of a milk-based infant formula comprising perchlorate depleted milk containing less than 2 ppb perchlorate when the dry mass of the milk is between about 5% and about 13%. It is further envisaged in this respect that the present invention relates to the use of the nanofiltration membrane as defined according to the processes of the invention for the manufacture of a milk-based infant formula comprising perchlorate depleted milk containing less than 2 ppb perchlorate, less than 2 ppb chlorate and less than 2 ppb bromide when the dry mass of the milk is between about 5% and about 13%.

Also provided by the present invention is a perchlorate depleted retentate fraction produced according to the processes or methods of the invention, that is characterized by a perchlorate content of less than 4 ppb perchlorate when the dry mass of the retentate fraction is between about 10% and about 26%. Hence, said perchlorate depleted retentate fraction is produced by a nanofiltration step that makes use of a nanofiltration membrane as defined according to the processes of the invention for the manufacture of a perchlorate depleted retentate fraction. In this respect it is envisaged that said perchlorate depleted retentate fraction produced according to the processes or methods of the invention is characterized by a chlorate content of less than 4 ppb and/or a bromide content of less than 4 ppb when the dry mass of the retentate fraction is between about 10% and about 26%. It is further envisaged that said perchlorate depleted retentate fraction produced according to the processes or methods of the invention is characterized by a sodium content of 300 to 700 mg/kg and/or a potassium content of 1200 to 2400 mg/kg when the dry mass of the retentate fraction is between about 10% and about 26%. Further envisaged is that that said perchlorate depleted retentate fraction produced according to the processes or methods of the invention is characterized by a magnesium content of 80 to 300 mg/kg and/or a calcium content of 350 to 2500 mg/kg when the dry mass of the retentate fraction is between about 10% and about 26%.

Also provided by the present invention is a perchlorate depleted retentate fraction produced according to the processes or methods of the invention, that is characterized by an at least 40%, preferably at least 45% reduced content of perchlorate compared to the content of perchlorate in the perchlorate containing milk and/or milk assumed to contain perchlorate subjected to nanofiltration when the dry mass of the perchlorate depleted retentate fraction is recalculated to the dry mass of the perchlorate containing milk and/or milk assumed to contain perchlorate, i.e. when the dry mass of the perchlorate depleted retentate fraction refers to the initial dry matter of the perchlorate containing milk and/or milk assumed to contain perchlorate. Further envisaged is that that said perchlorate depleted retentate fraction produced according to the processes or methods of the invention is characterized by no change in the content of lactose and protein compared to the content of lactose and protein in the perchlorate containing milk and/or milk assumed to contain perchlorate subjected to nanofiltration when the dry mass of the perchlorate depleted retentate fraction is recalculated to the dry mass of the perchlorate containing milk and/or milk assumed to contain perchlorate. In this respect it is further envisaged that said perchlorate depleted retentate fraction produced according to the processes or methods of the invention is characterized by an at least 40% reduced content of chlorate and/or an at least 30% reduced content of bromide compared to the content of chlorate and bromide in the perchlorate containing milk and/or milk assumed to contain perchlorate subjected to nanofiltration when the dry mass of the perchlorate depleted retentate fraction is recalculated to the dry mass of the perchlorate containing milk and/or milk assumed to contain perchlorate. Further envisaged is that that said perchlorate depleted retentate fraction produced according to the processes or methods of the invention is characterized by an at least 80% maintained content of magnesium and/or an at least 90% maintained content of calcium when compared to the content of magnesium and calcium in the perchlorate containing milk and/or milk assumed to contain perchlorate subjected to nanofiltration when the dry mass of the perchlorate depleted retentate fraction is recalculated to the dry mass of the perchlorate containing milk and/or milk assumed to contain perchlorate. Further envisaged is that that said perchlorate depleted retentate fraction produced according to the processes or methods of the invention is characterized by an up to 40% reduced content of sodium and potassium compared to the content of content of sodium and potassium in the perchlorate containing milk and/or milk assumed to contain perchlorate subjected to nanofiltration when the dry mass of the perchlorate depleted retentate fraction is recalculated to the dry mass of the perchlorate containing milk and/or milk assumed to contain perchlorate. It is envisaged that the perchlorate depleted retentate fraction produced according to the processes or methods of the invention is produced from organic perchlorate containing milk and/or organic milk assumed to contain perchlorate. It is preferred that said perchlorate depleted retentate fraction produced according to the processes or methods of the invention is produced from perchlorate containing skim milk or whey and/or skim milk or whey assumed to contain perchlorate. Most preferred, the perchlorate depleted retentate fraction produced according to the processes or methods of the invention is produced from organic skim milk or whey and/or organic skim milk or whey assumed to contain perchlorate.

Accordingly, another aspect of the present invention refers to a milk-based infant formula base comprising or composed from said perchlorate depleted retentate fraction produced according to the processes or methods of the invention and defined herein above. Another aspect of the present invention refers to a milk-based infant formula comprising said perchlorate depleted retentate fraction produced according to the processes or methods of the invention and defined herein above and/or comprising said milk-based infant formula base produced according to the processes or methods of the invention and defined herein above. The present invention also refers to a milk-based infant formula whose milk-based ingredients consist of the perchlorate depleted retentate fraction produced according to the processes or methods of the invention and defined herein above and/or comprising said milk-based infant formula base produced according to the processes or methods of the invention and defined herein above. Said milk-based infant formula produced according to the processes or methods of the invention and defined herein above is preferably spray dried or processed to powder. Preferably, said milk-based infant formula produced according to the processes or methods of the invention and defined herein above is packed in portions of 11 to 25 g or 300 to 800 g. It is further envisaged that said milk-based infant formula is packed in portions of 90 to 1000 ml. The present invention also provides for an assortment consisting of at least two milk-based infant formulas produced according to the processes or methods of the invention and defined herein above.

In a further aspect, the present invention also refers to a system for the manufacture of an infant formula comprising a nanofiltration module that is suitable for subjecting perchlorate containing milk and/or milk assumed to contain perchlorate to a nanofiltration step to obtain a perchlorate depleted retentate fraction and a perchlorate containing permeate fraction of said milk.

BRIEF DESCRIPTION OF THE DRAWINGS

FIG. 6 shows the content of perchlorate (A), chlorate (B), bromide (C), lactose (D) and protein (E) in whey before and after doubling the dry mass content by nanofiltration.

DETAILED DESCRIPTION OF THE INVENTION

Figure 1:
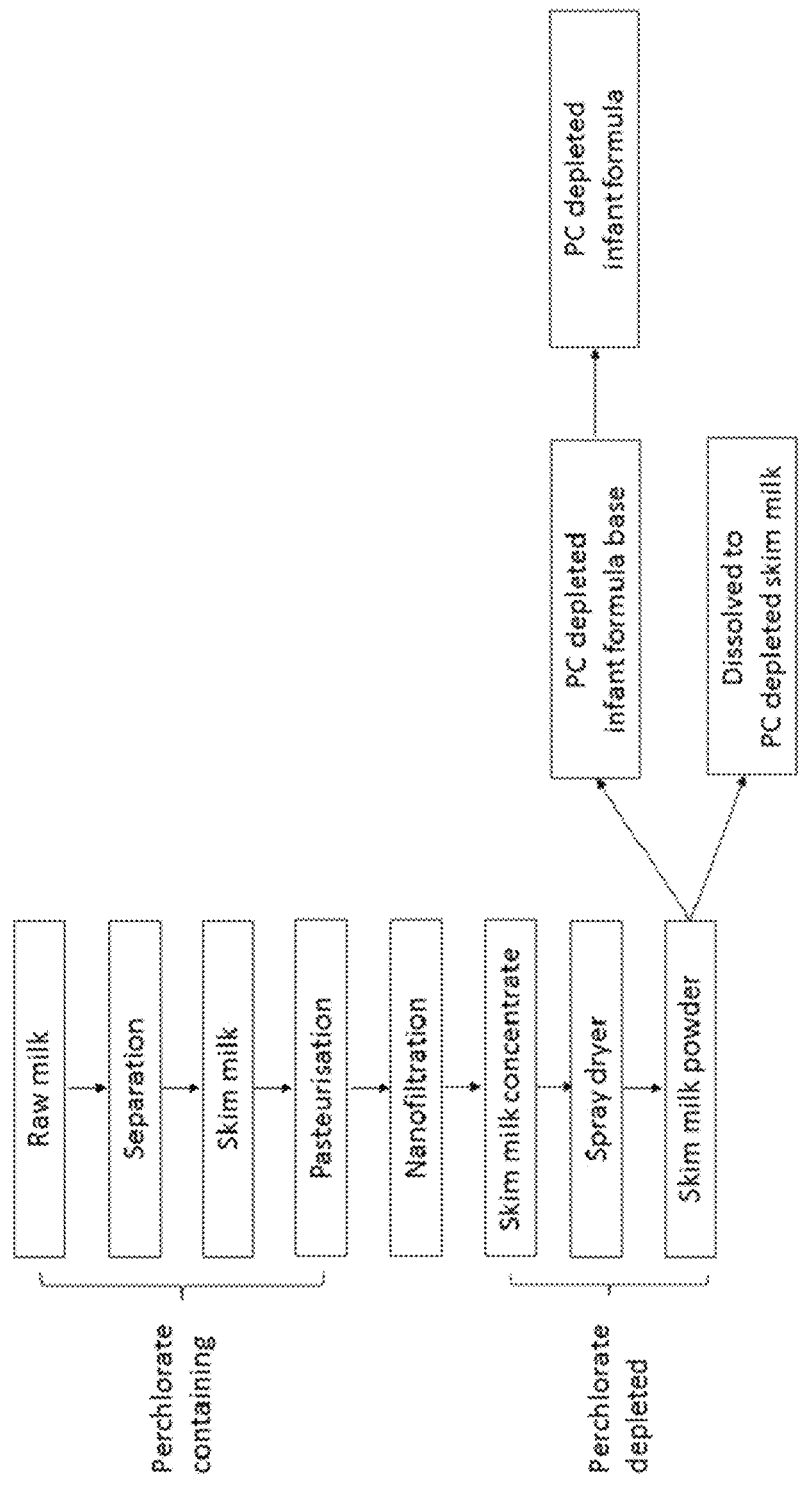
FIG. 1 shows a general schematic overview of the workflow applicable for the manufacture of perchlorate depleted skim milk and a perchlorate depleted infant formula.

The present inventions is inter alia based on the surprising finding that nanofiltration can be used to deplete milk of water-soluble inorganic contaminants such as perchlorate while other nutritionally valuable components like calcium, protein and lactose are largely retained in the nanofiltration retentate. As demonstrated by the Examples of the present invention, the amount of perchlorate in milk could be reliably and efficiently reduced by about 50% or more when applying nanofiltration techniques described herein. Accordingly, the processes for the manufacture of perchlorate deplete milk of the present invention allows for the manufacture of milk-based (infant) formula complying with toxicological limits recommended so far by the WHO and EFSA.

Most commonly used processes for the manufacture of milk based infant formula and other milk-based or milk containing edibles are downdraft evaporators. These devices increase the dry mass to up to about 25%, thereby concentrating the milk raw material. However, this process also results in concentrating contaminants like perchlorate on the dry matter (or dry mass). This is a disadvantage in the current state of the art as well as the fact that processing of milk in such downdraft evaporators is a highly energy-intensive method. In a subsequent step, skimmed milk concentrate with a dry mass of about 22% is mixed with highly demineralized whey raw materials and lactose, as well as other substances. Demineralizing of said whey raw materials to 90% also represents a very complex and cost-intensive process.

Contrary thereto, the inventors devised the use of nanofiltration as a new method to easily obtain/produce perchlorate depleted milk, thereby also removing other minerals. Specifically, the invention describes that perchlorate, but also other unwanted compounds such as chlorate and bromide can be depleted when subjecting perchlorate containing milk that also contains chlorate and/or bromide to nanofiltration as described herein. Using nanofiltration means that, overall, the total salt content of the perchlorate-depleted milk or of the milk-based infant formula can be better adjusted. This is advantageous, for example, for the production of additives which have to be later on included in milk-based infant formulas. Since said required additives can contain higher salt content, this in turn means, for example in the case of whey powders, possibly a further energy and cost savings.

Nanofiltration in general terms is a membrane filtration process used most often with low total dissolved solids water such as surface water and fresh groundwater, with the purpose of softening the filtrate (polyvalent cation removal) and removal of disinfection by-product precursors such as natural organic matter and synthetic organic matter in the filtrate (Roy et al. 2017 Desalination. 420: 241-257; Letterman et al. 1999 Water Quality and Treatment 5th Ed ISBN 0-07-001659-3). In this respect, nanofiltration relies on the use of membranes made of a synthetic, porous material which acts like a shield, preventing particles of a defined size from passing as pressure forces the feed through the membranes. The word "feed" as used herein refers to any substance (water, milk) that is subjected to a membrane processing. Membranes used in this regard are predominantly created from polymer thin films described elsewhere herein.

The behavior of perchlorate in water during nanofiltration processes was analyzed in Han et. al. (Han J, Kong C, Heo J et. al. 2012 17(4):185-190), and it showed high retention of perchlorate when subjecting perchlorate containing water to nanofiltration. Based on the assumption that salts in water can be enriched in the retentate fraction by nanofiltration, the inventors applied nanofiltration to skim milk or whey to receive a skim milk or whey concentrate for the milk based infant formula production and analyzed the out-coming retentate fraction (skim milk or whey concentrate). However, in the course of process described herein the inventors were surprisingly able to increase the dry matter of perchlorate containing skim milk from between about 8% to 10% to between about 16% to 20%, and simultaneously achieving a reduction of perchlorate of at least 45% in the perchlorate containing milk when referring to the initial dry mass content. Similarly, the inventors observed that when doubling the dry matter of perchlorate containing whey from between about 6% to about 12%, a reduction of perchlorate of up to 60% and more could be reached. Specifically, when doubling the dry mass of the starting raw material the perchlorate content remained basically unchanged or could even be reduced (see Tables 1A-C, Tables 3A-H and FIGS. 4-6). Surprisingly, other ions like magnesium and calcium were largely retained by the nanofiltration membrane (see Tables 1 and 3 and FIGS. 4-6). Hence, the inventors observed that contrary to published results with water, perchlorate ($ClO_4^-$) can be efficiently depleted from perchlorate containing milk or milk assumed to contain perchlorate and is not rejected from the nanofiltration membrane, while other smaller ions are surprisingly retained in high percentages. This finding is very surprising, since perchlorate ($ClO_4^-$) has the largest atomic volume per mole (74.7 qcm/mol) and the largest molecular weight (99.449 Dalton) of all ions in the milk (see Table 4).

Further, the use of nanofiltration to deplete milk of contaminant like perchlorate as devised by the inventors has also the advantage of saving energy in the purification process (electricity, heat) which ultimately results in lower $CO_2$ emissions, compared to common methodologies used in the field.

Hence, the methods of the present invention based on subjecting perchlorate containing milk to a nanofiltration step provide for a favorable method for the manufacture of perchlorate depleted milk, which can be used for the manufacture of (infant) formula with reduced perchlorate levels. Simultaneously, the methods of the present invention could eventually address the provision of an effective and energy saving reduction of perchlorate contamination from milk.

In a first aspect, the invention relates to a process for the manufacture of a perchlorate depleted milk, comprising the step of (a) subjecting perchlorate containing milk and/or milk assumed to contain perchlorate to a nanofiltration step to obtain a perchlorate depleted retentate fraction and a perchlorate containing permeate fraction of said milk. Further, the present invention refers to a process for the manufacture of a perchlorate depleted milk, comprising the steps of (a) subjecting perchlorate containing milk and/or milk assumed to contain perchlorate to a nanofiltration step to obtain a perchlorate depleted retentate fraction and a perchlorate containing permeate fraction of said milk, wherein said nanofiltration is conducted with predetermined process parameters that are suitable to deplete at least 40%, preferably at least 45% of the contained perchlorate in the perchlorate containing milk when referring to the initial dry mass content. Specifically, the perchlorate content is reduced in relation to the dry mass increase by loss of aqueous fluid. Particularly, when doubling the dry mass of the starting raw material the perchlorate content remains unchanged or is even reduced (see Tables 1A-C, Tables 3A-H and FIGS. 4-6). Optionally, said method also comprises evaluating the perchlorate content in said retentate and/or permeate fraction as described elsewhere herein. Further, it is envisaged that a manufacturing process of a milk based infant formula with said perchlorate depleted retentate fraction is supplied.

In the context of the present invention, the "dry mass" or "dry matter" or "dry weight" is the component of a substance that remains after deduction of the mass of water contained, i.e. refers to the mass of a substance when completely dried. Therefore, in relation to the total mass of a substance, the dry mass can be defined by the following equation: DM+WM=1=100%, wherein DM is dry mass and WM is water mass. Therefore, a dry mass of 10% of a substance refers to 10% the total weight of the substance. For example, in the context of the present invention, when a milk has a "dry mass" of 10% this refers to a mass fraction in percentage (w/w) of the total mass of the milk.

The term "deplete" or "depleted" as used herein means to reduce in quantity, and/or completely remove a substance from a starting material. According to the present invention, the terms "deplete/depleted" and "reduce/reduced" can be used interchangeably. In the context of the present invention, "perchlorate depleted milk" in particular refers to milk wherein the perchlorate initially contained in said milk or assumed to be initially contained in said milk is significantly reduced in quantity or even completely removed when referring to the initial dry mass content. "Significantly reduced in quantity" with reference to the remaining content of perchlorate in said milk after applying nanofiltration means that the content of perchlorate is decreased by at least 40%, preferably at least 45% when compared to the initial amount of perchlorate in said milk, i.e. is reduced by an amount between 40% and 100% when conducting one nanofiltration step. In particular, it is preferred that the content of perchlorate is reduced by an amount between 55% and 85%, more preferred between 65% and 85%. Accordingly, in the context of the present invention, the perchlorate content of said milk after applying the nanofiltration technique described elsewhere herein can be reduced by at least 40%, more preferred by at least 45%, even more preferred by at least 50%, still more preferred by at least 55%, still more preferred by at least 60%, still more preferred by at least 65%, still more preferred by at least 70%, still more preferred by at least 75%, still more preferred by at least 80%, still more preferred by at least 85%, still more preferred by at least 90%, still more preferred by at least 95%, still more preferred by at least 98%, still more preferred by at least 99%. Most preferred the perchlorate content of said milk after applying nanofiltration is reduced by 100%. In particular, it is envisaged that the content of perchlorate is decreased by at least 40%, preferably by at least 45%. More preferred the content of perchlorate is decreased by at least 50%. Even more preferred the content of perchlorate is decreased by at least 60%. When referring to the fact that perchlorate initially contained in milk or assumed to be initially contained in milk is reduced in quantity by a certain percentage, this means that the content of perchlorate is determined in perchlorate containing milk (before nanofiltration) and after in perchlorate depleted milk subjected to nanofiltration (i.e. after nanofiltration) both having the same, i.e. an identical dry mass, and these values are compared, i.e. the dry mass of the perchlorate depleted retentate fraction is recalculated to the dry mass of the perchlorate containing milk and/or milk assumed to conatin perchlorate.

However, in the context of the present invention "perchlorate depleted milk" also refers to milk in which the absolute amount of perchlorate is determined. In this regard, "perchlorate depleted milk" is considered as containing less than 2 ppb of perchlorate when the dry mass of the (perchlorate depleted) milk is between about 5% and about 13%. As described elsewhere herein, in the context of the present invention perchlorate depleted milk containing less than 2 ppb of perchlorate has a dry mass between 5% and 14%, preferably between 5% and 13%. More preferred, in the context of the present invention perchlorate depleted milk containing less than 2 ppb of perchlorate has a dry mass between 5% and 7%. Equally preferred, perchlorate depleted milk containing less than 2 ppb of perchlorate of the invention has a dry mass between 8% and 10%. Equally preferred, perchlorate depleted milk containing less than 2 ppb of perchlorate of the invention has a dry mass between 8% and 13%. A dry mass of milk between about 5% and about 13% as used in the context of the present invention means that the dry mass of the milk is in the range of about 5% and about 13%, i.e. includes about 5%, about 6%, about 7%, about 8%, about 9%, about 10%, about 11%, about 12% and about 13% and any number in between. A dry mass of milk between about 5% and about 13% as used in the context of the present invention further includes the concrete numbers of 5%, 6%, 7%, 8%, 9%, 10%, 11%, 12% and 13% and any number in between. Preferably, in the context of the present invention "perchlorate depleted milk" is considered as containing less than 2 ppb of perchlorate when the dry mass of the (perchlorate depleted) milk is between about 5% and about 7%, i.e. about 5%, about 6% or about 7% or any number in between. Equally preferred, in the context of the present invention "perchlorate depleted milk" is considered as containing less than 2 ppb of perchlorate when the dry mass of the (perchlorate depleted) milk is between 5% and 7%, i.e. 5%, 6% or 7% or any number in between. Equally preferred, in the context of the present invention "perchlorate depleted milk" is considered as containing less than 2 ppb of perchlorate when the dry mass of the (perchlorate depleted) milk is between about 8% and about 10%, i.e. about 8%, about 9% or about 10% or any number in between. Equally preferred, in the context of the present invention "perchlorate depleted milk" is considered as containing less than 2 ppb of perchlorate when the dry mass of the (perchlorate depleted) milk is between 8% and 10%, i.e. 8%, 9% or 10% or any number in between. Equally preferred, in the context of the present invention "perchlorate depleted milk" is considered as containing less than 2 ppb of perchlorate when the dry mass of the (perchlorate depleted) milk is between about 8% and about 13%, i.e. about 8%, about 9%, about 10%, about 11%, about 12% or about 13% or any number in between. Equally preferred, in the context of the present invention "perchlorate depleted milk" is considered as containing less than 2 ppb of perchlorate when the dry mass of the (perchlorate depleted) milk is between 8% and 13%, i.e. 8%, 9%, 10%, 11%, 12% or 13% or any number in between. Preferably, in the context of the present invention a "perchlorate depleted milk" contains less than 2 ppb of perchlorate when the dry mass of the (perchlorate depleted) milk is between about 5% and about 7% as defined herein is whey. Preferably, said perchlorate depleted milk containing less than 2 ppb of perchlorate when the dry mass of the (perchlorate depleted) milk is between about 5% and about 7% is produced from perchlorate containing milk and/or milk assumed to contain perchlorate containing 2 ppb or more than 2 ppb perchlorate when the dry mass is between about 5% and about 7%. Preferably, in the context of the present invention a "perchlorate depleted milk" contains less than 2 ppb of perchlorate when the dry mass of the (perchlorate depleted) milk is between about 8% and about 10% as defined herein is skim milk. Preferably, said perchlorate depleted milk containing less than 2 ppb of perchlorate when the dry mass of the (perchlorate depleted) milk is between about 8% and about 10% is produced from perchlorate containing milk and/or milk assumed to contain perchlorate containing 2 ppb or more than 2 ppb perchlorate when the dry mass is between about 8% and about 10%. Preferably, in the context of the present invention a "perchlorate depleted milk" containing less than 2 ppb of perchlorate when the dry mass of the (perchlorate depleted) milk is between about 8% and about 13% as defined herein is whole milk. Preferably, said perchlorate depleted milk containing less than 2 ppb of perchlorate when the dry mass of the (perchlorate depleted) milk is between about 8% and about 13% is produced from perchlorate containing milk and/or milk assumed to contain perchlorate containing 2 ppb or more than 2 ppb perchlorate when the dry mass is between about 8% and about 13%. Preferably the "perchlorate depleted milk" as described herein above contains less than 1.8 ppb, more preferred less than 1.5 ppb, even more preferred less than 1.3 ppb, still more preferred less than 1.0 ppb, still more preferred less than 0.9 ppb, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the dry mass of the (perchlorate depleted) milk is between about 5% and about 13%, preferably about 6% or about 9%. Most preferred, the "perchlorate depleted milk" manufactured according to the processes of the present invention comprises no detectable amount of perchlorate, i.e. the content of perchlorate has been nearly completely removed. The perchlorate depleted retentate fraction obtained after nanofiltration, i.e. one nanofiltration step, can be contacted with perchlorate free solvent defined elsewhere herein to achieve to the same dry mass content of the initial "perchlorate containing milk" or "milk assumed to contain perchlorate" as defined elsewhere herein to compare the perchlorate content before and after nanofiltration. Alternatively, the perchlorate content can be measured in the retentate fraction and reduction of the content of perchlorate by nanofiltration can be calculated based on the dry mass increase. Hence, a reduction of the perchlorate content in the retentate fraction after subjecting perchlorate containing milk to nanofiltration as described herein refers to the fact that the dry mass of the perchlorate depleted retentate fraction is recalculated to refer to the initial dry mass content before nanofiltration.

In the context of the present invention, "perchlorate containing milk" subjected to nanofiltration refers to milk containing 2 ppb or more than 2 ppb perchlorate when the dry mass of the (perchlorate containing) milk is between about 5% and about 13%, preferably about 6% or about 9%. In accordance with the definition of "perchlorate depleted milk" as provided elsewhere herein, a dry mass of milk between about 5% and about 13% as used in the context of the present invention means that the dry mass of the milk is in the range of about 5% and about 13%, i.e. includes about 5%, about 6%, about 7%, about 8%, about 9%, about 10%, about 11%, about 12% or about 13% and any number in between. A dry mass of milk between about 5% and about 13% as used in the context of the present invention further includes the concrete numbers of 5%, 6%, 7%, 8%, 9%, 10%, 11%, 12% and 13% and any number in between. Preferably, in the context of the present invention "perchlorate containing milk" subjected to nanofiltration is considered as containing 2 ppb or more than 2 ppb of perchlorate when the dry mass of the (perchlorate containing) milk is between about 5% and about 7%, i.e. about 5%, about 6% or about 7% or any number in between. Equally preferred, in the context of the present invention "perchlorate containing milk" subjected to nanofiltration is considered as containing 2 ppb or more than 2 ppb of perchlorate when the dry mass of the (perchlorate containing) milk is between 5% and 7%, i.e. 5%, 6% or 7% or any number in between. Equally preferred, in the context of the present invention "perchlorate containing milk" subjected to nanofiltration is considered as containing less than 2 ppb of perchlorate when the dry mass of the (perchlorate containing) milk is between about 8% and about 10%, i.e. about 8%, about 9% or about 10% or any number in between. Equally preferred, in the context of the present invention "perchlorate depleted milk" subjected to nanofiltration is considered as containing 2 ppb or more than 2 ppb of perchlorate when the dry mass of the (perchlorate containing) milk is between 8% and 10%, i.e. 8%, 9% or 10% or any number in between. Equally preferred, in the context of the present invention "perchlorate containing milk" is considered as containing less than 2 ppb of perchlorate when the dry mass of the (perchlorate containing) milk is between about 8% and about 13%, i.e. about 8%, about 9%, about 10%, about 11%, about 12% or about 13% or any number in between. Equally preferred, in the context of the present invention "perchlorate depleted milk" subjected to nanofiltration is considered as containing 2 ppb or more than 2 ppb of perchlorate when the dry mass of the (perchlorate containing) milk is between 8% and 13%, i.e. 8%, 9%, 10%, 11%, 12% or 13% or any number in between. Preferably, in the context of the present invention a "perchlorate containing milk" containing 2 ppb or more than 2 ppb of perchlorate when the dry mass of the (perchlorate containing) milk is between about 5% and about 7% as defined herein is whey. Preferably, in the context of the present invention a "perchlorate containing milk" containing 2 ppb or more than 2 ppb of perchlorate when the dry mass of the (perchlorate containing) milk is between about 8% and about 10% as defined herein is skim milk. Preferably, in the context of the present invention a "perchlorate containing milk" containing 2 ppb or more than 2 ppb of perchlorate when the dry mass of the (perchlorate containing) milk is between about 8% and about 13% as defined herein is whole milk.

The term "milk assumed to contain perchlorate" means that perchlorate is not necessarily determined or measured in said milk before subjecting the milk to nanofiltration, but is supposed to be 2 ppb or more than 2 ppb when the dry mass of the "milk assumed to contain perchlorate" is between about 5% and about 13%, preferably about 6% or about 9%. The amount of perchlorate contained in said "perchlorate containing milk" or said "milk assumed to contain perchlorate" may e.g. result from the environmental factors with respect to the region from which the milk originates, such as regions with elevated perchlorate concentrations in the ground water resulting in perchlorate-contaminated drinking water, or is based on known properties of the feed that the milk producing mammals get. Hence, the fact that the milk is "assumed to contain perchlorate" can be equated with a certain security that this milk is "perchlorate containing milk", but without the necessity of measuring the actual perchlorate content in said milk.

According to the processes of the present invention, nanofiltration can be conducted with (predetermined) process parameters depleting at least 40%, preferably at least 45% of the contained perchlorate in one nanofiltration step. The depletion of at least 40% means that 60% or less than 60% of the contained perchlorate is rejected by the nanofiltration membrane used in the context of the invention, i.e. one nanofiltration step. The term "rejection" as used herein means that a compounds is refrained from passing through the nanofiltration membrane described elsewhere herein, i.e. the quantity of the compound is maintained when the dry mass of the perchlorate depleted retentate fraction refers to the initial dry mass content of the perchlorate containing milk and/or milk assumed to contain perchlorate. "Maintained" means that basically the same amount of the compounds is present in the obtained perchlorate depleted retentate fraction when referring to the same dry mass as the "perchlorate containing milk" or "milk assumed to contain perchlorate". In particular, a rejection means that at least 95%, more preferred at least 95.5%, even more preferred at least 96%, still more preferred at least 96.5%, still more preferred at least 975.%, still more preferred at least 97.5%, still more preferred at least 98%, still more preferred at least 98.5%, still more preferred at least 99%, still more preferred at least 99.2%, still more preferred at least 99.3%, still more preferred at least 99.4%, still more preferred at least 99.5%, still more preferred at least 99.6%, still more preferred at least 99.7%, still more preferred at least 99.8%, still more preferred at least 99.9% of the compound are refrained from passing through the nanofiltration membrane. Most preferred a rejection means that 100% of the compound are refrained from passing through the nanofiltration membrane. A perchlorate depletion of at least 40% means that the contained perchlorate is depleted by 40%, 45%, 50%, 55%, 60%, 65%, 70%, 75%, 80%, 85%, 90%, 95%, 97%, 98%, 99% or even 100%. Hence, it is envisaged that the applied (predetermined) process parameters deplete at least 40% of the contained perchlorate in one nanofiltration step. It is further envisaged that the applied (predetermined) process parameters deplete at least 45%, more preferred at least 50%, still more preferred at least 55%, still more preferred at least 60%, still more preferred at least 65%, still more preferred at least 70%, still more preferred at least 75%, still more preferred at least 80%, still more preferred at least 85%, still more preferred at least 90%, still more preferred at least 95%, still more preferred at least 97%, still more preferred at least 98%, still more preferred at least 99% of the contained perchlorate in one nanofiltration step. Most preferred the perchlorate content of said milk after applying nanofiltration is reduced by 100%. Specifically, said predetermined process parameters reduce the perchlorate content in relation to the dry mass increase by loss of aqueous fluid. Specifically, when applying said process parameters according to the processes and method of the present invention, said process parameters are suitable to double the dry mass of the starting raw material while the perchlorate content remains basically unchanged or is even reduced. "Predetermined" process parameters means in this respect that said nanofiltration parameters are defined beforehand and are known to be applicable to achieve the objective for which they are applied. Accordingly, in the context of the invention said predetermined process parameters can be used as reference or standard nanofiltration parameters to significantly remove the perchlorate content from milk containing perchlorate or milk assumed to contain perchlorate, namely depleting at least 45% of the contained perchlorate in milk in one passage. Hence, once said predetermined process parameters are defined, they can be conducted without the need to determine the perchlorate content in the milk subjected to nanofiltration, or in the permeate and/or retentate fraction. Rather, said predetermined process parameters automatically result in perchlorate depleted milk as defined elsewhere herein, i.e. milk containing less than 2 ppb perchlorate when the dry mass of the milk is between about 5% and about 13% as defined elsewhere herein, preferably about 6% or about 9%. For example, said predetermined process parameters can be the ones summarized in Examples 1 and 2. Parameters useful in this respect as predetermined nanofiltration process parameters to deplete at least 40%, preferably 45% of the contained perchlorate are described elsewhere herein.

In the context of the present invention it is also envisaged that the perchlorate containing milk and/or milk assumed to contained perchlorate as defined elsewhere herein contains chlorate and/or bromide, i.e. is a chlorate and/or bromide containing milk and/or milk assumed to chlorate and/or bromide. Specifically, the "perchlorate containing" milk as defined herein contains 2 ppb or more than 2 ppb chlorate and/or 2 ppb or more than 2 ppb bromide when the dry mass of said milk is between about 5% and about 13% as defined elsewhere herein, preferably about 6% or about 9%. Hence, in the context of the present invention "perchlorate containing milk" also refers to milk that is additionally chlorate and/or bromide containing. Accordingly, the context of the present invention also the absolute amount of chlorate and/or bromide may be determined in "perchlorate containing milk" and "perchlorate depleted milk". In this regard, "perchlorate depleted milk" is considered as containing less than 2 ppb of chlorate when the dry mass of the (perchlorate depleted) milk is between about 5% and about 13% as defined elsewhere herein, preferably about 6% or about 9%. Preferably the "perchlorate depleted milk" contains less than 1.8 ppb, more preferred less than 1.5 ppb, even more preferred less than 1.3 ppb, still more preferred less than 1.0 ppb, still more preferred less than 0.9 ppb, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb chlorate, specifically when the dry mass of the (perchlorate depleted) milk is between about 5% and about 13% as defined elsewhere herein, preferably about 6% or about 9%. Most preferred, the "perchlorate depleted milk" manufactured according to the processes of the present invention comprises no detectable amount of chlorate, i.e. the content of chlorate has been nearly completely removed. In addition, the "perchlorate depleted milk" is considered as containing less than 2 ppb of bromide when the dry mass of the (perchlorate depleted) milk is between about 5% and about 13% as defined elsewhere herein, preferably about 6% or about 9%. Preferably the "perchlorate depleted milk" contains less than 1.8 ppb, more preferred less than 1.5 ppb, even more preferred less than 1.3 ppb, still more preferred less than 1.0 ppb, still more preferred less than 0.9 ppb, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb bromide, specifically when the dry mass of the (perchlorate depleted) milk is between about 5% and about 13% as defined elsewhere herein, preferably about 6% or about 9%. Most preferred, the "perchlorate depleted milk" manufactured according to the processes of the present invention comprises no detectable amount of bromide, i.e. the content of bromide has been nearly completely removed.

The chlorate and/or bromide depleted (perchlorate depleted) retentate fraction obtained after nanofiltration, i.e. one nanofiltration step, can be contacted with perchlorate, chlorate and bromide free solvent defined elsewhere herein to achieve to the same dry mass content of the initial "perchlorate containing milk" or "milk assumed to contain perchlorate" that also contains chlorate and/or bromide, as defined elsewhere herein to compare the chlorate and/or bromide content before and after nanofiltration. Alternatively, the chlorate and/or bromide content can be measured in the retentate fraction and reduction of the content of chlorate and/or bromide by nanofiltration can be calculated based on the dry mass increase.

As discussed above, in the context of the present invention it is envisaged that the perchlorate containing milk and/or milk assumed to contained perchlorate as defined elsewhere herein also contains chlorate and/or bromide. The nanofiltration according to the processes of the present invention is further envisaged to be conducted with (predetermined) process parameters depleting at least 40% of the contained chlorate and/or at least 30% of the contained bromide in one nanofiltration step. Specifically, said (predetermined) process parameters reduce the chlorate and bromide content in relation to the dry mass increase by loss of aqueous fluid. That means, the reduction is calculated when the dry mass of the perchlorate depleted retentate fraction refers to the initial dry mass content of the perchlorate containing milk and/or milk assumed to contain perchlorate, i.e. they are considered to have the same dry mass. Accordingly, in the context of the invention said (predetermined) process parameters can be used as reference or standard nanofiltration parameters to significantly remove in addition to the perchlorate content from milk containing perchlorate or milk assumed to contain perchlorate, also at least 40% of the contained chlorate and/or at least 30% of the contained bromide in milk in one passage or nanofiltration step. Hence, once said process parameters are defined, they can be conducted without the need to determine the chlorate and/or bromide content in the milk subjected to nanofiltration, or in the permeate and/or retentate fraction. For example, said predetermined process parameters can be the ones summarized in Examples 1 and 2. A depletion of at least 40% of the contained chlorate means that 60% or less than 60% of the contained chlorate is rejected by the nanofiltration membrane used in the context of the invention, i.e. one nanofiltration step. Thus, the depletion of at least 40% means that the contained chlorate is depleted by 40%, 45%, 50%, 55%, 60%, 65%, 70%, 75%, 80%, 85%, 90%, 95%, 97%, 98%, 99% or even 100%. Hence, it is envisaged that the applied (predetermined) process parameters deplete at least 40% of the contained chlorate in one nanofiltration step. More preferred at least 45%, even more preferred at least 50%, still more preferred at least 55%, still more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained chlorate is depleted in one nanofiltration step. Most preferred 100% of the contained chlorate is depleted in one nanofiltration step. A depletion of at least 30% of the contained bromide means that 70% or less than 70% of the contained chlorate is rejected by the nanofiltration membrane used in the context of the invention, i.e. one nanofiltration step. Thus, the depletion of at least 30% means that the contained bromide is depleted by 30%, 35%, 40%, 45%, 50%, 55%, 60%, 65%, 70%, 75%, 80%, 85%, 90%, 95%, 97%, 98%, 99% or even 100%. Hence, it is envisaged that the applied (predetermined) process parameters deplete at 30% of the contained bromide is depleted in one nanofiltration step. More preferred at least 35%, even more preferred at least 40%, still more preferred at least 45%, still more preferred at least 50%, still more preferred at least 55%, still more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained bromide is depleted in one nanofiltration step. Most preferred 100% of the contained bromide is depleted in one nanofiltration step.

According to the means and methods of the present invention, the perchlorate containing milk and/or milk assumed to contained perchlorate as defined elsewhere herein contains lactose and protein. Hence, in the context of the present invention also the absolute amount of lactose and protein may be determined in "perchlorate containing milk", "milk assumed to contain perchlorate" and "perchlorate depleted milk" using for example a method in accordance with the Official Collection of Methods for Sampling and Examining Foods (§ 64 of the German Food and Feed Code (LFGB). Preferably, the amount of lactose is determined according to the enzymatic method L 01.00-17 2016-10 for the determination of lactose in milk and milk products according to DIN 10344). Preferably, the amount of protein is determined according to the Kjeldahl method L 01.00-10 2016-03 and the calculation of the raw protein content according to DIN EN ISO 8968-1. In this regard, "perchlorate containing milk" and/or "milk assumed to contain perchlorate" contains between 44 mg/kg and 49 mg/kg lactose, preferably, between 45 mg/kg and 49 mg/kg, even more preferred between 46 mg/kg and 48 mg/kg or between 45 mg/kg and 46 mg/kg lactose when the dry mass of the perchlorate containing milk is between about 5% and about 13%, preferably about 6% or about 9%. Preferably, "perchlorate containing milk" and/or "milk assumed to contain perchlorate" contains between 45 mg/kg and 49 mg/kg lactose, preferably between 46 mg/kg and 48 mg/kg lactose when the dry mass of the perchlorate containing milk is between about 8% and about 13% as defined elsewhere herein, preferably between about 8% and about 10%. Preferably, "perchlorate containing milk" and/or "milk assumed to contain perchlorate" contains between 44 mg/kg and 49 mg/kg lactose, preferably between 45 mg/kg and 46 mg/kg lactose when the dry mass of the perchlorate containing milk is between about 5% and about 7% as defined elsewhere herein. It is further envisaged that the "perchlorate containing milk" and/or "milk assumed to contain perchlorate" contains between 5 mg/kg and 42 mg/kg protein, preferably between 5 mg/kg and 20 mg/kg or between 30 mg/kg and 42 mg/kg protein when the dry mass of the perchlorate containing milk is between about 5% and about 13 as defined elsewhere herein, preferably about 6% or about 9%. Preferably, "perchlorate containing milk" and/or "milk assumed to contain perchlorate" contains between 30 mg/kg and 42 mg/kg, preferably between 34 mg/kg and 38 mg/kg protein when the dry mass of the perchlorate containing milk is between about 8% and about 13% as defined elsewhere herein, preferably between about 8% and about 10%. Preferably, "perchlorate containing milk" and/or "milk assumed to contain perchlorate" contains between 5 mg/kg and 20 mg/kg, preferably between 6 mg/kg and 12 mg/kg protein when the dry mass of the perchlorate containing milk is between about 5% and about 7% as defined elsewhere herein. In this regard it is envisaged that the nanofiltration according to the processes of the present invention can further be conducted with (predetermined) process parameters leading to lactose and protein rejection in one nanofiltration step. For example, said predetermined process parameters can be the ones summarized in Examples 1 and 2. The "rejection" of lactose and protein as described herein means that the quantity of lactose and protein is doubled in relation to the dry mass increase by loss of aqueous fluid. Thus, the rejection of lactose an protein in one nanofiltration step means that the same content of lactose and protein is present in the determined in "perchlorate containing milk" or "milk assumed to contain perchlorate" as in the "perchlorate depleted milk" when the dry mass of the perchlorate depleted retentate fraction is recalculated to the dry mass of the perchlorate containing milk and/or milk assumed to contain perchlorate. As described elsewhere herein, the term "rejection" means that at least 95%, more preferred at least 95.5%, even more preferred at least 96%, still more preferred at least 96.5%, still more preferred at least 97.5%, still more preferred at least 97.5%, still more preferred at least 98%, still more preferred at least 98.5%, still more preferred at least 99%, still more preferred at least 99.2%, still more preferred at least 99.3%, still more preferred at least 99.4%, still more preferred at least 99.5%, still more preferred at least 99.6%, still more preferred at least 99.7%, still more preferred at least 99.8%, still more preferred at least 99.9% of the compound, here lactose and protein, are refrained from passing through the nanofiltration membrane. Most preferred a rejection means that 100% of the compound, herein lactose and protein, are refrained from passing through the nanofiltration membrane. Thus, the quantity of the compound, herein protein and lactose, is maintained when the dry mass of the perchlorate depleted retentate fraction refers to the initial dry mass content of the perchlorate containing milk and/or milk assumed to contain perchlorate. Hence, the content of lactose and protein is determined in perchlorate containing milk (before nanofiltration) and after in perchlorate depleted milk subjected to nanofiltration (i.e. after nanofiltration), wherein the dry mass of the perchlorate depleted milk is recalculated to the dry mass of the perchlorate containing milk and/or milk assumed to contain perchlorate, i.e. the initial dry mass content.

In the context of the present invention, the nanofiltration according to the processes described herein can further be conducted with (predetermined) process parameters characterized by magnesium rejection by at least 80% and/or calcium rejection by at least 90% in one nanofiltration step.

Specifically, said (predetermined) process parameters reject at least 80% of the magnesium content and/or 90% of the calcium content when the dry mass of the perchlorate depleted retentate fraction refers to the initial dry mass content of the perchlorate containing milk and/or milk assumed to contain perchlorate, i.e. they have the same dry mass. Once said process parameters are defined, they can be conducted without the need to determine the magnesium and/or calcium content in the milk subjected to nanofiltration, or in the permeate and/or retentate fraction. For example, said predetermined process parameters can be the ones summarized in Examples 1 and 2. In the context of the present invention, a magnesium rejection by at least 80% means that 20% or less than 20% of the contained magnesium is depleted by the nanofiltration membrane used in the context of the invention, i.e. one nanofiltration step. Thus, the rejection of at least 80% means that the contained magnesium is rejected by 80%, 85%, 90%, 95%, 97%, 98%, 99% or even 100%. Hence, it is envisaged that the applied (predetermined) process parameters reject at least 80% of the contained magnesium in one nanofiltration step. More preferred at least 85%, even more preferred at least 90%, still more preferred at least 92%, still more preferred at least 95%, still more preferred at least 97%, still more preferred at least 98%, still more preferred at least 99% of the contained magnesium is rejected in one nanofiltration step. Most preferred 100% of the contained magnesium is rejected in one nanofiltration step. In the context of the present invention a calcium rejection by at least 90% means that 10% or less than 10% of the contained calcium is depleted by the nanofiltration membrane used in the context of the invention, i.e. one nanofiltration step. Thus, the rejection of at least 90% means that the contained calcium is rejected by 90%, 92%, 95%, 97%, 98%, 99% or even 100%. Hence, it is envisaged that the applied (predetermined) process parameters reject at least 90% of the contained calcium in one nanofiltration step. More preferred at least 92% of the contained calcium is rejected in one nanofiltration step. More preferred at least 95%, even more preferred at least 97%, still more preferred at least 98%, still more preferred at least 99% of the contained calcium is rejected in one nanofiltration step. Most preferred 100% of the contained calcium is rejected in one nanofiltration step. When referring to the fact that at least 80% of the magnesium and/or 90% of the calcium contained in perchlorate containing milk and/or milk assumed to contain perchlorate are rejected means that the content of magnesium and/or calcium is determined in perchlorate containing milk (before nanofiltration) and after in perchlorate depleted milk subjected to nanofiltration (i.e. after nanofiltration) both having the same dry mass, and these values are compared. In the context of the present invention, the nanofiltration according to the processes described herein can further be conducted with (predetermined) process parameters characterized by an up to 40% reduced content of sodium and/or potassium in one nanofiltration step. Specifically, said (predetermined) process parameters reject not more than 40% of sodium and/or potassium when the dry mass of the perchlorate depleted retentate fraction refers to the initial dry mass content of the perchlorate containing milk and/or milk assumed to contain perchlorate, i.e. they have the same dry mass. Once said process parameters are defined, they can be conducted without the need to determine the magnesium and/or calcium content in the milk subjected to nanofiltration, or in the permeate and/or retentate fraction. For example, said predetermined process parameters can be the ones summarized in Examples 1 and 2. In the context of the present invention, a sodium and/or potassium rejection by up to 40% means that 60% or more than 60% of the contained sodium and/or potassium are rejected by the nanofiltration membrane used in the context of the invention, i.e. one nanofiltration step. Thus, the rejection of 60% or more than 60% means that the contained sodium and/or potassium is rejected by 60%, 65%, 70%, 75%, 80%, 85%, 90%, 95%, 97%, 98%, 99% or even 100%. Hence, it is envisaged that the applied (predetermined) process parameters reject at least 60% of the contained sodium and/or potassium in one nanofiltration step. More preferred at least 65%, even more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained sodium and/or potassium is depleted in one nanofiltration step. Most preferred 100% of the contained sodium and/or potassium is depleted in one nanofiltration step.

In the context of the present invention, the content of perchlorate in "perchlorate containing milk", "milk assumed to contain perchlorate" and "perchlorate depleted milk" can be easily analyzed by those skilled in the art using known methods like, ion chromatography (IC), high performance liquid chromatography (HPLC), ion chromatographic-mass spectrometry (IC-MS) or liquid chromatographic-mass spectrometry (LC-MS), just to name some. Preferably, the content of perchlorate in "perchlorate containing milk", "milk assumed to contain perchlorate" and "perchlorate depleted milk" is analyzed using the QuPPe-AO-Method (Quick Polar Pesticides Method) as described by the EU Reference Laboratories for Residues of Pesticides requiring Single Residue Methods (EURL-SRW), CVUA Stuttgart, Schaflandstr. 3/2, DE-70736 Fellbach, Germany that involves extraction with acidified methanol and LC-MS/MS measurement, and is known to those skilled in the art. The same methods described herein to analyzed the perchlorate content are also applicable to analyze the content of chlorate and bromide in "perchlorate containing milk", "milk assumed to contain perchlorate" and "perchlorate depleted milk". Additional methods further applicable in this regard are defined elsewhere herein. Other ions like magnesium, calcium, sodium or potassium can be analyzed using ion chromatography methods according to DIN EN ISO 14911 1999-12 and are known to those skilled in the art.

As used herein, "ppb" means "parts per billion" and is the number of units of mass of a contaminant per 1000 million units of total mass (1 ppb equals $1*10^{-9}$ or 0.000000001). Also µg/L (micrograms per liter) or µg/kg (micrograms per kilogram) can be used to define the amount of a contaminant. In this respect, 1 ppb corresponds to an amount of 0.001 mg/kg contaminant. It should be noted that in the dairy industry the mass unit kg is used and not the volume unit liters. If a liter is specified, the user must pay attention to conversion factors. Regardless of the unit indicated, the method for each unit of mass or volume can be specified taking into account the conversion factors. Both in terms of dry matter and on fresh mass.

The term "milk" as used herein refers in its broadest sense to milk as such, i.e. an opaque white fluid rich in fat and protein and comprising partially dissolved minerals, vitamins, milk sugar, secreted by female mammals for the nourishment of their young. Also comprised by this term is "pre-treated milk", such as skim milk. While raw milk has a dry mass content of about 12% to about 14%, and a fat content of about 3.0% to about 5.2%, skim milk has a typical dry mass of about 8% to about 10% and a fat content of <0.1% (see Chemie und Physik der Milch, Naturstoff Rohstoff Lebensmittel, 4$^{th}$ edition 2016, Behrs Verlag, ISBN: 978-3-95468-037-5). The term "skim milk concentrate" as used herein refers to the material retrieved after nanofiltration when subjecting perchlorate containing skim milk to nanofiltration, defined elsewhere herein. Accordingly, the term "skim milk concentrate" corresponds to the "retentate fraction" as defined elsewhere herein. The term "pre-treated milk" refers to any industrial process applied before subjecting the (preferable skimmed) milk to nanofiltration, for example pasteurization (heat-treatment) or skimming of milk as described elsewhere herein. Hence, the "perchlorate containing milk" and/or "milk assumed to contain perchlorate" according to the invention may be pre-treated milk, such as skimmed milk, milk that has or has not undergone heat and durability treatment, milk that has undergone only moderate heat and durability treatment, or whey. In this context "whey" refers to milk that has been pre-treated by curdling or straining. Whey has a typical dry mass of about 5% to about 7% and a fat content of <0.1% (see Technologie der Milchverarbeitung, Edgar Spreer, BehrsVerlag, ISBN 978-3-89947-841-9, 10$^{th}$ completely revised edition 2011, unchanged reprinting 2015). Hence, in the context of the present invention, the "perchlorate containing milk" and/or "milk assumed to contain perchlorate" according to the present invention can be perchlorate containing whey subjected to nanofiltration as defined elsewhere herein. Accordingly, the term "retentate fraction" also corresponds to "whey concentrate" as defined elsewhere herein. The term "whey", as used herein, can also refer to the permeate of microfiltration of milk, which can be used analog as whey. Permeate from milk filtration (MF) of skim milk is the fraction that contains an decreased solids mass percentage or dry mass, as defined elsewhere herein, (as compared to the original milk) of β-casein. "Whey protein" is the collection of globular proteins isolated from whey consisting of α-lactalbumin, β-lactoglobulin, serum albumin, immunoglobulins, Lactoferrin, and traces of glycol-macropeptides of casein. In the context of the present invention, it is particularly preferred that the "milk" is organic skim milk or organic whey.

In the context of the present invention the dry mass of the perchlorate containing milk can be increased by a nanofiltration step to a dry mass of for example 16%, then transported and subjected to a second nanofiltration step to increase the dry mass to 32%. If necessary, the dry mass content of the skim milk concentrate or the obtained whey concentrate can be reduced by dilution for further processing steps and for adjusting the dry mass of the obtained milk concentrate to the dry mass content of the perchlorate containing milk before the first nanofiltration step in order to assess the amount of perchlorate reduction. Further, milk can be dried and dissolved again with water before subjected to nanofiltration. Powdered milk or dried milk is a manufactured dairy product made by evaporating milk to dryness. One purpose of drying milk is to preserve it since milk powder has a far longer shelf life than liquid milk and does not need to be refrigerated, due to its low moisture content. Another purpose is to reduce its bulk for economy of transportation. According to the present invention, powdered milk or dried milk is preferably made by skim milk, but can also made by concentrated milk, ultrafiltered milk, diafiltered milk, micro-filtered milk or pasteurized skim milk or skim milk with extended shelf live or skim milk processed with high temperature heating, low temperature and long-time heating, high temperature and short-time heating, ultra-high temperature heating. Further, powdered milk or dried milk is preferably whey powder but can also made by sweet whey or acid whey, whey of caseinate or permeate of microfiltration with whey protein. But it can also made by concentrated whey, ultrafiltered whey, diafiltered whey, micro-filtered whey, demineralized whey by ion exchange or electro dialysis or pasteurized whey or whey with extended shelf live or whey processed with high temperature heating, low temperature and long-time heating, high temperature and short-time heating, ultra-high temperature heating.

However, dried milk or powdered milk cannot directly be subjected to nanofiltration and has to be solved again prior to the nanofiltration step as described herein above. In this respect, dried milk or powdered milk is diluted with a perchlorate-free solvent described elsewhere herein to at least 2.5% dry matter to be subjected to nanofiltration. Hence, unless specified as dry, "perchlorate containing milk" and/or "milk assumed to contain perchlorate" subjected to nanofiltration in the context of the present invention refers to liquid milk, i.e. milk having a dry mass of at least 2.5% and not more than 20%. Preferably, "perchlorate containing milk" and/or "milk assumed to contain perchlorate" subjected to nanofiltration according to the present invention comprises between about 5% and about 13% dry matter as defined elsewhere herein. More preferred, "perchlorate containing milk" and/or "milk assumed to contain perchlorate" subjected to nanofiltration according to the present invention comprise between about 5% and about 7% dry matter as defined elsewhere herein. Equally preferred, "perchlorate containing milk" and/or "milk assumed to contain perchlorate" subjected to nanofiltration according to the present invention comprise between about 8% and about 10% dry matter as defined elsewhere herein. Equally preferred, "perchlorate containing milk" and/or "milk assumed to contain perchlorate" subjected to nanofiltration according to the present invention comprise between about 8% and about 13% dry matter as defined elsewhere herein. Even more preferred, "perchlorate containing milk" and/or "milk assumed to contain perchlorate" subjected to nanofiltration according to the present invention is about 6% or about 9% dry matter as defined elsewhere herein. Contrary thereto, "perchlorate depleted milk" manufactured by the processes of the present invention refers to both liquid and dry milk. Therefore, in the context of the present invention the perchlorate containing milk and the perchlorate depleted milk as defined elsewhere herein which are subjected to nanofiltration according to the present invention comprise at least 2.5% dry matter.

After subjecting the (resolved) milk to nanofiltration, the obtained retentate fraction can then again be solved or contacted with the perchlorate-free solvent described elsewhere herein and subjected to a further nanofiltration step as described elsewhere herein. Preferably, said contacting with the perchlorate-free solvent and subsequent nanofiltration are repeated as often as necessary, i.e. as often as to reduce the perchlorate content down to less than 2 ppb, when the retentate fraction has a dry mass between about 5% and about 13% as defined elsewhere herein, preferably a dry mass between about 5% and about 7%, a dry mass between about 8% and about 10% or a dry mass between about 8% and 13% as defined elsewhere herein, more preferred a dry mass of about 6% or about 9% as defined elsewhere herein. Preferably, the perchlorate content is reduced to less than 1.8 ppb, more preferred less than 1.5 ppb, even more preferred less than 1.3 ppb, still more preferred less than 1.0 ppb, still more preferred less than 0.9, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the retentate fraction has a dry mass between about 5% and about 13%, preferably about 6% or about 9%. As described elsewhere herein, the nanofiltration step(s) according to the present invention can also reduce the content of other unwanted compounds such as chlorate and bromide. Hence, it is further envisaged that the perchlorate-free solvent is also free of chlorate and bromide. Specifically, the chlorate and bromide content of said the retentate fraction is reduced to less than 1.8 ppb, more preferred less than 1.5 ppb, even more preferred less than 1.3 ppb, still more preferred less than 1.0 ppb, still more preferred less than 0.9 ppb, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the retentate fraction has a dry mass between about 5% and about 13% as defined elsewhere herein, preferably about 6% or about 9%. Most preferred, the perchlorate depleted retentate fraction comprises no detectable amount of perchlorate after being contacted with the perchlorate-free solvent and subsequent repeated nanofiltration step(s). More preferred, the perchlorate depleted retentate fraction comprises no detectable amount of perchlorate, chlorate and bromide after being contacted with the perchlorate-free solvent that is also chlorate- and bromide-free and subsequent repeated nanofiltration step(s).

In this respect, the nanofiltration conditions/parameters applied in a further nanofiltration step or further nanofiltration steps can be the same as in the previous nanofiltration step, or can vary between the single nanofiltration steps. Preferably, the same parameters set for the first nanofiltration are also used for the subsequent nanofiltration step.

However, in the context of the present invention "perchlorate containing milk" can also be diluted prior to be subjected to nanofiltration. Such diluted milk comprises at least 2.5% dry mass in total. Preferably, the milk is diluted in the perchlorate-free solvent described elsewhere herein. The term "perchlorate-free solvent" as used in the context of the invention is preferably essentially free of perchlorate. Essentially free means in this respect that the solvent comprises less than 0.1 ppb of perchlorate. More preferred, the "perchlorate-free solvent" comprises less than 0.09 ppb, more preferred less than 0.08 ppb, even more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, still more preferred less than 0.009 ppb, still more preferred less than 0.008 ppb, still more preferred less than 0.007 ppb, still more preferred less than 0.006 ppb, still more preferred less than 0.005 ppb, still more preferred less than 0.004 ppb, still more preferred less than 0.003 ppb, still more preferred less than 0.002 ppb, still more preferred less than 0.001 ppb. Most preferred the "perchlorate-free solvent" comprising 0 ppb perchlorate. Preferably, the "perchlorate-free solvent" as used in the context of the invention is also essentially free of chlorate and bromide. Essentially free means in this respect that the solvent comprises less than 0.1 ppb of chlorate. More preferred, the "perchlorate-free solvent" comprises less than 0.09 ppb, more preferred less than 0.08 ppb, even more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, still more preferred less than 0.009 ppb, still more preferred less than 0.008 ppb, still more preferred less than 0.007 ppb, still more preferred less than 0.006 ppb, still more preferred less than 0.005 ppb, still more preferred less than 0.004 ppb, still more preferred less than 0.003 ppb, still more preferred less than 0.002 ppb, still more preferred less than 0.001 ppb of chlorate, and less than 0.1 ppb, more preferred, less than 0.09 ppb, more preferred less than 0.08 ppb, even more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, still more preferred less than 0.009 ppb, still more preferred less than 0.008 ppb, still more preferred less than 0.007 ppb, still more preferred less than 0.006 ppb, still more preferred less than 0.005 ppb, still more preferred less than 0.004 ppb, still more preferred less than 0.003 ppb, still more preferred less than 0.002 ppb, still more preferred less than 0.001 ppb of chlorate and bromide. Most preferred the "perchlorate-free solvent" comprises 0 ppb chlorate and 0 ppb bromide.

In sum, the "perchlorate containing milk" and/or "milk assumed to contain perchlorate" in the context of the present invention may refer to all possible forms of milk, such as whole milk, low-fat or skim milk, cream, ultrafiltered milk, diafiltered milk, micro-filtered milk, milk recombined from milk powder, organic milk, whey or a combination or dilution of any of these. Said milk may originate from cow, sheep, goat, camel, horse, donkey or any other mammal producing milk suitable for human nourishment. In a preferred embodiment of the present invention, the "perchlorate containing milk" and/or "milk assumed to contain perchlorate" is skim milk. The term "skim milk" as used herein refers to whole milk which has been deprived of the milk fat. Skim milk or skimmed milk usually contains less than 0.1% fat independently of original fat content of the raw milk. The dry mass of skim milk is typically between about 8% and about 10%, preferably about 9% as described elsewhere herein. The term "raw milk" refers to the milk naturally produced by a mammal that did not undergo any modification or treatment procedure. In the context of the present invention, "raw milk" particularly refers to "perchlorate containing milk" or "milk assumed to contain perchlorate". Equally preferred, the "perchlorate containing milk" and/or "milk assumed to contain perchlorate" in the context of the present invention is whey. The term "whey" as used herein refers to the serum or watery part of milk that is separated from the coagulable part or curd. "Whey" is also described as the liquid residue of cheese, casein and yoghurt production. "Whey" may also refer to milk that has been pre-treated by curdling or straining or the permeate of microfiltration of milk or whey of caseinate as described elsewhere herein. The term "whey" also refers to a fluid that is rich in lactose, minerals, and vitamins and contains proteins, soluble proteins and less than <0.1% of fat and ingredients like alpha-lactalbumin, alpha-lactoglobin, lactoferrin, immunoglobulins and pre-cursor substances for the probiotic galactooligosaccharides. The dry mass of whey is typically between about 5% and about 7%, preferably about 6%. The dry mass of whole milk is typically between about 8% and about 13%. The milk according to the present invention is preferably organic milk. Hence, said organic milk originates from livestock raised according to methods and/or organic farming law. The understanding of "organic milk" in the context of the present invention entirely refers to the criteria as defined in the European Council Regulation (EG) No. 834/2007 of 28 Jun. 2007, the Commission Regulation (EG) NO. 889/2008 of 5 Sep. 2008, the Commission Regulation (EG) NO. 1235/2008 of 8 Dec. 2008 and the Regulation (EG) No. 2018/848 of 30 May 2018. Typically, organic milk is milk from cows that are not prophylactically treated with antibiotics, that are not given prophylactic growth or reproduction hormones and that receive at least 50% of their food from their own farm or from pasture. Organic milk may also comprise a combination of milk from different animal origins specified above. Said "perchlorate containing milk" or "milk assumed to contain perchlorate" is preferably milk from dairies. When raw milk is used to undergo the manufacture processes described herein, the milk is preferably skimmed prior to nanofiltration, which means it is depleted of fats, and preferably, it is deprived of fats to contain less than 0.1% of the original fat content. In the context of the processes and methods for the manufacture of a perchlorate depleted milk according to the present invention, the "perchlorate containing milk" and/or "milk assumed to contain perchlorate" is preferably organic skim milk or organic whey.

In the context of the present invention, four perchlorates are of primary commercial interest: ammonium perchlorate ($NH_4ClO_4$), perchloric acid ($HClO_4$), potassium perchlorate ($KClO_4$), and sodium perchlorate ($NaClO_4$), which can all result in increased environmental perchlorate exposure. As stated before, perchlorate ($ClO_4^-$) is the anion resulting from the dissociation of perchloric acid ($HClO_4$) and its salts upon their dissolution in water, and has a molecular weight of 0.09944 KDa. Perchlorate ($ClO_4^-$) has the largest atomic volume per mole (74.7 qcm/mol) and the largest atomic mass (99.449 Dalton) of all ions in the milk. Many perchlorate salts are also soluble in non-aqueous solutions (Vogt et al. 2002, Wiley-VCH. doi:10.1002/14356007.a06_483). The term "molecular weight" refers to the mass of a molecule and is calculated as the sum of the relative atomic masses of each constituent element multiplied by the number of atoms of that element in the molecular formula. The term Kilodalton (kDa) refers to the unified atomic mass unit or Dalton (symbol: u, or Da or AMU), which is a standard unit of mass that quantifies mass on an atomic or molecular scale (atomic mass). One unified atomic mass unit is approximately the mass of one nucleon (either a single proton or neuron) and is numerically equivalent to 1 g/mol.

However, apart from perchlorate the methods of the present invention are also suitable for the reduction of other water soluble contaminants as described elsewhere herein. "Water soluble contaminants" are chemical substances (also called solute) which have the ability to dissolve in a solvent. In particular water soluble contaminants are chemicals substances able to dissolve in water. Some ionic compounds (salts) dissolve in water, because of the attraction between positive and negative charges. For example, a salt's positive ions (e.g. $Ag^+$) attract the partially negative oxygens in $H_2O$. Likewise, the salt's negative ions (e.g. $Cl^-$) attract the partially positive hydrogens in $H_2O$. Therefore an ionic contaminant (like perchlorate) may be water-soluble and can be found in milk. Example of the water soluble contaminants that could be additionally depleted from the milk using the process and method described herein are, for example diethanolamin, triethanolamin and other surfactans, bromide, and chlorate. Specifically, the methods of the present invention are suitable for the depletion of chlorate and/or bromide as described elsewhere herein.

In accordance with step (a) of the processes for the manufacture of perchlorate depleted milk described elsewhere herein, the perchlorate containing milk and/or milk assumed to contain perchlorate as defined elsewhere herein is subjected to nanofiltration to obtain a perchlorate depleted retentate fraction and a perchlorate containing permeate fraction of said milk defined elsewhere herein, i.e. the perchlorate penetrates through the nanofiltration membrane into the permeate fraction. As a consequence, the perchlorate-depleted milk defined elsewhere herein is retained in the retentate fraction. The term "subjected to nanofiltration" as used in the context of the present invention refers to the fact that nanofiltration is applied to said perchlorate containing milk and/or milk assumed to contain perchlorate for decontaminating unwanted impurities, specifically perchlorate.

As described herein, nanofiltration (NF) is a relatively recent membrane filtration known to those skilled in the art. Membrane filtration processing as applied in the context of the present invention refers to a technique that allows the concentration and separation of substances with the use of pressure and specially designed semi-permeable membranes. In general, particles are separated on the basis of their molecular size and shape and concentration, depending on the product properties e.g. pH, ionic strength, viscosity, surface activity, chemical and physical characteristics. A semipermeable membrane is a type of biological or synthetic, polymeric membrane that will allow certain molecules or ions to pass through it by diffusion or occasionally by more specialized processes. How the membrane is constructed to be selective in its permeability will determine the rate and the permeability. Nanofiltration is typically performed with a concentration factor K=about X to about X NF which is a generally known process. The concentration factor K refers to the volumetric ratio of the liquid fed to the filtration to the retentate, and it is defined by the following formula: K=feed (L)/retentate (L). Accordingly, a factor K may be K=1.93 (K=50000 kg feed/25842 kg retentate) when using predetermined parameters as defined elsewhere herein.

In particular, nanofiltration is a type of membrane processing that covers molecular weight values of 100 to 1000 Daltons (Dairy Processing Handbook, Tetra Pak Processing Systems AB, published 2015, Revision 1). The separation between solute and solvent occurs by diffusion of the molecules of the solvent, driven mainly by transmembrane pressure. According to the present invention, nanofiltration, when applied to milk as defined herein, gives a minimum reduction of perchlorate of at least 40%, preferably of at least 45% without the need for further testing. In addition, value-determining substances such as lactose (0.342297 kDa) are retained in the retentate, while not valuable compounds like perchlorate diethanolamine, triethanolamine, bromide and chlorate are additionally depleted from the retentate fraction.

In the context of the processes for the manufacture of the perchlorate depleted milk or the process for the manufacture of a milk-based infant formula according to the present invention, a step of nanofiltration is employed to obtain a perchlorate-depleted retentate fraction as defined elsewhere herein. In the context of the invention, said nanofiltration step to obtain a perchlorate depleted retentate fraction makes use of a nanofiltration membrane. According to the methods or processes described herein, various types of nanofiltration membranes configurations are suitable that provide the properties described in the context of the present invention. Non limiting examples of nanofiltration membrane configurations applied in this respect include tubular, spiral wound, hollow fiber, flat sheet, plate and frame, or modular configurations. The transmembrane pressure (maximum operating pressure) during nanofiltration can be up to 800 psi (54.8 bar). The maximum operating temperature can be up to 50° C. (122° F.).

In this respect, the nanofiltration membrane can be made out of various polymers that are used for separations, including, but not limited to plastic membrane, polysulfone, polyethersulfone, polyamide, polyvinylidene fluoride (PVDF), charged PVDF nylon, polytetrafluoroethylene (PTFE), polypropylene, or any mixture of the above polymers. Materials that are commonly used include for example polyethylene terephthalate or metals such as aluminum. Preferably, in the context of the present invention the nanofiltration membrane is made out of polyamide or is polyamide-coated.

According to the invention, the nanofiltration membrane is able to deplete perchlorate (0.09944 kDa) from the perchlorate containing milk and/or the milk assumed to contain perchlorate described elsewhere herein. In particular, the perchlorate will pass through the membrane, leaving a retentate fraction depleted in perchlorate and a permeate fraction containing perchlorate. The nanofiltration membrane may operate at a pH range from about 3 to 10 when continuously operated, and at a pH range from about 1 to 11.5, when short term cleaning is applied. The free chlorine concentration tolerated by said membrane is, under continuous operation, of 20 ppm, while when short term cleaning is applied the tolerated concentration of free hydrogen peroxide is of 1000 ppm (under certain conditions, the presence of free Hydrogen peroxide can cause premature membrane failure). In particular, the nanofiltration membrane used in the context of the present invention is characterized in that it depletes at least 40%, preferably at least 45% from perchlorate containing milk by a nanofiltration step as specified elsewhere herein. The nanofiltration membrane is particularly able to deplete perchlorate from the milk at the pH value and conductivity characteristic of milk, i.e. preferably at a pH value between 5 and 9, more preferred at a pH between 6 and 8. The term pH as used herein refers to the measure of how acidic or alkaline a substance is. pH is a scale of acidity or in other words a measure of the concentration of protons ($H^+$) in a solution. The conductivity is suggested between 3 and 7 of the filtered material.

The term "Electrical conductivity" as used herein refers to the measure of a material's ability to allow the transport of an electric charge. Electrical conductivity is measured in siemens per meter, it is the ratio of the current density to the electric field strength. It is equivalent to the electrical conductance measured between opposite faces of a 1-metre cube of the material under test. The symbol for electrical conductivity is κ (kappa), and also σ (sigma) or γ (gamma). Electrical conductance is an electrical phenomenon where a material contains movable particles with electric charge (such as electrons), which can carry electricity. When a difference of electrical potential is placed across a conductor, its electrons flow, and an electric current appears. A conductor such as a metal has high conductivity, and an insulator like glass or a vacuum has low conductivity. A semiconductor has a conductivity that varies widely under different conditions. Electrical conductivity is the reciprocal (or inverse) of electrical resistivity. In sum, according to the present invention, a pH value between 6 and 8 and a conductivity between 4.5-6.5 mS/cm are preferred.

The nanofiltration membrane of the invention may have a negative membrane charge at the values of pH and conductivity given above. By adding the milk described elsewhere herein, the nanofiltration membrane gives a minimum reduction of perchlorate of at least 40%, preferably at least 45% in the above mentioned process without the need for further testing.

The Nanofiltration membrane may also have a negative membrane tension with neutral solution. In particular, the nanofiltration membrane according to the invention does not comprise cellulose fleece, glass fibre fleece, or ceramic. Also quaternary ammonium compounds should not be present on the nanofiltration membrane. As used herein, a nanofiltration membrane refers to a membrane which is suitable for nanofiltration. i.e. a nanofiltration membrane used in this respect has a molecular weight cut-off of between 100 Da and 1000 Da, preferably between 100 and 800 Da. More preferred, in the context of the present invention the nanofiltration membrane has a molecular weight cut-off about or below 500 Da. "About" means in this respect that the cut-off may vary by 5%, but also includes the concrete number, e.g., about 500 Da includes 500 Da. More preferred, the nanofiltration membrane has a molecular weight cut-off between 100 and 500 Da. Even more preferred, the nanofiltration membrane has a molecular weight cut-off between 100 and 300 Da. Still more preferred, the nanofiltration membrane has a molecular weight cut-off between 100 and 250 Da. It also further preferred that the nanofiltration membrane has a molecular weight cut-off between 150 and 500 Da. The molecular weight cut-off or MWCO refers to the lowest molecular weight solute (in Daltons) in which 90% of the solute is retained by the membrane, or the molecular weight of the molecule that is 90% retained by the membrane.

Furthermore, according to the present invention the nanofiltration membrane is preferably negatively charged. In the context of the present invention, negatively charged membranes are membranes or materials comprising negatively charged carriers, like in plastic membrane (PP, PA, CA, PS, PES). Said negatively charged carriers are usually COOH/$SO_3H$ groups or any carrier able to attract or retain positively charged ions. According to the method of the present invention, the nanofiltration membrane used allows particles with a molecular mass of more than about 100 Dalton to be retained in the retentate fraction defined elsewhere herein. Further, the nanofiltration membrane used according to the present invention retains monovalent salts. According to the invention, nanofiltration membrane used in the context of the present invention is characterized in that it depletes at least 40%, preferably at least 45% perchlorate from perchlorate containing milk and/or the milk assumed to contain perchlorate by a nanofiltration step as specified elsewhere herein. The perchlorate will pass through the membrane, leaving a retentate fraction depleted in perchlorate and a permeate fraction containing perchlorate.

As a non-limiting example, the nanofiltration membrane used in the processes of the present invention is a Filmtec NF DuPont membrane (FILMTEC™ Membrane, The Dow Chemical Company), or a membrane that has similar filtration characteristics, see Example 1. The FILMTEC™ membrane is specified by the manufacturer as a durable membrane designed to reject organics with a molecular weight above 200 while passing monovalent salts. As another non-limiting examples, the nanofiltration membrane used in the processes of the present invention can be a NFS (TFC 100-250 Da, Synder® Filtration), NFX (TFC 150-300 Da, Synder® Filtration), NFW (TFC 300-500 Da, Synder® Filtration) or NFG (TFC 600-800 Da, Synder® Filtration), or membranes that have similar filtration characteristics, see Example 2. Hence, in the context of the processes for the manufacture of a perchlorate depleted milk according to the present invention the used nanofiltration membrane can preferably be defined as a membrane having a molecular weight cut-off between 100 and 800 Da and a lactose rejection of at least 60% in a 2% lactose solution at 110 PSI (760 kPa) operating pressure and 77° F. (25° C.), a magnesium sulfate rejection of at least 50% in a 2,000 ppm MgSo4 solution at 110 PSI (760 kPa) operating pressure and 77° F. (25° C.) and a sodium chloride rejection of at least 10% in a 2,000 ppm NaCl solution at 110 PSI (760 kPa) operating pressure and 77° F. (25° C.). More preferred, the used nanofiltration membrane can be defined as a membrane having a molecular weight cut-off between 100 and 500 Da and a lactose rejection of at least 98.5% in a 2% lactose solution at 110 PSI (760 kPa) operating pressure and 77° F. (25° C.), a magnesium sulfate rejection of at least 97% in a 2,000 ppm MgSo4 solution at 110 PSI (760 kPa) operating pressure and 77° F. (25° C.) and a sodium chloride rejection of at least 20% in a 2,000 ppm NaCl solution at 110 PSI (760 kPa) operating pressure and 77° F. (25° C.). Even more preferred, the used nanofiltration membrane can be defined as a membrane having a molecular weight cut-off between 100 and 300 Da and a lactose rejection of at least 99% in a 2% lactose solution at 110 PSI (760 kPa) operating pressure and 77° F. (25° C.), a magnesium sulfate rejection of at least 99% in a 2,000 ppm MgSo4 solution at 110 PSI (760 kPa) operating pressure and 77° F. (25° C.) and a sodium chloride rejection of at least 40% in a 2,000 ppm NaCl solution at 110 PSI (760 kPa) operating pressure and 77° F. (25° C.). Still more preferred, the used nanofiltration membrane can be defined as a membrane having a molecular weight cut-off between 100 and 250 Da and a lactose rejection of at least 99.5% in a 2% lactose solution at 110 PSI (760 kPa) operating pressure and 77° F. (25° C.), a magnesium sulfate rejection of at least 99.5% in a 2,000 ppm MgSo4 solution at 110 PSI (760 kPa) operating pressure and 77° F. (25° C.) and a sodium chloride rejection of at least 50% in a 2,000 ppm NaCl solution at 110 PSI (760 kPa) operating pressure and 77° F. (25° C.).

In the context of the processes for the manufacture of the perchlorate depleted retentate fraction of the present invention, it is further envisaged that the used nanofiltration membrane is characterized by lactose and protein rejection in one nanofiltration step as defined elsewhere herein for the conduction of predetermined process parameters, which is fully applicable for specifying the used nanofiltration membrane. In addition, the used nanofiltration membrane can be characterized by magnesium rejection by at least 80% and/or calcium rejection by at least 90% as defined elsewhere herein for the conduction of predetermined process parameters, which is fully applicable for specifying the used nanofiltration membrane. In addition, the used nanofiltration membrane can be further characterized by depleting at least 40% of the contained chlorate and/or at least 30% of the contained bromide in one nanofiltration step as defined elsewhere herein for the conduction of predetermined process parameters, which is fully applicable for specifying the used nanofiltration membrane. In addition, the used nanofiltration membrane can be further characterized by in that it depletes at least 40%, preferable at least 45% of the contained perchlorate as defined elsewhere herein for the conduction of predetermined process parameters, which is fully applicable for specifying the used nanofiltration membrane. In addition, the used nanofiltration membrane can be characterized by an up to 40% reduced content of sodium and/or potassium as defined elsewhere herein for the conduction of predetermined process parameters, which is fully applicable for specifying the used nanofiltration membrane.

Figure 4:
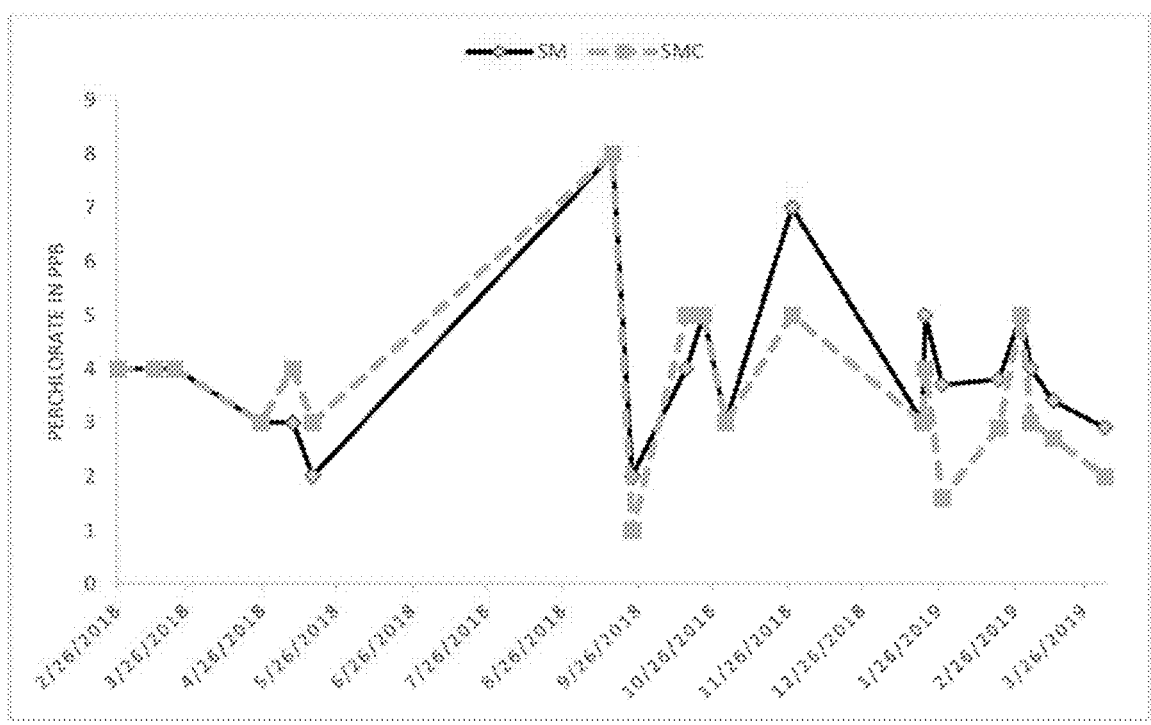
FIG. 4 depicts various measurements of the perchlorate content in skim milk (SM, dry mass of about 9.2%) and skim milk concentrate (SMC, dry mass of about 18.4%) before and after conducting nanofiltration.
Figure 5:
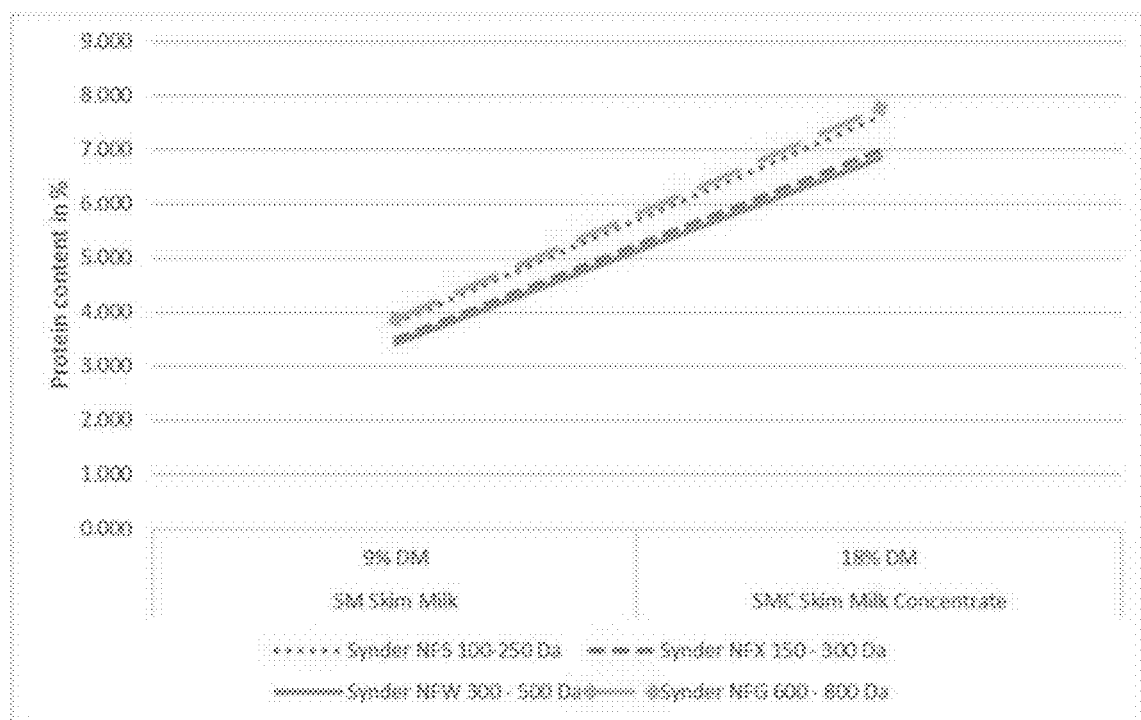
FIG. 5 shows the content of perchlorate (A), chlorate (B), bromide (C), lactose (D) and protein (E) in skim milk before and after doubling the dry mass content by nanofiltration.

As described herein, the processes for the manufacture of perchlorated milk in the context of the present invention can be applied to various types of perchlorate containing milk, such as skim milk and perchlorate containing whey (see Examples 1 and 2 and FIGS. 4-6). Hence, the present invention also refers to a process for the manufacture of a perchlorate depleted skim milk or perchlorate depleted whey (from said perchlorate containing skim milk or whey), comprising the steps as described elsewhere herein. As defined elsewhere herein perchlorate containing skim milk contains 2 ppb or more than 2 ppb perchlorate when the dry mass of the skim milk is between about 8% and about 10% as defined elsewhere herein. As defined elsewhere herein perchlorate depleted skim milk contains less than 2 ppb perchlorate when the dry mass of the skim milk is between about 8% and about 10%. As defined elsewhere herein perchlorate containing whey contains 2 ppb or more than 2 ppb perchlorate when the dry mass of the whey is between about 5% and about 7%. As defined elsewhere herein perchlorate depleted whey contains less than 2 ppb perchlorate when the dry mass of the whey is between about 5% and about 7%.

When subjecting perchlorate containing skim milk and/or skim milk assumed to contain perchlorate to a nanofiltration step to obtain a perchlorate depleted retentate fraction and a perchlorate containing permeate fraction of said skim milk, it is particularly envisaged to make use of a nanofiltration membrane having a molecular weight cut-off about or below 500 Daltons as defined elsewhere herein. More preferred, the used nanofiltration membrane has a molecular weight cut-off between 100 and 500 Daltons. More preferred, the nanofiltration membrane has a molecular weight cut-off between 100 and 300 Da. Still more preferred, the nanofiltration membrane has a molecular weight cut-off between 100 and 250 Da. It also further envisaged that the nanofiltration membrane has a molecular weight cut-off between 150 and 500 Da. More preferred, the used nanofiltration membrane can be defined as a membrane having a molecular weight cut-off between 100 and 300 Da and a lactose rejection of at least 99% in a 2% lactose solution at 110 PSI (760 kPa) operating pressure and 77° F. (25° C.), a magnesium sulfate rejection of at least 99% in a 2,000 ppm MgSo4 solution at 110 PSI (760 kPa) operating pressure and 77° F. (25° C.) and a sodium chloride rejection of at least 40% in a 2,000 ppm NaCl solution at 110 PSI (760 kPa) operating pressure and 77° F. (25° C.). In addition, the nanofiltration membrane used for the manufacture of perchlorate depleted skim milk is envisaged to be characterized by lactose and protein rejection as defined elsewhere herein. Specifically, at least 95% of lactose and protein is maintained when conducting one nanofiltration step as defined elsewhere herein. Accordingly, in the context of the present invention, the lactose and protein content of said skim milk after applying the nanofiltration technique described herein is maintained by 95%, more preferred by 95.5%, even more preferred by 96%, still more preferred by 96.5%, still more preferred by 97.0%, still more preferred by 97.5%, still more preferred by 98%, still more preferred by 98.5%, still more preferred by 99%, still more preferred by 99.2%, still more preferred by 99.3%, still more preferred by 99.4%, still more preferred by 99.5%, still more preferred by 99.6%, still more preferred by 99.7%, still more preferred by 99.8%, still more preferred by 99.9%. Most preferred the lactose and protein content of said milk after applying the nanofiltration technique described elsewhere herein is maintained by 100%. When referring to the fact that lactose and protein contained in perchlorate containing skim milk and/or skim milk assumed to contain perchlorate are maintained means that the content of lactose and protein is determined in perchlorate containing milk (before nanofiltration) and after in perchlorate depleted milk subjected to nanofiltration (i.e. after nanofiltration) both refer to the same dry mass, i.e. the dry mass of the perchlorate depleted milk is recalculated to the dry mass of the perchlorate containing milk (before nanofiltration), and the lactose and protein content values are compared as described elsewhere herein. When subjecting perchlorate containing skim milk and/or skim milk assumed to contain perchlorate to a nanofiltration step to obtain a perchlorate depleted retentate fraction and a perchlorate containing permeate fraction of said skim milk, it is further envisaged that the nanofiltration membrane is characterized by magnesium rejection by at least 80% and/or calcium rejection by at least 90%, preferably by a nanofiltration step as defined herein. In the context of the present invention, a magnesium rejection by at least 80% means that 20% or less than 20% of the contained magnesium is depleted by the nanofiltration membrane used in the context of the invention, i.e. one nanofiltration step. A magnesium rejection by at least 80% means that 20% or less than 20% of the contained magnesium is depleted by the nanofiltration membrane used in the context of the invention, i.e. one nanofiltration step. Thus, the rejection of at least 80% means that the contained magnesium is rejected by 80, 85%, 90%, 95%, 97%, 98%, 99% or even 100%. Hence, it is envisaged that the applied nanofiltration membrane rejects at least 80% of the contained magnesium in one nanofiltration step. More preferred at least 85%, even more preferred at least 90%, still more preferred at least 90%, still more preferred at least 92%, still more preferred at least 95%, still more preferred at least 97%, still more preferred at least 98%, still more preferred at least 99% of the contained magnesium is rejected in one nanofiltration step. Most preferred 100% of the contained magnesium is rejected in one nanofiltration step. A calcium rejection by at least 90% means that 10% or less than 10% of the contained calcium is depleted by the nanofiltration membrane used in the context of the invention, i.e. one nanofiltration step. Thus, the rejection of at least 90% means that the contained calcium is rejected by 90%, 92%, 95%, 97%, 98%, 99% or even 100%. Hence, it is envisaged that the applied nanofiltration membrane rejects at least 90% of the contained calcium in one nanofiltration step. More preferred at least 92% of the contained calcium is rejected in one nanofiltration step. Even more preferred at least 95%, still more preferred at least 97%, still more preferred at least 98%, still more preferred at least 99% of the contained calcium is rejected in one nanofiltration step. Most preferred 100% of the contained calcium is rejected in one nanofiltration step. When referring to the fact that at least 80% of the magnesium and/or 90% of the calcium contained in perchlorate containing skim milk and/or skim milk assumed to contain perchlorate are rejected means that the content of magnesium and/or calcium is determined in perchlorate containing milk (before nanofiltration) and after in perchlorate depleted milk subjected to nanofiltration (i.e. after nanofiltration) both having the same dry mass, and these values are compared as described elsewhere herein. When subjecting perchlorate containing skim milk and/or skim milk assumed to contain perchlorate to a nanofiltration step to obtain a perchlorate depleted retentate fraction and a perchlorate containing permeate fraction of said skim milk, it is further envisaged that the nanofiltration membrane is characterized in that it depletes at least 50% of the contained chlorate and/or at least 45% of the contained bromide, preferably by a nanofiltration step as defined herein. In the context of the present invention, a depletion of at least 50% of the contained chlorate means that 50% or less than 50% of the contained chlorate is rejected by the nanofiltration membrane used in the context of the invention, i.e. one nanofiltration step. Thus, the depletion of at least 50% means that the contained chlorate is depleted by 50%, 55%, 60%, 65%, 70%, 75%, 80%, 85%, 90%, 95%, 97%, 98%, 99% or even 100%. Hence, it is envisaged that the applied nanofiltration membrane depletes at least 50% of the contained chlorate in one nanofiltration step. More preferred at least 55%, even more preferred at least 60%, still more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained chlorate is depleted in one nanofiltration step. Most preferred 100% of the contained chlorate is depleted in one nanofiltration step. In the context of the present invention, a depletion of at least 45% of the contained bromide means that 45% or less than 45% of the contained bromide is rejected by the nanofiltration membrane used in the context of the invention, i.e. one nanofiltration step. Thus, the depletion of at least 45% means that the contained bromide is depleted by 45%, 50%, 55%, 60%, 65%, 70%, 75%, 80%, 85%, 90%, 95%, 97%, 98%, 99% or even 100%. Hence, it is envisaged that the applied nanofiltration membrane depletes at least 45% of the contained bromide in one nanofiltration step. More preferred at least 50%, even more preferred 55%, even more preferred at least 60%, even more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained bromide is depleted in one nanofiltration step. Most preferred 100% of the contained bromide is depleted in one nanofiltration step. When subjecting perchlorate containing skim milk and/or skim milk assumed to contain perchlorate to a nanofiltration step to obtain a perchlorate depleted retentate fraction and a perchlorate containing permeate fraction of said skim milk, it is further envisaged that the nanofiltration membrane is characterized in that it depletes at least 45% of the contained perchlorate, preferably by a nanofiltration step as defined herein. In the context of the present invention, a depletion of at least 45% of the contained perchlorate means that 55% or less than 55% of the contained perchlorate is rejected by the nanofiltration membrane used in the context of the invention, i.e. one nanofiltration step. Thus, the depletion of at least 45% means that the contained perchlorate is depleted by 45%, 50,%, 55%, 60%, 65%, 70%, 75%, 80%, 85%, 90%, 95%, 97%, 98%, 99% or even 100%. Hence, it is envisaged that the applied nanofiltration membrane depletes at least 45% of the contained perchlorate in one nanofiltration step. More preferred at least 50%, even more preferred at least 55%, still more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained perchlorate is depleted in one nanofiltration step. Most preferred 100% of the contained perchlorate is depleted in one nanofiltration step. When subjecting perchlorate containing skim milk and/or skim milk assumed to contain perchlorate to a nanofiltration step to obtain a perchlorate depleted retentate fraction and a perchlorate containing permeate fraction of said skim milk, it is particularly preferred that the used nanofiltration membrane has a molecular weight cut-off between 100 and 300 Da. In this respect it is particularly envisaged that the used nanofiltration membrane is characterized by lactose rejection, protein, magnesium and/or calcium rejection as described elsewhere herein. It is further particularly envisaged that the used nanofiltration membrane is characterized in that it depletes at least 50% of the contained chlorate and/or at least 50% of the contained bromide as described elsewhere herein. It is further particularly envisaged that the used nanofiltration membrane is characterized in that it depletes as least 55% of the contained perchlorate in one nanofiltration step.

When subjecting perchlorate containing whey and/or whey assumed to contain perchlorate to a nanofiltration step to obtain a perchlorate depleted retentate fraction and a perchlorate containing permeate fraction of said whey, it is particularly envisaged to make use of a nanofiltration membrane having a molecular weight cut-off about or below 500 Daltons as defined elsewhere herein. More preferred, the used nanofiltration membrane has a molecular weight cut-off between 100 and 500 Daltons. More preferred, the nanofiltration membrane has a molecular weight cut-off between 100 and 500 Da. Even more preferred, the nanofiltration membrane has a molecular weight cut-off between 100 and 300 Da. Still more preferred, the nanofiltration membrane has a molecular weight cut-off between 100 and 250 Da. It also further envisaged that the nanofiltration membrane has a molecular weight cut-off between 150 and 500 Da. More preferred, the used nanofiltration membrane can be defined as a membrane having a molecular weight cut-off between 100 and 250 Da and a lactose rejection of at least 99.5% in a 2% lactose solution at 110 PSI (760 kPa) operating pressure and 77° F. (25° C.), a magnesium sulfate rejection of at least 99.5% in a 2,000 ppm MgSo4 solution at 110 PSI (760 kPa) operating pressure and 77° F. (25° C.) and a sodium chloride rejection of at least 50% in a 2,000 ppm NaCl solution at 110 PSI (760 kPa) operating pressure and 77° F. (25° C.). In addition, the nanofiltration membrane used for the manufacture of perchlorate depleted whey is envisaged to be characterized by lactose and protein rejection as described elsewhere herein. Accordingly, in the context of the present invention, the lactose and protein content of said whey after applying the nanofiltration techniques described herein is maintained by 95%, more preferred by 95.5%, even more preferred by 96%, still more preferred by 96.5%, still more preferred by 975%, still more preferred by 97.5%, still more preferred by 98%, still more preferred by 98.5%, still more preferred by 99%, still more preferred by 99.2%, still more preferred by 99.3%, still more preferred by 99.4%, still more preferred by 99.5%, still more preferred by 99.6%, still more preferred by 99.7%, still more preferred by 99.8%, still more preferred by 99.9%. Most preferred the lactose and protein content of said milk after applying the nanofiltration technique described elsewhere herein is maintained by 100%. When referring to the fact that lactose and protein contained in perchlorate containing whey and/or whey assumed to contain perchlorate are maintained means that the content of lactose and protein is determined in perchlorate containing whey (before nanofiltration) and after in perchlorate depleted whey subjected to nanofiltration (i.e. after nanofiltration) both having the same dry mass, and these values are compared as described elsewhere herein. When subjecting perchlorate containing whey and/or whey assumed to contain perchlorate to a nanofiltration step to obtain a perchlorate depleted retentate fraction and a perchlorate containing permeate fraction of said whey, it is further envisaged that the nanofiltration membrane characterized by magnesium and calcium rejection. The term "rejection" as used in this regard has been specified elsewhere herein. Specifically, in the context of the present invention, the magnesium and calcium content of said whey after applying the nanofiltration technique described herein is maintained by 95%, more preferred by 95.5%, even more preferred by 96%, still more preferred by 96.5%, still more preferred by 975%, still more preferred by 97.5%, still more preferred by 98%, still more preferred by 98.5%, still more preferred by 99%, still more preferred by 99.2%, still more preferred by 99.3%, still more preferred by 99.4%, still more preferred by 99.5%, still more preferred by 99.6%, still more preferred by 99.7%, still more preferred by 99.8%, still more preferred by 99.9%. Most preferred the magnesium and calcium content of said whey after applying the nanofiltration technique described elsewhere herein is maintained by 100%. When referring to the fact that magnesium and calcium contained in perchlorate containing whey and/or whey assumed to contain perchlorate are maintained means that the content of magnesium and calcium is determined in perchlorate containing whey (before nanofiltration) and after in perchlorate depleted whey subjected to nanofiltration (i.e. after nanofiltration) both having the same dry mass, and these values are compared as described elsewhere herein. When subjecting perchlorate containing whey and/or whey assumed to contain perchlorate to a nanofiltration step to obtain a perchlorate depleted retentate fraction and a perchlorate containing permeate fraction of said whey, it is further envisaged that the nanofiltration membrane is characterized in that it depletes at least 40% of the contained chlorate and/or at least 30% of the contained bromide, preferably by a nanofiltration step as defined herein. In the context of the present invention, a depletion of at least 40% of the contained chlorate means that 60% or more than 60% of the contained chlorate is rejected by the nanofiltration membrane used in the context of the invention, i.e. one nanofiltration step. Thus, the depletion of at least 40% means that the contained chlorate is depleted by 40%, 45%, 50%, 55%, 60%, 65%, 70%, 75%, 80%, 85%, 90%, 95%, 97%, 98%, 99% or even 100%. Hence, it is envisaged that the applied nanofiltration membrane depletes at least 40% of the contained chlorate in one nanofiltration step. More preferred at least 45%, even more preferred at least 50%, still more preferred at least 55%, still more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained chlorate is depleted in one nanofiltration step. Most preferred 100% of the contained chlorate is depleted in one nanofiltration step. A depletion of at least 30% of the contained bromide means that 70% or more than 70% of the contained chlorate is rejected by the nanofiltration membrane used in the context of the invention, i.e. one nanofiltration step. Thus, the depletion of at least 30% means that the contained bromide is depleted by 30%, 35%, 40%, 45%, 50%, 55%, 60%, 65%, 70%, 75%, 80%, 85%, 90%, 95%, 97%, 98%, 99% or even 100%. Hence, it is envisaged that the applied (predetermined) process parameters deplete at 30% of the contained bromide is depleted in one nanofiltration step. More preferred at least 35%, even more preferred at least 40%, still more preferred at least 45%, still more preferred at least 50%, still more preferred at least 55%, still more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained bromide is depleted in one nanofiltration step. Most preferred 100% of the contained bromide is depleted in one nanofiltration step. When subjecting perchlorate containing whey and/or whey assumed to contain perchlorate to a nanofiltration step to obtain a perchlorate depleted retentate fraction and a perchlorate containing permeate fraction of said whey, it is further envisaged that the nanofiltration membrane is characterized in that it depletes at least 40% of the contained perchlorate, preferably by a nanofiltration step as defined herein. In the context of the present invention, a depletion of at least 40% of the contained perchlorate means that 60% or less than 60% of the contained perchlorate is rejected by the nanofiltration membrane used in the context of the invention, i.e. one nanofiltration step. Thus, the depletion of at least 40% means that the contained perchlorate is depleted by 40%, 45%, 50%, 55%, 60%, 65%, 70%, 75%, 80%, 85%, 90%, 95%, 97%, 98%, 99% or even 100%. Hence, it is envisaged that the applied nanofiltration membrane depletes at least 40% of the contained perchlorate in one nanofiltration step. More preferred at least 45%, even more preferred at least 50%, still more preferred at least 55%, still more preferred at least 60%, still more preferred at least 65%, still more preferred at least 70%, still more preferred at least 75%, still more preferred at least 80%, still more preferred at least 85%, still more preferred at least 90%, still more preferred at least 92%, still more preferred at least 95%, still more preferred at least 97%, still more preferred at least 98%, still more preferred at least 99% of the contained perchlorate is depleted in one nanofiltration step. Most preferred 100% of the contained perchlorate is depleted in one nanofiltration step. When subjecting perchlorate containing whey and/or whey assumed to contain perchlorate to a nanofiltration step to obtain a perchlorate depleted retentate fraction and a perchlorate containing permeate fraction of said whey, it is particularly preferred that the used nanofiltration membrane has a molecular weight cut-off between 100 and 250 Da. In this respect it is particularly envisaged that the used nanofiltration membrane is characterized by lactose rejection, protein, magnesium and/or calcium rejection. It is further particularly envisaged that the nanofiltration membrane is characterized in that it depletes at least 60% of the contained chlorate and/or at least 60% of the contained bromide. It is further particularly envisaged that the nanofiltration membrane is characterized in that it depletes as least 65% of the contained perchlorate in one nanofiltration step.

In the context of the present invention, the nanofiltration process may comprise crossflow filtration, which is a type of filtration (using a particular unit operation). As used herein, "cross-flow" membrane filtration is used to mean a class of filtration that typically produces two effluent streams, permeate and retentate. Cross-flow filtration gets its name because the majority of the feed flow travels tangentially across the surface of the filter, rather than into the filter. The nanofiltration process may be a continuous process. The nanofiltration process according to the invention can be used for feeds containing a high proportion of small particle size solids (where the permeate is of most value) because solid material can quickly block (blind) the filter surface. In particular in the context of the invention such feed is milk as defined elsewhere herein. The main driving force of nanofiltration process according to the present invention is transmembrane pressure. Transmembrane pressure is a measure of pressure difference between two sides of a membrane. With crossflow filtration the tangential motion of the bulk of the fluid across the membrane causes trapped particles on the filter surface to be rubbed off. This means that a crossflow filter can operate continuously at relatively high solids loads without blinding.

As described herein, the milk containing perchlorate and/or milk assumed to contain perchlorate subjected to nanofiltration results in perchlorate-depleted retentate fraction and a perchlorate containing permeate fraction of said milk. The "permeate fraction" as described in the context of the invention designates the liquid passing through the nanofiltration membrane, while the "retentate fraction" or "concentrate" or "skim milk concentrate" or "whey concentrate" designates the fraction not passing through the nanofiltration membrane. The term "permeate" therefore is used to mean, in relation to a filtration process, that liquid product of milk filtration which contains only those milk components that are able to pass through the filtration membrane. In other words, the permeate fraction is therefore remaining fluid that has become enriched with compounds that could permeate the membrane. The "retentate" is used to mean, in relation to a filtration process, the product of milk filtration which is the concentrated milk feed and which contains all the components typically found in milk but with an increased solids mass percentage (as compared to the original milk) protein, fat, and minerals (ash). As used herein, "cross-flow" membrane filtration is used to mean a class of filtration that typically produces two effluent streams, permeate and retentate. In particular, the retentate fraction of the present invention will contain, after nanofiltration, less than 4 ppb perchlorate when the retentate fraction has a dry mass of about 16% to about 20%, i.e. the retentate fraction is perchlorate depleted. Therefore, the retentate fraction may comprise perchlorate-depleted milk as defined elsewhere herein. The retentate fraction also contains lactose. Contrary thereto, the permeate fraction of the present invention will contain, after nanofiltration, 2 ppb or more than 2 ppb perchlorate, i.e. is perchlorate containing. The permeate fraction typically comprises a perchlorate-containing aqueous salt solution.

In accordance with the processes for the manufacture of perchlorate depleted milk of the present invention, the retentate fraction and/or the permeate fraction as defined herein and obtained by the process described herein are analyzed to evaluate the perchlorate content. Methods for analyzing or measuring the content of perchlorate in a solution are known to those skilled in the art and are also described elsewhere herein. For example, evaluation of the perchlorate contained in the permeate and/or retentate fractions can be carried out by using ion chromatography-suppressed conductivity (IC-CD) and/or ion chromatography-electrospray mass spectrometry (IC-MS), as described inter alia by Kirk et al. 2003, (Kirk et al. 2003 Environ. Sci. Technol., 37 (21), pp 4979-4981). Evaluation of perchlorate content of the permeate and/or retentate fraction can also be measured by using hydrophilic interaction chromatography-tandem mass spectrometry, as described by the patent application CN106324144. In the context of the present invention, evaluation of perchlorate content may be carried out before and/or after the step of nanofiltration.

In the context of the processes for the manufacture of perchlorate depleted milk of the present invention, it is also envisioned to further process the perchlorate depleted retentate fraction defined elsewhere herein. In particular said retentate fraction is contacted with a perchlorate free solvent. In the context of the invention a perchlorate free solvent refers to any solvent applicable to liquefy or dilute milk and includes, but is not limited to, water, perchlorate depleted milk, a buffer, a mixture or any combination thereof. As described elsewhere herein, the milk diluted with any perchlorate free solvent comprises at least 2.5% dry mass in total. In the context of the present invention, the "perchlorate-free solvent" is preferably water. As described elsewhere herein, the perchlorate free solvent is preferably also free of chlorate and bromide. In some embodiments, after mixing of the retentate fraction with the perchlorate free solvent, the retentate fraction is subjected to (a) further step(s) of nanofiltration, as mentioned also elsewhere herein. In the context of the present invention, subsequent nanofiltration steps may include the same or varied parameters, which may dependent on the origin of the perchlorate containing milk or milk assumed to contain perchlorate subjected to nanofiltration. Further, it is envisaged in this regard to repeat the nanofiltration step(s) as often as necessary to reach a final concentration/level of perchlorate, i.e. as often as to reduce the perchlorate content down to less than 2 ppb, when the retentate fraction has a dry mass between about 5% and about 13% as defined elsewhere herein, preferably about 6% or about 9%. Preferably the perchlorate content is reduced to less than 1.8 ppb, more preferred less than 1.5 ppb, even more preferred less than 1.3 ppb, still more preferred less than 1.0 ppb, still more preferred less than 0.9, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the retentate fraction has a dry mass between about 5% and about 13%, preferably about 6% or about 9%. Most preferred the perchlorate retentate fraction comprises no detectable amount of perchlorate after said contacting with the perchlorate-free solvent and subsequent repeated nanofiltration steps. It is also envisaged in this respect to repeat the nanofiltration step(s) as often as necessary to reach a final concentration/level of chlorate and/or bromide, i.e. as often as to reduce the chlorate and/or bromide content down to less than 2 ppb, when the retentate fraction has a dry mass between about 5% and about 13% as defined elsewhere herein, preferably about 6% or about 9%. Preferably the perchlorate content is reduced to less than 1.8 ppb, more preferred less than 1.5 ppb, even more preferred less than 1.3 ppb, still more preferred less than 1.0 ppb, still more preferred less than 0.9, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the retentate fraction has a dry mass between about 5% and about 13%, preferably about 6% or about 9%.

Preferably, the nanofiltration step as described herein is repeated at least one time, more preferred between two and fifty times. Hence, in the context of the present invention, it is envisaged that the perchlorate containing milk and/or milk assumed to contain perchlorate according to the present invention is subjected to 1, 2, 3, 4, 5, 6, 7, 8, 9, 10, 15, 20, 25, 30, 35, 40, 45, 50 or even more nanofiltration steps in total. Most preferably, the nanofiltration step is repeated until the most preferred value of less than 0.001 ppb perchlorate is reached. Similarly, the nanofiltration step is repeated until the most preferred value of less than 0.001 ppb chlorate and/or bromide is reached. Depending on the volume to be filtered and the desired filtration rate, one nanofiltration step can comprise usage of several nanofiltration membranes/modules stacked in parallel. According to the Examples provided herein, one nanofiltration step may comprises about 30 nanofiltration membranes/modules stacked in parallel (see Example 1). According to the processes of the present invention, the nanofiltration steps can be consecutively applied to further deplete or reduce perchlorate from the retentate fraction obtained in the previous nanofiltration step. Obviously, the amount of nanofiltration steps applied depends on the initial amount/content of perchlorate in the milk subjected to nanofiltration, i.e. the more perchlorate is contained in the milk or is assumed to be contained in the milk subjected to nanofiltration, the more nanofiltration steps are applied.

In some embodiments, the perchlorate depleted retentate fraction obtained by the processes of the present invention, i.e. by subjecting the perchlorate containing milk and/or the milk assumed to contain perchlorate to a nanofiltration step, is contacted with a perchlorate free solvent and additionally or alternatively to a further nanofiltration step subjected to one or more steps of diafiltration. Diafiltration is a dilution process that involves removal or separation of components (permeable molecules like salts, small proteins, solvents etc.) of a solution based on their molecular size by using micro-molecule permeable filters in order to obtain pure solution. Preferably, the retentate fraction is being mixed with a perchlorate free solvent and subjected to continuous diafiltration. In particular, the retentate fraction may be subjected to one or more diafiltration cycles wherein the nanofiltration retentate is combined with a diafiltration liquid, which is the perchlorate free solvent defined elsewhere herein, and the combination of nanofiltration retentate and diafiltration liquid is subjected to subsequent nanofiltration and concentration steps. In this regard, there are several ways to perform diafiltration. In continuous diafiltrations, the diafiltration liquid is added to the nanofiltration sample feed reservoir, preferably at the same rate as filtrate is generated. In discontinuous diafiltration, the solution is first diluted and then concentrated back to the starting volume. This process is then repeated until the required depletion of perchlorate from the nanofiltration feed is obtained. In the present process it is preferred to use the continuous diafiltration operation mode. The "diafiltration volume" (or "diavolume") is defined herein as the volume of filtrate recovered in comparison to the amount of NF-retentate. When the volume of filtrate removed is equal to the volume of retentate when diafiltration operations began, 1 diavolume has been processed. Accordingly, the term "diafiltration cycle" refers to the processing, i.e. removal and collection, of 1 diavolume from the NF sample feed reservoir. Typically, the permeate fractions obtained in all diafiltration cycles and/or with the complete diafiltration volume are collectively subjected to the upstream concentration step(s). Suitable liquids to be used as the diafiltration liquid in accordance with the present invention include water and aqueous solutions. Preferably the diafiltration liquid is water or an aqueous fraction of the milk.

In accordance with a particularly preferred embodiment of the invention, the diafiltration liquid does not comprise the perchlorate containing permeate fraction. In some embodiments, the permeate fraction derived from the first nanofiltration step is not subjected to further processing. In fact, in the context of the present invention the permeate fraction derived after nanofiltration applied as first purification method is preferably discarded. Hence, in preferred embodiments, the permeate fraction obtained from the nanofiltration step is not further used in the process for the manufacture of perchlorate-depleted milk and/or for the manufacture of a milk based infant formula (base).

However, in some embodiments the permeate fraction can be further processed and may afterwards return into the manufacture process. For example, the permeate can be subjected to reverse osmosis. Reverse osmosis is a water treatment method traditionally known for removing salt from seawater or for purifying drinking water by membrane processing defined elsewhere herein. In the context of the present invention, reverse osmosis can be applied to the permeate fraction described herein, in order to obtain clean water from said permeate fraction. Said clean water can be used for other application, e.g. can be used as washing water or as perchlorate free solvent which is applied in the context of the invention as described elsewhere herein. In some further embodiments the permeate can be subjected to diafiltration.

In the context of the present invention, the described process for the manufacture of perchlorate depleted milk, i.e. the described nanofiltration steps and techniques, can also be applied as intermediate step of reverse osmosis.

The present invention also envisages to further process the perchlorate depleted retentate fraction obtained by the processes for the manufacture of perchlorate depleted milk as defined elsewhere herein. It may be desirable to dry or otherwise condense the retentate fraction(s) that have been obtained by the methods described herein for ease of preservation, storage and transportation. To this aim, processing of the retentate fraction may comprise admixing, drying, and evaporation. Preferably, the obtained retentate fraction is processed to powder, i.e. is evaporated to dryness. The drying process may be carried out by any method known to those skilled in the art, preferably by spray drying or freeze drying. "Spray-drying" refers to any process involving breaking up liquid mixtures into small droplets (atomization) and rapidly removing solvent from the mixture in a spray-drying apparatus where there is a strong driving force for evaporation of solvent from the droplets. Spray-drying in accordance with the present invention can suitably be done by spraying the perchlorate-depleted retentate into an atmosphere at a temperature of 120-230° C., with a product temperature of about 60-90° C. "Freeze-drying" or "lyophilization" is any method of cold-drying, which involves the freezing of the UF retentate liquid followed by the removal or evaporation, by sublimation, of the water. "Admixing" refers to the process of mixing the retentate fraction with a drink or food product. Admixing may for example include mixing of the retentate fraction with whey powder, lactose, mineral and trace elements, vitamins, fat mixtures, special protein compositions, fatty acids, starch and amino acids, just to name some. The further processing of the perchlorate depleted retentate fraction may also include supplementation with a suitable fat source and other necessary components, such as trace elements and vitamins, set by the EU food legislation.

However, according to the processes of the invention, the perchlorate depleted retentate fraction obtained can also be further processed the way it is diluted by a diluting agent. The diluting agent may include water and minerals, or purified water, or milk. The diluting agent must be suitable for consumption. Preferably, the diluting agent is an agent upon which addition to the retentate fraction will result in perchlorate depleted milk as defined elsewhere herein.

Hence, in another aspect the present invention also relates to a perchlorate depleted retentate fraction produced by the processes or methods for the manufacture of a perchlorate depleted milk as described elsewhere herein. In this respect it is envisaged that said perchlorate depleted retentate fraction produced by the processes or methods for the manufacture of a perchlorate depleted milk is characterized by a perchlorate content of less than 4 ppb when the dry mass of the retentate fraction is between about 10% and about 26%. Preferably it is envisaged that said perchlorate depleted retentate fraction produced by the processes or methods for the manufacture of a perchlorate depleted milk is characterized by a perchlorate content of less than 4 ppb when the dry mass of the retentate fraction is between about 10% and about 14%. It is further envisaged that said perchlorate depleted retentate fraction produced by the processes or methods for the manufacture of a perchlorate depleted milk is characterized by a perchlorate content of less than 4 ppb when the dry mass of the retentate fraction is between about 16% and about 20%. It is further envisaged that said perchlorate depleted retentate fraction produced by the processes or methods for the manufacture of a perchlorate depleted milk is characterized by a perchlorate content of less than 4 ppb when the dry mass of the retentate fraction is between about 16% and about 26%. In the context of the present invention a dry mass between about 10% and about 26% of the perchlorate depleted retentate fraction produced by the processes or methods for the manufacture of a perchlorate depleted milk includes a dry mass about 10%, about 11%, about 12%, about 13%, about 14%, about 15%, about 16%, about 17%, about 18%, about 19%, about 20%, about 21%, about 22%, about 23%, about 24%, about 25% or about 26% and any number in between. A dry mass of milk between about 10% and about 26% as used in the context of the present invention further includes the concrete numbers of 10%, 11%, 12%, 13%, 14%, 15%, 16%, 17%, 18%, 19%, 20%, 21%, 22%, 23%, 24%, 25% or 26% and any number in between. Preferably, in the context of the present invention the perchlorate depleted retentate fraction produced by the processes or methods for the manufacture of a perchlorate depleted milk is characterized by a perchlorate content of less than 4 ppb when the dry mass is between about 10% and about 14%, i.e. about 10%, about 11%, about 12%, about 13% or about 14% or any number in between. Equally preferred, in the context of the present invention the perchlorate depleted retentate fraction produced by the processes or methods for the manufacture of a perchlorate depleted milk is characterized by a perchlorate content of less than 4 ppb when the dry mass is between 10% and 14%, i.e. 10%, 11%, 12%, 13% or 14% or any number in between. Equally preferred, in the context of the present invention the perchlorate depleted retentate fraction produced by the processes or methods for the manufacture of a perchlorate depleted milk is characterized by a perchlorate content of less than 4 ppb when the dry mass is between about 16% and about 20%, i.e. about 16%, about 17%, about 18%, about 19% or about 20%. Equally preferred, in the context of the present invention the perchlorate depleted retentate fraction produced by the processes or methods for the manufacture of a perchlorate depleted milk is characterized by a perchlorate content of less than 4 ppb when the dry mass is between 16% and 20%, i.e. 16%, 17%, 18%, 19% or 20% or any number in between. Equally preferred, in the context of the present invention the perchlorate depleted retentate fraction produced by the processes or methods for the manufacture of a perchlorate depleted milk is characterized by a perchlorate content of less than 4 ppb when the dry mass is between about 16% and about 26%, i.e. about 16%, about 17%, about 18%, about 19% or about 20%, about 21%, about 22%, about 23%, about 24%, about 25% or about 26% or any number in between. Equally preferred, in the context of the present invention the perchlorate depleted retentate fraction produced by the processes or methods for the manufacture of a perchlorate depleted milk is characterized by a perchlorate content of less than 4 ppb when the dry mass is between 16% and 26%, i.e. 16%, 17%, 18%, 19%, 20% 21%, 22%, 23%, 24%, 25% or 26% or any number in between. Preferably, in the context of the present invention a perchlorate depleted retentate fraction produced by the processes or methods for the manufacture of a perchlorate depleted milk containing less than 4 ppb of perchlorate when the dry mass of the perchlorate depleted retentate fraction is between about 10% and about 14% as defined herein is whey. Preferably, said perchlorate depleted retentate fraction containing less than 4 ppb of perchlorate when the dry mass of the said perchlorate depleted retentate fraction is between about 10% and about 14% is produced from perchlorate containing milk and/or milk assumed to contain perchlorate containing 2 ppb or more than 2 ppb perchlorate when the dry mass is between about 5% and about 7%, preferably whey. Preferably, in the context of the present invention a perchlorate depleted retentate fraction produced by the processes or methods for the manufacture of a perchlorate depleted milk containing less than 4 ppb of perchlorate when the dry mass of the perchlorate depleted retentate fraction is between about 16% and about 20% as defined herein is skim milk. Preferably, said perchlorate depleted retentate fraction containing less than 4 ppb of perchlorate when the dry mass of the said perchlorate depleted retentate fraction is between about 16% and about 20% is produced from perchlorate containing milk and/or milk assumed to contain perchlorate containing 2 ppb or more than 2 ppb perchlorate when the dry mass is between about 8% and about 10%, preferably skim milk. Preferably, in the context of the present invention a perchlorate depleted retentate fraction produced by the processes or methods for the manufacture of a perchlorate depleted milk containing less than 4 ppb of perchlorate when the dry mass of the perchlorate depleted retentate fraction is between about 16% and about 26% as defined herein is whole milk. Preferably, said perchlorate depleted retentate fraction containing less than 4 ppb of perchlorate when the dry mass of the said perchlorate depleted retentate fraction is between about 16% and about 26% is produced from perchlorate containing milk and/or milk assumed to contain perchlorate containing 2 ppb or more than 2 ppb perchlorate when the dry mass is between about 8% and about 13%, preferably whole milk. A content of less than 4 ppb of perchlorate when the dry mass of the produced retentate fraction is between about 10% and about 26% as defined elsewhere herein means in this respect that the content of perchlorate is preferably less than 4.0 ppb, more preferred less than 3.5 ppb, even more preferred less than 3.0 ppb, still more preferred less than 2.5 ppb, still more preferred less than 2.0 ppb, still more preferred less than 1.8 ppb, still more preferred less than 1.5 ppb, still more preferred less than 1.3 ppb, still more preferred less than 1.0 ppb, still more preferred less than 0.9 ppb, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the dry mass of the of the retentate fraction is between about 10% and about 26% as defined elsewhere herein, preferably about 12% or about 18%. Most preferred, said perchlorate depleted retentate fraction produced by the processes or methods for the manufacture of a perchlorate depleted milk comprises no detectable amount of perchlorate. Said perchlorate depleted retentate fraction produced by the processes or methods for the manufacture of a perchlorate depleted milk is preferably characterized by a chlorate content of less than 4 ppb and/or a bromide content of less than 4 ppb when the dry mass of the retentate fraction is between about 10% and about 26% as defined elsewhere herein, preferably about 12% or about 18%. Less than 4 ppb means in this respect that the content of chlorate and/or bromide is preferably less than 4.0 ppb, more preferred less than 3.5 ppb, even more preferred less than 3.0 ppb, still more preferred less than 2.5 ppb, still more preferred less than 2.0 ppb, still more preferred less than 1.8 ppb, still more preferred less than 1.5 ppb, still more preferred less than 1.3 ppb, still more preferred less than 1.0 ppb, still more preferred less than 0.9 ppb, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the dry mass of the of the retentate fraction produced by the processes or methods for the manufacture of a perchlorate depleted milk is between about 10% and about 26% as defined elsewhere herein, preferably about 12% or about 18%. Most preferred, said chlorate and/or bromide depleted retentate fraction comprises no detectable amount of chlorate and/or bromide.

It is further envisaged in this respect that the perchlorate depleted retentate fraction produced by the processes or methods for the manufacture of a perchlorate depleted milk as described elsewhere herein is characterized by a sodium content of 300 to 700 mg/kg and/or a potassium content of 1200 to 2400 mg/kg when the dry mass of the retentate fraction is between about 10% and about 26% as defined elsewhere herein, preferably about 12% or about 18%. Preferably, the sodium content of said perchlorate depleted retentate fraction produced by the processes or methods for the manufacture of a perchlorate depleted milk is between 400 and 650 mg/kg when the dry mass of the retentate fraction is between about 10% and about 26% as defined elsewhere herein, preferably about 12% or about 18%. It is also preferred that the potassium content of said perchlorate depleted retentate fraction produced by the processes or methods for the manufacture of a perchlorate depleted milk is between 1700 and 2200 mg/kg when the dry mass of the retentate fraction is between about 10% and about 26% as defined elsewhere herein, preferably about 12% or about 18%. It is further envisaged in this respect that the perchlorate depleted retentate fraction produced by the processes or methods for the manufacture of a perchlorate depleted milk as described elsewhere herein is characterized by a magnesium content of 80 to 300 mg/kg and/or a calcium content of 350 to 2500 mg/kg when the dry mass of the retentate fraction is between about 10% and about 26% as defined elsewhere herein, preferably about 12% or about 18%. Preferably, the magnesium content of said perchlorate depleted retentate fraction produced by the processes or methods for the manufacture of a perchlorate depleted milk is between 100 and 250 mg/kg when the dry mass of the retentate fraction is between about 10% and about 26% as defined elsewhere herein, preferably about 12% or about 18%. It is also preferred that the calcium content of said perchlorate depleted retentate fraction produced by the processes or methods for the manufacture of a perchlorate depleted milk is between 400 and 2400 mg/kg when the dry mass of the retentate fraction is between about 10% and about 26% as defined elsewhere herein, preferably about 12% or about 18%. If the perchlorate depleted retentate fraction produced by the processes or methods for the manufacture of a perchlorate depleted milk is produced from perchlorate containing skim milk, it is particularly envisaged that the calcium content of the perchlorate depleted retentate fraction is between 900 and 2500 mg/kg, preferably, between 1900 and 2400 mg/kg when the dry mass of the retentate fraction is between about 16% and about 20% as defined elsewhere herein, preferably about 18%. If the perchlorate depleted retentate fraction produced by the processes or methods for the manufacture of a perchlorate depleted milk is produced from perchlorate containing whey, it is particularly envisaged that the calcium content of the perchlorate depleted retentate fraction is between 350 and 1200 mg/kg, preferably, between 400 and 800 mg/kg when the dry mass of the retentate fraction is between about 10% and about 14%, preferably about 12%. If the perchlorate depleted retentate fraction produced by the processes or methods for the manufacture of a perchlorate depleted milk is produced from perchlorate containing whole milk, it is particularly envisaged that the calcium content of the perchlorate depleted retentate fraction is between 900 and 2500 mg/kg, preferably, between 1900 and 2400 mg/kg when the dry mass of the retentate fraction is between about 16% and about 26% as defined elsewhere herein, preferably about 20%.

In the context of the present invention, it is particularly envisaged that the perchlorate depleted retentate fraction produced by the processes or methods for the manufacture of a perchlorate depleted milk of the present invention is characterized by a perchlorate content of less than 4 ppb when the dry mass of the milk is between about 16% and about 20% as defined elsewhere herein, preferably about 18%. In this respect it is particularly envisaged that said perchlorate depleted retentate fraction is characterized by a chlorate content of less than 4 ppb and/or a bromide content of less than 4 ppb when the dry mass of the milk is between about 16% and about 20% as defined elsewhere herein, preferably about 18%. It is further envisaged that said perchlorate depleted retentate fraction is characterized by a sodium content of 300 to 700 mg/kg, preferably of 400 to 650 mg/kg and/or a potassium content of 1200 to 2400 mg/kg, preferably of 1700 to 2200 mg/kg when the dry mass of the retentate fraction is between about 16% and about 20% as defined elsewhere herein, preferably about 18%. It is further envisaged that said perchlorate depleted retentate fraction is characterized by a magnesium content of 80 to 300 mg/kg, preferably of 100 to 250 mg/kg and/or a calcium content of 900 to 2500 mg/kg, preferably of 1900 to 2400 mg/kg when the dry mass of the retentate fraction is between about 16% and about 20% as defined elsewhere herein, preferably about 18%.

In the context of the present invention, it is particularly envisaged that the perchlorate depleted retentate fraction produced by the processes or methods for the manufacture of a perchlorate depleted milk of the present invention is characterized by a perchlorate content of less than 4 ppb when the dry mass of the milk is between about 16% and about 26% as defined elsewhere herein, preferably about 20%. In this respect it is particularly envisaged that said perchlorate depleted retentate fraction is characterized by a chlorate content of less than 4 ppb and/or a bromide content of less than 4 ppb when the dry mass of the milk is between about 16% and about 26%. It is further envisaged that said perchlorate depleted retentate fraction is characterized by a sodium content of 300 to 700 mg/kg, preferably of 400 to 650 mg/kg and/or a potassium content of 1200 to 2400 mg/kg, preferably of 1700 to 2200 mg/kg when the dry mass of the retentate fraction is between about 16% and about 26% as defined elsewhere herein, preferably about 20%. It is further envisaged that said perchlorate depleted retentate fraction is characterized by a magnesium content of 80 to 300 mg/kg, preferably of 100 to 250 mg/kg and/or a calcium content of 900 to 2500 mg/kg, preferably of 1900 to 2400 mg/kg when the dry mass of the retentate fraction is between about 16% and about 26% as defined elsewhere herein, preferably about 20%.

In the context of the present invention, it is particularly envisaged that the perchlorate depleted retentate fraction produced by the processes or methods for the manufacture of a perchlorate depleted milk of the present invention is characterized by a perchlorate content of less than 4 ppb when the dry mass of the milk is between about 10% and about 14% as defined elsewhere herein, preferably about 12%. In this respect it is particularly envisaged that said perchlorate depleted retentate fraction is characterized by a chlorate content of less than 4 ppb and/or a bromide content of less than 4 ppb when the dry mass of the milk is between about 10% and about 14% as defined elsewhere herein, preferably about 12%. In this respect it is further particularly envisaged that said perchlorate depleted retentate fraction is characterized by a chlorate content of less than 4 ppb and/or a bromide content of less than 4 ppb when the dry mass of the milk is between about 10% and about 14% as defined elsewhere herein, preferably about 12%. It is further envisaged that said perchlorate depleted retentate fraction is characterized by a sodium content of 300 to 700 mg/kg, preferably of 400 to 650 mg/kg and/or a potassium content of 1200 to 2400 mg/kg, preferably of 1700 to 2200 mg/kg when the dry mass of the retentate fraction is between about 10% and about 14% as defined elsewhere herein, preferably about 12%. It is further envisaged that said perchlorate depleted retentate fraction is characterized by a magnesium content of 80 to 300 mg/kg, preferably of 100 to 250 mg/kg and/or a calcium content of 350 to 1200 mg/kg, preferably of 400 to 800 mg/kg when the dry mass of the retentate fraction is between about 10% and about 14% as defined elsewhere herein, preferably about 12%.

It is further envisaged in this respect that the perchlorate depleted retentate fraction produced by the processes or methods for the manufacture of a perchlorate depleted milk is characterized by an at least 40%, preferably 45% reduced content of perchlorate compared to the content of perchlorate in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. "Recalculated to the dry mass of the perchlorate containing milk and/or milk assumed to contain perchlorate" means in this respect that the dry mass of the perchlorate depleted retentate fraction refers to the initial dry mass content of the perchlorate containing milk and/or milk assumed to contain perchlorate, i.e. they are considered to have the same dry mass. For example if the perchlorate content in the perchlorate containing milk and/or milk assumed to contain perchlorate having a dry mass of about 9% and the perchlorate depleted retentate fraction having a dry mass of about 18% is the same, the perchlorate depleted retentate fraction is characterized by an 50% reduced content of perchlorate when referring to the initial dry mass of in the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by no change in the content of lactose and protein compared to the content of lactose and protein in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by an at least 40% reduced content of chlorate and/or an at least 30% reduced content of bromide compared to the content of chlorate and bromide in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by an at least 80% maintained content of magnesium and/or an at least 90% maintained content of calcium compared to the content of magnesium and calcium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by an up to 40% reduced content of sodium and/or potassium compared to the content of content of sodium and/or potassium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration.

In the context of the present invention, it is particularly envisaged that the perchlorate depleted retentate fraction produced by the processes or methods for the manufacture of a perchlorate depleted milk of the present invention is characterized by an at least 45% reduced content of perchlorate compared to the content of perchlorate in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by no change in the content of lactose and protein compared to the content of lactose and protein in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by an at least 50% reduced content of chlorate and/or an at least 45% reduced content of bromide compared to the content of chlorate and bromide in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that the perchlorate depleted retentate fraction produced by the processes or methods for the manufacture of a perchlorate depleted milk is characterized by an at least 80% maintained content of magnesium and/or an at least 90% maintained content of calcium compared to the content of magnesium and calcium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that the perchlorate depleted retentate fraction produced by the processes or methods for the manufacture of a perchlorate depleted milk is characterized by an up to 40% reduced content of sodium and/or potassium compared to the content of content of sodium and/or potassium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration.

In the context of the present invention, it is also particularly envisaged that the perchlorate depleted retentate fraction produced by the processes or methods for the manufacture of a perchlorate depleted milk of the present invention is characterized by an at least 55% reduced content of perchlorate compared to the content of perchlorate in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further particularly envisaged that said perchlorate depleted retentate fraction produced by the processes or methods for the manufacture of a perchlorate depleted milk of the present invention is characterized by no change in the content of lactose and protein compared to the content of lactose and protein in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further particularly envisaged that said perchlorate depleted retentate fraction produced by the processes or methods for the manufacture of a perchlorate depleted milk of the present invention is characterized by no change of magnesium and/or calcium compared to the content of magnesium and calcium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further particularly envisaged that said perchlorate depleted retentate fraction produced by the processes or methods for the manufacture of a perchlorate depleted milk of the present invention is characterized by an at least 50% reduced content of chlorate and/or an at least 45% reduced content of bromide compared to the content of chlorate and bromide in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk of the present invention is characterized by an up to 25% reduced content of sodium and/or potassium. Said perchlorate depleted retentate fraction is preferably produced from perchlorate containing skim milk and/or skim milk assumed to contain perchlorate.

In the context of the present invention, it is particularly envisaged that the perchlorate depleted retentate fraction produced by the processes or methods for the manufacture of a perchlorate depleted milk of the present invention is characterized by an at least 40% reduced content of perchlorate compared to the content of magnesium and calcium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by no change in the content of lactose and protein compared to the content of lactose and protein in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by no change in the content of magnesium and/or calcium compared to the content of magnesium and calcium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk is characterized by an at least 40% reduced content of chlorate and/or an at least 30% reduced content of bromide compared to the content of chlorate and bromide in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that the perchlorate depleted retentate fraction produced by the processes or methods for the manufacture of a perchlorate depleted milk is characterized by an up to 30% reduced content of sodium and/or potassium compared to the content of content of sodium and/or potassium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration.

In the context of the present invention, it is also particularly envisaged that the perchlorate depleted retentate fraction produced by the processes or methods for the manufacture of a perchlorate depleted milk of the present invention is characterized by an at least 65% reduced content of perchlorate compared to the content of perchlorate in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further particularly envisaged that said perchlorate depleted retentate fraction produced by the processes or methods for the manufacture of a perchlorate depleted milk of the present invention is characterized by no change in the content of lactose and protein compared to the content of lactose and protein in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration It is further particularly envisaged that said perchlorate depleted retentate fraction produced by the processes or methods for the manufacture of a perchlorate depleted milk of the present invention is characterized by no change of magnesium and/or calcium compared to the content of magnesium and calcium in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further particularly envisaged that said perchlorate depleted retentate fraction produced by the processes or methods for the manufacture of a perchlorate depleted milk of the present invention is characterized by an at least 60% reduced content of chlorate and/or an at least 60% reduced content of bromide compared to the content of chlorate and bromide in the perchlorate containing milk and/or milk assumed to contain perchlorate when the dry mass of the perchlorate depleted retentate fraction is recalculated to the dry mass of the perchlorate containing milk and/or milk assumed to contain perchlorate subjected to nanofiltration. It is further envisaged that said perchlorate depleted retentate fraction produced by the processes or methods for the manufacture of a perchlorate depleted milk of the present invention is characterized by an up to 5% reduced content of sodium and/or potassium. Said perchlorate depleted retentate fraction is preferably produced from perchlorate containing whey and/or whey assumed to contain perchlorate.

In the context of the present invention, the perchlorate depleted retentate fraction produced by the processes or methods for the manufacture of a perchlorate depleted milk as defined herein is preferably produced from perchlorate containing skim milk or whey and/or skim milk or whey assumed to contain perchlorate. In this respect it is further envisaged that the perchlorate depleted retentate fraction defined herein is produced from perchlorate containing organic milk and/or organic milk assumed to contain perchlorate. More preferred, the perchlorate depleted retentate fraction defined herein is produced from perchlorate containing organic skim milk or organic whey and/or organic skim milk assumed to contain perchlorate or organic whey assumed to contain perchlorate. The understanding of term "organic" when used in combination with milk has been defined elsewhere herein. Hence, the perchlorate depleted retentate fraction produced by the processes or methods for the manufacture of a perchlorate depleted milk preferably refers to an organic perchlorate depleted retentate fraction.

In the context of the present invention it is also envisaged that the perchlorate depleted retentate fraction as defined elsewhere herein is used for the manufacture of milk-based products. The term "milk-based product" refers to food consisting between 1 and 100% of milk, milk components or milk single ingredients as defined or named elsewhere herein. Preferably, said milk-based products are yogurt, clabbered milk, curd and cheese, to name some, that can be produced from the perchlorate depleted retentate fraction of the present invention. Preferably, said milk products or milk-based products produced from the perchlorate depleted retentate fraction of the present invention are organic milk products or organic milk-based products.

In sum, the present invention also refers to the use of a nanofiltration membrane as defined elsewhere herein for the manufacture of a perchlorate depleted retentate fraction. Also provided by the present invention is the use of a nanofiltration membrane as defined elsewhere herein for the manufacture of a milk-based infant formula base comprising perchlorate depleted milk containing less than 2 ppb perchlorate when the dry mass of the milk is between about 8% and about 10% as defined elsewhere herein, preferably about 9%. Also provided is a process for the manufacture of an infant formula base, comprising the step of composing an infant formula base from the perchlorate depleted retentate fraction as defined herein.

Also provided is the use of a nanofiltration membrane as defined elsewhere herein for the manufacture of a milk-based infant formula comprising perchlorate depleted milk containing less than 2 ppb perchlorate when the dry mass of the milk is between about 8% and about 10% as defined elsewhere herein, preferably about 9%. The present invention also relates to a method for producing an infant formula base, comprising the step of composing an infant formula base from the perchlorate depleted retentate fraction defined elsewhere herein. Hence, the infant formula base according to the invention comprises a perchlorate depleted retentate fraction comprising less than 4 ppb when the dry mass of the perchlorate depleted retentate fraction is between about 16% and about 20%. Also provided by the present invention is a milk-based infant formula base comprising the perchlorate depleted retentate fraction as defined elsewhere herein.

Figure 3:
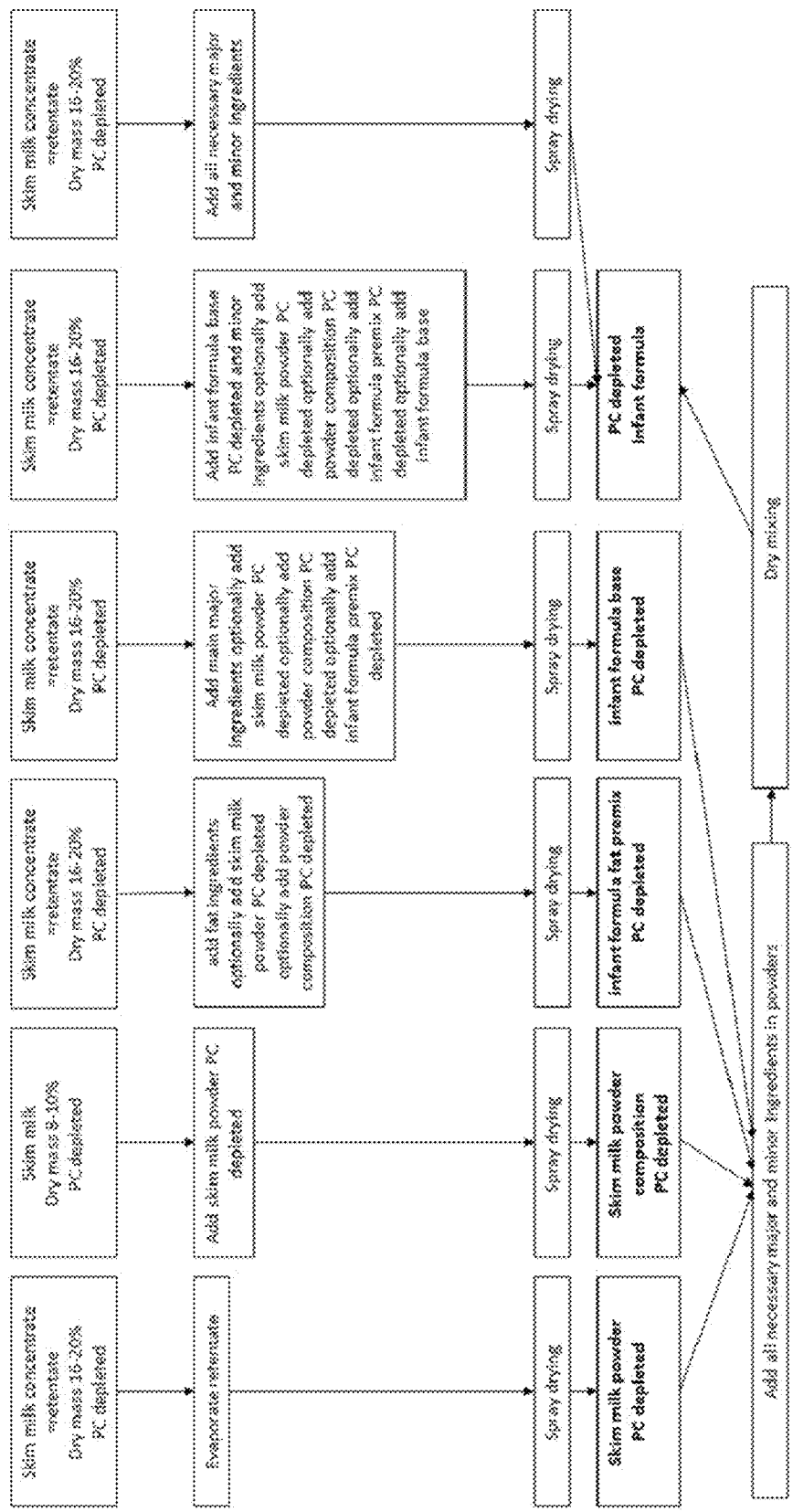
FIG. 3 shows a detailed overview of the workflow applicable for the manufacture of a perchlorate depleted infant formula base and a perchlorate depleted infant formula.

The term "infant formula base" in the context of the present invention refers to a product which is highly similar to human milk, and in which the concentration of different components can be easily adjusted as desired, and in which the concentration of the proteins α-lactalbumin and β-casein in particular can be optimized in an advantageous manner (see FIG. 3). Hence, "infant formula base" of the present invention is preferably a milk-based infant formula base. The infant formula base of the present invention can undergo further manufacturing processes for the production of a milk-based infant formula described elsewhere herein.

For example, the milk-based infant formula base may be supplemented by casein, by acid casein, caseinate, or fats. Where appropriate, minerals and oligoelements may be further added to the infant formula base obtained by the processes of the invention. The infant formula base may be further supplemented. Infant formulas may comprise partially and extensively hydrolyzed proteins in or only intact proteins. Ideally, any infant formula, including PHF, should simulate human milk as closely as possible. In human milk, there are two main proteins, whey protein and casein. Whey protein typically composes about 60% of the protein in human milk, while casein typically composes about 40% (Lonnerdal et al. 1985, Am. J. Clin. Nutr. 42:1299-1317). The milk based infant formula obtained may be only whey protein. The milk-based infant formula obtained may be casein based. The infant formula base may be further supplemented with a suitable fat source and other necessary components, such as trace elements and vitamins. In sum, the milk-based infant formula achieved is an infant formula which meets the requirements set by the EU food legislation.

According to the present invention, the infant formula base may be dried to partial hydrolysates or into a powder by spray-drying. Suitable drying techniques applicable in this respect are described elsewhere herein. For example, spray-dried hydrolysate can be incorporated into an infant formula. Hence, in some embodiments, the retentate fraction obtained and processed according to the methods described herein can be used as it is and/or blended with other ingredients to make an infant formula. In other embodiments, liquid partial hydrolysates can be concentrated by evaporation and then spray dried. Again, the spray-dried hydrolysate can be incorporated into an infant formula. The infant formula having the described depleted perchlorate content can be formulated using any of the methods of infant formulation known in the art. The infant formula base according to the present invention is formulated to an infant formula having an energy content of about 60 to about 80 kcal/100 ml as consumed, preferably of about 62 to 75 kcal/100 ml as consumed.

In another aspect, the present invention also relates to a process for the manufacture of a milk-based infant formula comprising perchlorate depleted milk manufactured according to the processes described herein, i.e. containing less than 2 ppb perchlorate when the dry mass of the perchlorated depleted milk is between about 8% and about 10%, comprising the process of any one of the preceding claims. It is further envisaged that said process for the manufacture of a milk-based infant formula comprising perchlorate depleted milk manufactured according to the processes described herein, comprises perchlorate depleted milk containing less than 2 ppb chlorate and/or less than 2 pbb bromide when the dry mass of the perchlorated depleted milk is between about 8% and about 10% as defined elsewhere herein. The manufacture milk-based infant formula can also be spray dried or processed to powder as described elsewhere herein. Hence, the present invention also refers to the use of a perchlorate depleted retentate fraction produced according to the processes of the present invention for the manufacture of a milk-based infant formula. Said perchlorate depleted milk or retentate fraction can be obtained by any of the process for the manufacture of a perchlorate depleted milk of the present invention described elsewhere herein. Also provided by the present invention is a milk-based infant formula comprising the perchlorate depleted retentate fraction as defined elsewhere herein and/or the milk-based infant formula base defined elsewhere herein. In one embodiment, the milk based infant formula may be produced by the method as described in Example 3. In the context of the present invention the infant formula is essentially milk-based, i.e. comprises the perchlorate depleted milk defined elsewhere herein after being subjected to the methods of the present invention used to deplete perchlorate. In particular, the milk based infant formula is obtained by a process comprising the step of (a) subjecting perchlorate containing milk and/or milk assumed to contain perchlorate to a nanofiltration step to obtain a perchlorate depleted retentate fraction and a perchlorate containing permeate fraction of said milk. Optionally, said process comprises (b) evaluating the perchlorate content in said retentate fraction and/or said permeate fraction. Afterwards, the milk-based infant formula is produced by (c) supplying a manufacturing process of a milk-based infant formula with said perchlorate depleted retentate fraction. The milk-based infant formula is therefore manufactured using the perchlorate depleted retentate fraction defined elsewhere herein. "Supplying a manufacturing process" mean in this respect that any industrial process for the production of an infant formula known to those skilled in the art can be applied.

The present invention further refers to a milk-based infant formula whose milk-based ingredients consist of the perchlorate depleted retentate fraction as defined elsewhere herein and/or of the milk-based infant formula base as defined elsewhere herein. The term "milk-base ingredients" as used in this respect refers to the total amount of milk components comprised by the perchlorate depleted retentate fraction. Preferably, said milk-based infant formula is spray dried or processed to powder as described elsewhere herein. In other embodiments the milk-based infant formula is liquid.

The term "infant formula" as used in the context of the present invention refers to any composition which can be fed to a newborn or a toddler. According to the invention the term "infant" preferably refers to any child in the age of up to 12 months which is in accordance with Commission Directive 2006/141/EC. Infant formulae' means foodstuffs intended for particular nutritional use by infants during the first months of life and satisfying by themselves the nutritional requirements of such infants until the introduction of appropriate complementary feeding. However, also young children (meaning according to Directive 2006/141/E) children aged between one and three years) already receiving weaning food may be fed by said formula, named 'follow-on formulae', which means foodstuffs intended for particular nutritional use by infants when appropriate complementary feeding is introduced and constituting the principal liquid element in a progressively diversified diet of such infants.

The term "milk-based" refers to the fact that the infant formula comprises between 15 and 40% of milk, especially organic milk defined elsewhere herein, wherein the organic milk has undergone one of the processes for the manufacture of perchlorate depleted milk as described elsewhere herein. The milk-based infant or follow-on formulae is preferably designed for feeding infants under 12 months of age, i.e. is usually prepared for bottle-feeding or cup-feeding from milk powder (mixed with water) or liquid (with or without additional water). Said milk-based infant formula can exemplarily have a composition as shown in any of Tables 4A-E. Since said milk-based formulae are preferably fed to infants under 12 months of age, said infant formula aims at simulating human milk, i.e. its suitability as a complete or partial substitute for human milk in cases where women are unable to feed their child with their own milk or cannot supply enough milk, or when breastfeeding is contraindicated. However, the milk-based infant formula can be part of other foods suitable for consumption by infants, such as milk pudding, fruit puree and milk-cereal puree comprising said milk-based infant formula. Hence, such milk-based infant formula products are also included by the present invention.

In the context of the present invention, the milk-based infant formula can be packed into portions. Preferably, said milk-based infant formula is packed in portions of 11 to 50 g. More preferred, said milk-based infant formula is packed in portions of 11-25 g, even more preferred in portion of 11 to 14 g or 18 to 25 g. Equally preferred, said milk-based infant formula is packed in portions of 300 to 800 g. More preferred, said milk-based infant formula is packed in portions of 500 to 800 g. It is particularly preferred that said infant formula is packed into portions of 500 g, 600 g or 800 g. It is further envisaged that a liquid infant formula is packed in portions of 90 to 1000 ml, preferably of 90-450 ml. It is particularly preferred that said liquid infant formula is packed into portions of 90 ml, 200 ml, 450 ml or 1000 ml.

The present invention also refers to an assortment consisting of at least two infant formulas as defined elsewhere herein. The term "assortment" as used herein refers to a shipping unit, i.e. the arrangement of said infant formulas to be transported and/or purchased. Preferably, said assortment consists of 2 to 200 infant formulas as defined elsewhere herein. More preferred, said assortment consists of 10 to 200 infant formulas as defined elsewhere herein. Equally preferred, said assortment consists of 4 to 48 infant formulas as defined elsewhere herein. More preferred, said assortment consists of 4 to 12 or 12 to 24, preferably 24 infant formulas as defined elsewhere herein. Still more preferred, said assortment consists of 2 to 8 infant formulas as defined elsewhere herein. Still more preferred, said assortment consists of 4 to 8 infant formulas as defined elsewhere herein. Most preferred, said assortment consists of 4 infant formulas as defined elsewhere herein. Equally preferred, said assortment consists of 6 infant formulas as defined elsewhere herein. Equally preferred, said assortment consists of 8 infant formulas as defined elsewhere herein. In this respect it is particular envisaged that an assortment consisting of formulas packed in portions of 500 g, 600 g or 800 g consists of 4 infant formulas. It is further particularly envisaged that an assortment consisting of formulas packed in portions of 11 to 50 g, such as 11-25 g, more preferred 11 to 14 g or 18 to 25 g, consists of 10 to 200 infant formulas. It is further particularly envisaged that an assortment consisting of formulas packed in portions of 200 ml or 100 ml consists of 6 infant formulas. It is further particularly envisaged that an assortment consisting of formulas packed in portions of 450 ml consists of 8 infant formulas. It is further particularly envisaged that an assortment consisting of formulas packed in portions of 90 ml consists of 24 infant formulas. In the context of the present invention it is further particularly envisaged that said assortment is placed on a tray. Said tray is preferably suitable for transporting or storing said assortment. Preferably, said tray is made out of cardboard or wood. It is also envisaged that said assortment placed on said tray is covered with foil, preferably a plastic foil.

As described inter alia in WO2000/030461, infant formulae are usually based predominantly on an amino acid composition similar to that of human milk. Infant formula bases are generally characterized in that a protein composition is prepared by subjecting milk that has not undergone heat treatment or milk that has undergone moderate heat treatment or pasteurization, or microfiltration and bactofugation, to membrane processing as described elsewhere herein, in order to obtain a perchlorate depleted retentate fraction, optionally concentrating the retentate and optionally demineralizing the concentrated retentate for example by electrodialysis as described elsewhere herein. Alternatively, the infant formula can be produced by mixing perchlorate depleted milk powder and dry ingredients together, or by dissolving perchlorate depleted milk powder and dry ingredients in water followed by a spray drying step. In the context of the invention it is preferred that said infant formula does not comprise yoghurt.

The process of the manufacture of the infant formula preferably comprises at least the step of formulating the perchlorate depleted milk of the present invention into a milk-based infant formula. "Formulating" means in this respect that all essential components needed to manufacture said milk-based infant formula are brought together under conditions known to those skilled in the art to result in an eatable formula. Formulating said milk-based infant formula may also comprise diverse follow-up treatments such as diluting, drying and/or sterilizing said formula as described elsewhere herein.

Preferably, said milk-based infant formula comprises perchlorate depleted milk containing less than 2 ppb perchlorate when the dry mass of the milk is between about 8% and about 10%, preferably about 9%. Preferably the milk-based infant formula comprises perchlorate depleted milk containing less than 1.8 ppb, more preferred less than 1.5 ppb, even more preferred less than 1.3 ppb, still more preferred less than 1.0 ppb, still more preferred less than 0.9, still more preferred less than 0.8 ppb, still more preferred less than 0.7 ppb, still more preferred less than 0.6 ppb, still more preferred less than 0.5 ppb, still more preferred less than 0.4 ppb, still more preferred less than 0.3 ppb, still more preferred less than 0.2 ppb, still more preferred less than 0.1 ppb, still more preferred less than 0.09 ppb, still more preferred less than 0.08 ppb, still more preferred less than 0.07 ppb, still more preferred less than 0.06 ppb, still more preferred less than 0.05 ppb, still more preferred less than 0.04 ppb, still more preferred less than 0.03 ppb, still more preferred less than 0.02 ppb, still more preferred less than 0.01 ppb, specifically when the dry mass of the milk is between about 8% and about 10%, preferably about 9%. Most preferred, the milk-based infant formula comprises perchlorate depleted milk containing no detectable amount of perchlorate, i.e. the content of perchlorate has been nearly completely removed. In sum, said milk-based infant formula well complies with the perchlorate content as suggested by EFSA as TDI.

The processes of the present invention may further comprise partial reduction of monovalent salts from the perchlorate depleted retentate, and/or of water soluble contaminants, such as diethanolamine, triethanolamine, bromide and chlorate as described elsewhere herein. Depending on the final product, i.e. the milk-based infant formula or the infant formula base as defined elsewhere herein, nanofiltration may be most efficient way to deplete milk of water soluble contaminants. Demineralization process is commonly used in the dairy and food industry, and it aims to maintain lactose and proteins of the milk while decreasing the mineral content (up to −90%). The Demineralized end product, which can subsequently be crystallized and dried up, is largely used as base ingredient in nutrition for infancy, as a substitute for breast milk. As used herein, the term "demineralization" is used to mean, in relation to a purification process, the removal of ionized minerals and salts (both organic and inorganic) from the retentate fraction. Demineralization of the retentate refers to removal of ions, e.g. calcium and other ions, from the retentate.

A further possible step for the manufacture processes of the present invention is de-ashing, separation of carbohydrates and proteins, or lactose demineralization. As known to the person skilled in the art, the term "de-ashing" refers to a procedure in which interfering inorganic (i.e., ash-forming) components are removed from a sample. In particular, when said sample is milk, as defined elsewhere herein, ash forming compounds comprise minerals. However, also a combination of the above described processes is used to obtain end products with desired specifications and characteristics.

In another aspect, the present invention relates to a system for the manufacture of an infant formula. Said system may contain a device which is able to regulate the perchlorate depletion. In particular, said system may comprise a nanofiltration module that is suitable for subjecting perchlorate containing milk and/or milk assumed to contain perchlorate to a nanofiltration step to obtain a perchlorate depleted retentate fraction and a perchlorate containing permeate fraction of said milk. Preferably, the obtained retentate fraction is characterized by a perchlorate content of less than 4 ppb when the dry mass of the retentate fraction is between about 16% and about 20%. Further, the obtained retentate fraction is characterized by no change in the amount of magnesium, calcium, phosphor, and zinc. In some embodiments, said system may comprise: (a) a milk source, (b) one or more filtration modules, for example, cross-flow filtration modules, which are communicatively connected to the milk source for generating one or more filtration fractions, thereby providing for a retentate fraction and a permeate fraction as defined elsewhere herein, and (c) one or more fluid delivery means connected to each of the cross-flow filtration modules, for creating a sufficient flow of milk through the filtration modules to effect separation of milk fractions and (d) one or more means downstream of each filtration modules for sequentially capturing one or more fractions generated by the filtration module. Optionally, the system can also comprise one or more dilution or drying modules for providing infant formulae with desired specifications and characteristics.

Unless otherwise stated, the following terms used in this document, including the description and claims, have the definitions given below.

Those skilled in the art will recognize, or be able to ascertain, using not more than routine experimentation, many equivalents to the specific embodiments of the invention described herein. Such equivalents are intended to be encompassed by the present invention.

It is to be noted that as used herein, the singular forms "a", "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention.

The term "and/or" wherever used herein includes the meaning of "and", "or" and "all or any other combination of the elements connected by said term".

The term "about" or "approximately" as used herein means within 20%, preferably within 10%, and more preferably within 5% of a given value or range. It includes, however, also the concrete number, e.g., about 20 includes 20.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or "including" or sometimes when used herein with the term "having".

When used herein "consisting of" excludes any element, step, or ingredient not specified in the claim element. When used herein, "consisting essentially of" does not exclude materials or steps that do not materially affect the basic and novel characteristics of the claim.

In each instance herein any of the terms "comprising", "consisting essentially of" and "consisting of" may be replaced with either of the other two terms.

It should be understood that this invention is not limited to the particular methodology, protocols, material, reagents, and substances, etc., described herein and as such can vary. The terminology used herein is for the purpose of describing particular embodiments only, and is not intended to limit the scope of the present invention, which is defined solely by the claims.

All publications cited throughout the text of this specification (including all patents, patent applications, scientific publications, manufacturer's specifications, instructions, etc.) are hereby incorporated by reference in their entirety. Nothing herein is to be construed as an admission that the invention is not entitled to antedate such disclosure by virtue of prior invention. To the extent the material incorporated by reference contradicts or is inconsistent with this specification, the specification will supersede any such material.

EXAMPLES

The following examples illustrate the invention. These examples should not be construed as to limit the scope of this invention. The examples are included for purposes of illustration and the present invention is limited only by the claims.

Example 1: Manufacture of Perchlorate Depleted Milk

Raw milk having a dry matter of about 12% to about 14% was stored at 4° C. Afterwards, raw milk was preheated at 50 to 60° C. and fat was separated at 50 to 60° C. and 4000 rpm to obtain perchlorate containing skim milk with a dry mass of about 8% to about 10% and a fat content of <0.1%. Perchlorate content was measured in 50.000 kg of skimmed milk with a dry mass of exactly 9.2%, and 3 to 5 ppb of perchlorate was detected. After perchlorate content evaluation, perchlorate containing skim milk was pasteurized at 72 to 75° C. for 15 to 30 sec, then cooled down to 20-25° C. and conducted to nanofiltration. 50.000 kg/h of pretreated skim milk was fed on an installation of tangential nanofiltration equipped with a nanofiltration membrane (Filmtec NF DuPont membrane) with an active area of 7.4 m. The nanofiltration unit was equipped with 30 nanofiltration membranes/modules stacked in parallel. 50.000 kg/h skim milk were fed to the nanofiltration unit for 16 hours at a pressure of 40 bar and a temperature of 20-25° C., which led to the production of 25.842 kg skim milk concentrate with a dry mass of 19.35% and a perchlorate content of 3 to 5 ppb, respectively. The respective results are summarized in Tables 1A-C below. Perchlorate containing permeate was discarded. The obtained perchlorate depleted retentate fraction (or skim milk concentrate) was stored at 4° C. and subsequently dried via spray drying to provide skim milk powder depleted of perchlorate or further manufactured to obtain a perchlorate depleted infant formula base (see FIG. 1 and FIG. 2).

TABLE 1A

Skim milk (SM) and skim milk concentrate (SMC) - NF results

| | Unit | SM 9.20% | SMC 21.08% | conc. recalculated Dry mass (DM) to 9.20% | remaining DM in % | reduced by DM in % |
|---|---|---|---|---|---|---|
| concentration | mg/kg | 0.002 | 0 | 0 | | 100.00 |
| Perchlorate | mg/kg | 0.0040 | 0.005 | 0.0022 | 55 | 45.45 |
| Sodium | mg/100 g | 34.2 | 56.10 | 24.48 | 72 | 28.41 |
| Potassium | mg/100 g | 155.6 | 258.10 | 112.64 | 72 | 27.61 |
| Calcium | mg/100 g | 121.3 | 304.90 | 133.07 | 110 | −9.70 |
| Magnesium | mg/100 g | 11 | 23.70 | 10.34 | 94 | 5.97 |

TABLE 1B

Skim milk (SM) and skim milk concentrate (SMC) - NF results

| | Unit | SM 9.20% | SMC 18.63% | conc. recalculated Dry mass (DM) to 9.20% | remaining DM in % | reduced by DM in % |
|---|---|---|---|---|---|---|
| concentration | mg/kg | 0.002 | 0.000 | 0.000 | 100 | 0.00 |
| Perchlorate | mg/kg | 0.005 | 0.005 | 0.0025 | 49 | 50.62 |
| Sodium | mg/100 g | 40 | 53.40 | 26.37 | 66 | 34.07 |
| Potassium | mg/100 g | 189.4 | 255.70 | 126.27 | 67 | 33.33 |
| Calcium | mg/100 g | 148.1 | 284.50 | 140.49 | 95 | 5.14 |
| Magnesium | mg/100 g | 11.6 | 21.00 | 10.37 | 89 | 10.60 |

TABLE 1C

Skim milk (SM) and skim milk concentrate (SMC) - NF results

| | Unit | SM 9.20% | SMC 19.35% | conc. recalculated Dry mass (DM) to 9.20% | remaining DM in % | reduced by DM in % |
|---|---|---|---|---|---|---|
| concentration | mg/kg | 0.002 | 0.000 | 0.000 | 100 | 0.00 |
| Perchlorate | mg/kg | 0.003 | 0.003 | 0.0014 | 48 | 52.45 |
| Sodium | mg/100 g | 40.5 | 53.40 | 25.39 | 63 | 37.31 |
| Potassium | mg/100 g | 180.4 | 239.10 | 113.68 | 63 | 36.98 |
| Calcium | mg/100 g | 150.8 | 315.00 | 149.77 | 99 | 0.68 |
| Magnesium | mg/100 g | 11.8 | 22.40 | 10.65 | 90 | 9.74 |

As depicted in Tables 1A-C and FIG. 4, when doubling the dry mass of the perchlorate containing starting material the perchlorate content remained unchanged, i.e. was reduced by about 50%. Further, as shown in Tables 1A-C, other ions like magnesium and calcium were largely retained by the nanofiltration membrane, i.e. their content in the retentate fraction is roughly doubled.

Example 2: Manufacture of Perchlorate Depleted Milk

In a further Example four types of nanofiltration membranes, NFS (TFC 100-250 Da), NFX (TFC 150-300 Da), NFW (TFC 300-500 Da) and NFG (TFC 600-800 Da) from Synder® Filtration (Vacaville, Canada) with different pore size spectra have been tested for the manufacture of perchlorate depleted milk from dairy raw materials. Membrane specifications are summarized in Table 2 below.
(Source: https://synderfiltration.com/nanofiltration/membranes/).
Starting from the initial dry mass, a reduction of the perchlorate of at least 45% to the initial content was achieved by doubling the raw material dry mass. The nanofiltration membranes have been defined by key figures typical for the industry, by the molecular weight cut off in Dalton (Da), the flux in gallons for square meters of membrane per day (GFD) and the rejection of lactose, magnesium sulphate and sodium chloride in percent.

TABLE 2

Specification of Synder ® Filtration Nanofiltration Membrane according to the manufacturer

| Model | Polymer | Approx. Molecular Weight Cutoff | Typical Operating Flux | Avg Lactose Rejection[1] | Avg MgSO4 Rejection[2] | Avg NaCl Rejection[3] |
|---|---|---|---|---|---|---|
| NFS | Propretary PA TFC | 100-250 Da | 30-40 GFD | 99.5% | 99.5% | 50.0% |
| NFX | Proprietary PA TFC | 150-300 Da | 20-25 GFD | 99.0% | 99.0% | 40.0% |
| NFW | Proprietary PA TFC | 300-500 Da | 45-50 GFD | 98.5% | 97.0% | 20.0% |
| NFG | Proprietary PA TFC | 600-800 Da | 55-60 GFD | 60.0% | 50.0% | 10.0% |

[1]Test Conditions: 2% Lactose solution at 110 PSI (760 kPa) operating pressure, 77° F. (25° C.)
[2]Test Conditions: 2,000 ppm MgSO4 Solution at 110 PSI (760 kPa) operating pressure, 77° F. (25° C.)
[3]Test Conditions 2,000 ppm NaCl Solution at 110 PSI (760 kPa) operating pressure, 77° F. (25° C.)

The nanofiltration membranes were used in pairs as spiral wound modules for the milk raw materials skim milk and whey. This resulted in a filtration area of 13.93 m² per test run. The membranes were conditioned according to the manufacturer's instructions before use. Specifically, before starting the experiments, the membranes were cleaned and conditioned. The cleaning was carried out with a chlorine-based cleaning agent at a temperature of 50° C. and for a period of 20 min. The membrane was then rinsed with reverse osmosis water. After the cleaning the membranes were conditioned with a 6% sodium chloride solution at 8° C. and an adjusted transmembrane pressure of 35 bar (5 bar under maximum pressure 40 bar) for a period of 6 hours. The stainless steel nanofiltration unit was equipped with a pair of each membranes with a module diameter of 3.8 inches. The perchlorate containing milk was pumped at a maximum pressure of 40 bar into the spiral wound modules to separate the perchlorate containing milk into perchlorate depleted retentate and a perchlorate containing permeate. In the test, 100 litres of perchlorate containing skim milk or whey were used per membrane. Starting from a minimum of 8% dry matter, values of up to 35% dry matter were achieved for the raw material milk. For the raw material whey, values of up to 22% dry matter were achieved, assuming a minimum of 5% dry matter. The following test parameters were taken into account: maximum pressure for milk 39 bar and for whey 28 bar, filtration time less than 1 hour and test temperature below 10° Celsius.

Manufacture Description Milk

Raw milk having a dry matter of about 12% to about 14% was stored at 4° C. Afterwards, raw milk was preheated at 50 to 60° C. and fat was separated at 50 to 60° C. and 4000 rpm to obtain perchlorate containing skim milk with a dry mass of about 8% to about 10% and a fat content of <0.1%. Perchlorate content was measured in each 100 kg of skimmed milk with a dry mass of 9%, and 22 to 27 ppb of perchlorate was detected. After perchlorate content evaluation, perchlorate containing skim milk was pasteurized at 72 to 75° C. for 15 to 30 sec, then cooled down below 10° C. and conducted to nanofiltration. 100 kg of pretreated skim milk was fed on a dairy plant manufactured by the company MMS (Membrane Systems, Switzerland) with a nanofiltration membrane (NFS, NFX, NFW, or NFG Synder® Filtration Nanofiltration membrane type) with a filtration area of 6,9677 m² per module. The nanofiltration unit was equipped with a pair of each nanofiltration membrane type stacked in parallel as described herein above. 100 kg skim milk were fed to the nanofiltration unit for maximum 1 hours at a maximum pressure of 40 bar and a temperature below 10° C., which led to the production of 50 kg skim milk concentrate with a dry mass of 18% and a perchlorate content of 16 to 21 ppb, respectively. The content of perchlorate, chlorate and bromide was analysed using the QuPPe-AO-Method (Quick Polar Pesticides Method) that involves extraction with acidified methanol and LC-MS/MS measurement. Other ions like magnesium, calcium, sodium or potassium were analyzed using ion chromatography. The respective results are summarized in Tables 3A-D and FIG. 5 below. Perchlorate containing permeate was discarded. The obtained perchlorate depleted retentate fraction (or skim milk concentrate) was stored at 4° C. and subsequently dried via spray drying to provide skim milk powder depleted of perchlorate or further manufactured to obtain a perchlorate depleted infant formula base.

TABLE 3A

Skim milk (SM) and skim milk concentrate (SMC) - Synder NFS 100-250 Da results

| | Unit | SM | SMC | conc. Recaculated | remaining | reduced |
|---|---|---|---|---|---|---|
| | | | | Dry mass (DM) in % | | |
| | | 9 | 18 | 9 | DM in % | DM in % |
| Perchlorate | mg/kg | 0.023 | 0.018 | 0.009 | 39 | 61 |
| Sodium | mg/kg | 335.120 | 565.520 | 282.760 | 84 | 16 |
| Potassium | mg/kg | 1.217.600 | 2009.600 | 1004.800 | 83 | 17 |
| Calcium | mg/kg | 1.025.600 | 2177.600 | 1088.800 | 106 | −6 |
| Magnesium | mg % | 93.224 | 193.304 | 96.652 | 104 | −4 |
| chlorate | mg/kg | 0.022 | 0.019 | 0.010 | 44 | 56 |
| bromide | mg/kg | 0.670 | 0.648 | 0.324 | 48 | 52 |
| protein | % | 3.800 | 7.599 | 3.800 | 100 | 0 |
| lactose | % | 4.917 | 10.173 | 5.086 | 103 | −3 |

TABLE 3B

Skim milk (SM) and skim milk concentrate (SMC) - Synder NFX 150-300 Da results

| | Unit | SM | SMC | conc. Recaculated | remaining | reduced |
|---|---|---|---|---|---|---|
| | | | | Dry mass (DM) in % | | |
| | | 9 | 18 | 9 | DM in % | DM in % |
| Perchlorate | mg/kg | 0.025 | 0.021 | 0.011 | 43 | 57 |
| Sodium | mg/kg | 354.118 | 514.348 | 257.174 | 73 | 27 |
| Potassium | mg/kg | 1314.706 | 2008.696 | 1004.348 | 76 | 24 |
| Calcium | mg/kg | 984.706 | 2078.261 | 1039.130 | 106 | 6 |
| Magnesium | mg % | 92.353 | 190.870 | 95.435 | 103 | −3 |
| chlorate | mg/kg | 0.020 | 0.019 | 0.010 | 48 | 53 |
| bromide | mg/kg | 0.698 | 0.640 | 0.320 | 46 | 54 |

TABLE 3B-continued

Skim milk (SM) and skim milk concentrate (SMC) - Synder NFX 150-300 Da results

|  | Unit | SM<br>9 | SMC<br>18 | conc.<br>Recaculated<br>Dry mass (DM) in %<br>9 | remaining<br>DM in % | reduced<br>DM in % |
|---|---|---|---|---|---|---|
| protein | % | 3.488 | 6.976 | 3.488 | 100 | 0 |
| lactose | % | 4.806 | 9.587 | 4.794 | 100 | 0 |

TABLE 3C

Skim milk (SM) and skim milk concentrate (SMC) - Synder NFW 300-500 Da results

|  | Unit | SM<br>9 | SMC<br>18 | conc.<br>Recaculated<br>Dry mass (DM) in %<br>9 | remaining<br>DM in % | reduced<br>DM in % |
|---|---|---|---|---|---|---|
| Perchlorate | mg/kg | 0.027 | 0.019 | 0.009 | 35 | 65 |
| Sodium | mg/kg | 380.000 | 461.818 | 230.909 | 61 | 39 |
| Potassium | mg/kg | 1700.000 | 2027.273 | 1013.636 | 60 | 40 |
| Calcium | mg/kg | 1200.000 | 2181.818 | 1090.909 | 91 | 9 |
| Magnesium | mg % | 130.000 | 211.818 | 105.909 | 81 | 19 |
| chlorate | mg/kg | 0.028 | 0.020 | 0.010 | 35 | 65 |
| bromide | mg/kg | 0.700 | 0.725 | 0.362 | 52 | 48 |
| protein | % | 3.426 | 6.852 | 3.426 | 100 | 0 |
| lactose | % | 3.600 | 8.836 | 4.418 | 123 | −23 |

TABLE 3D

Skim milk (SM) and skim milk concentrate (SMC) - Synder NFG 600-800 Da results

|  | Unit | SM<br>9 | SMC<br>18 | conc.<br>Recaculated<br>Dry mass (DM) in %<br>9 | remaining<br>DM in % | reduced<br>DM in % |
|---|---|---|---|---|---|---|
| Perchlorate | mg/kg | 0.022 | 0.016 | 0.008 | 37 | 63 |
| Sodium | mg/kg | 332.041 | 423.878 | 211.939 | 64 | 36 |
| Potassium | mg/kg | 1412.245 | 1963.265 | 981.633 | 70 | 30 |
| Calcium | mg/kg | 1028.571 | 2314.286 | 1157.143 | 113 | −13 |
| Magnesium | mg % | 102.245 | 203.265 | 101.633 | 99 | 1 |
| chlorate | mg/kg | 0.023 | 0.018 | 0.009 | 40 | 60 |
| bromide | mg/kg | 0.767 | 0.648 | 0.324 | 42 | 58 |
| protein | % | 3.882 | 7.765 | 3.882 | 100 | 0 |
| lactose | % | 4.380 | 7.961 | 3.981 | 91 | 9 |

Manufacture Description Whey

Perchlorate containing whey with a dry mass of about 6% and a fat content of <0.1% was stored at 4° C. Perchlorate content was measured in each 100 kg of whey with a dry mass of 6%, and 22 to 34 ppb of perchlorate was detected. After perchlorate content evaluation, perchlorate containing whey was conducted to nanofiltration. 100 kg of pretreated whey was fed on a dairy plant manufactured by the company MMS with a nanofiltration membrane (NFS, NFX, NFW, or NFG Synder® Filtration Nanofiltration membrane type) with a filtration area of 6,9677 m² per module. The nanofiltration unit was equipped with a pair of each nanofiltration membrane type stacked in parallel. 100 kg whey were fed to the nanofiltration unit for maximum 30 minutes at a maximum pressure of 30 bar and a temperature below 10° C., which led to the production of 50 kg whey concentrate with a dry mass of 12% and a perchlorate content of 16 to 26 ppb, respectively. The content of perchlorate, chlorate and bromide was analysed using the QuPPe-AO-Method (Quick Polar Pesticides Method) that involves extraction with acidified methanol and LC-MS/MS measurement. Other ions like magnesium, calcium, sodium or potassium were analyzed using ion chromatography. The respective results are summarized in Tables 3E-H and FIG. 6. Perchlorate containing permeate was discarded. The obtained perchlorate depleted retentate fraction (or whey concentrate) was stored at 4° C. and subsequently dried via spray drying to provide whey powder depleted of perchlorate or further manufactured to obtain a perchlorate depleted infant formula base.

TABLE 3E

Whey (W) and whey concentrate (WC) - Synder NFS 100-250 Da results

|  | Unit | W<br>6 | WC<br>12 | conc.<br>Recaculated<br>Dry mass (DM) in %<br>6 | remaining<br>DM in % | reduced<br>DM in % |
|---|---|---|---|---|---|---|
| Perchlorate | mg/kg | 0.034 | 0.023 | 0.012 | 34 | 66 |
| Sodium | mg/kg | 335.480 | 639.589 | 319.795 | 95 | 5 |
| Potassium | mg/kg | 1115.069 | 2101.370 | 1050.685 | 94 | 6 |
| Calcium | mg/kg | 299.863 | 727.260 | 363.630 | 121 | −21 |
| Magnesium | mg % | 66.986 | 169.726 | 84.863 | 127 | −27 |
| chlorate | mg/kg | 0.034 | 0.027 | 0.013 | 39 | 61 |
| bromide | mg/kg | 1.171 | 0.925 | 0.462 | 39 | 61 |
| protein | % | 1.094 | 2.187 | 1.094 | 100 | 0 |
| lactose | % | 4.814 | 10.074 | 5.037 | 105 | −5 |

TABLE 3F

Whey (W) and whey concentrate (WC) - Synder NFX 150-300 Da results

|  | Unit | W<br>6 | WC<br>12 | conc.<br>Recaculated<br>Dry mass (DM) in %<br>6 | remaining<br>DM in % | reduced<br>DM in % |
|---|---|---|---|---|---|---|
| Perchlorate | mg/kg | 0.026 | 0.021 | 0.011 | 41 | 59 |
| Sodium | mg/kg | 330.000 | 488.088 | 244.044 | 74 | 26 |
| Potassium | mg/kg | 1250.000 | 1808.824 | 904.412 | 72 | 28 |
| Calcium | mg/kg | 323.333 | 615.000 | 307.500 | 95 | 5 |
| Magnesium | mg % | 69.000 | 133.118 | 66.559 | 96 | 4 |
| chlorate | mg/kg | 0.030 | 0.026 | 0.013 | 43 | 57 |
| bromide | mg/kg | 1.700 | 1.546 | 0.773 | 45 | 55 |
| protein | % | 0.611 | 1.223 | 0.611 | 100 | 0 |
| lactose | % | 4.783 | 9.582 | 4.791 | 100 | 0 |

TABLE 3G

Whey (W) and whey concentrate (WC) - Synder NFW 300-500 Da results

|  | Unit | W<br>6 | WC<br>12 | conc.<br>Recaculated<br>Dry mass (DM) in %<br>6 | remaining<br>DM in % | reduced<br>DM in % |
|---|---|---|---|---|---|---|
| Perchlorate | mg/kg | 0.022 | 0.026 | 0.013 | 59 | 41 |
| Sodium | mg/kg | 240.000 | 460.606 | 230.303 | 96 | 4 |
| Potassium | mg/kg | 900.000 | 1742.424 | 871.212 | 97 | 3 |
| Calcium | mg/kg | 216.000 | 560.000 | 280.000 | 130 | −30 |
| Magnesium | mg % | 50.400 | 136.121 | 68.061 | 135 | −35 |
| chlorate | mg/kg | 0.102 | 0.122 | 0.061 | 60 | 40 |
| bromide | mg/kg | 0.576 | 0.790 | 0.395 | 69 | 31 |
| protein | % | 1.148 | 2.297 | 1.148 | 100 | 0 |
| lactose | % | 2.640 | 7.188 | 3.594 | 136 | −36 |

TABLE 3H

Whey (W) and whey concentrate (WC) - Synder NFG 600-800 Da results

|  | Unit | W<br>6 | WC<br>12 | conc.<br>Recaculated<br>Dry mass (DM) in %<br>6 | remaining<br>DM in % | reduced<br>DM in % |
|---|---|---|---|---|---|---|
| Perchlorate | mg/kg | 0.022 | 0.016 | 0.008 | 37 | 63 |
| Sodium | mg/kg | 256.000 | 495.652 | 247.826 | 97 | 3 |
| Potassium | mg/kg | 1040.000 | 1956.522 | 978.261 | 94 | 6 |
| Calcium | mg/kg | 248.000 | 691.304 | 345.652 | 139 | −39 |
| Magnesium | mg % | 59.200 | 156.522 | 78.261 | 132 | −32 |

TABLE 3H-continued

Whey (W) and whey concentrate (WC) - Synder NFG 600-800 Da results

|  | Unit | W<br>6 | WC<br>12 | conc.<br>Recaculated<br>Dry mass (DM) in %<br>6 | remaining<br>DM in % | reduced<br>DM in % |
|---|---|---|---|---|---|---|
| chlorate | mg/kg | 0.047 | 0.050 | 0.025 | 53 | 47 |
| bromide | mg/kg | 1.200 | 1.957 | 0.978 | 82 | 18 |
| protein | % | 1.930 | 3.861 | 1.930 | 100 | 0 |
| lactose | % | 1.840 | 6.000 | 3.000 | 163 | −63 |

Hence, contrary to the expectations based on results with water, perchlorate can be efficiently depleted from perchlorate containing milk or milk assumed to contain perchlorate and is not rejected from the nanofiltration membrane, while other salts are surprisingly retained in high percentages (see Tables 1 and 3). This finding is very surprising, since perchlorate has the largest atomic volume per mole (74.7 qcm/mol) and the largest molecular weight (99.449 dalton) of all salts in the milk (see Table 4).

TABLE 4

Atomic volume and molecular weight of anions and cations typically comprised in milk

| Molecular weight (MW)<br>Anions | Atomic volume as<br>Anions qcm/mol |
|---|---|
| $ClO_4^-$ 99.449 | 74.7 |
| $Cl^-$ 35.453 | 19.7 |
| $OH^-$ 17.0069 | 28.1 |
| $NO_3^-$ 62.004 | 59.3 |
| $SO_4^{2-}$ 96.062 | 71.5 |
| $ClO_3^-$ 83.45 | 60.7 |

| Molecular weight (MW)<br>Cations | Atomic volume as<br>Cations qcm/mol |
|---|---|
| $Ca^{2+}$ 40.078 | 29.9 |
| $Mg^{2+}$ 24.305 | 14.0 |
| $Cu^{2+}$ 63.546 | 7.1 |
| $K^+$ 39.098 | 45.3 |
| $Na^+$ 22.99 | 23.7 |
| $H^+$ 1.0079 | 14.1 |

Example 3: Manufacture of the Infant Formula Base

Figure 2:
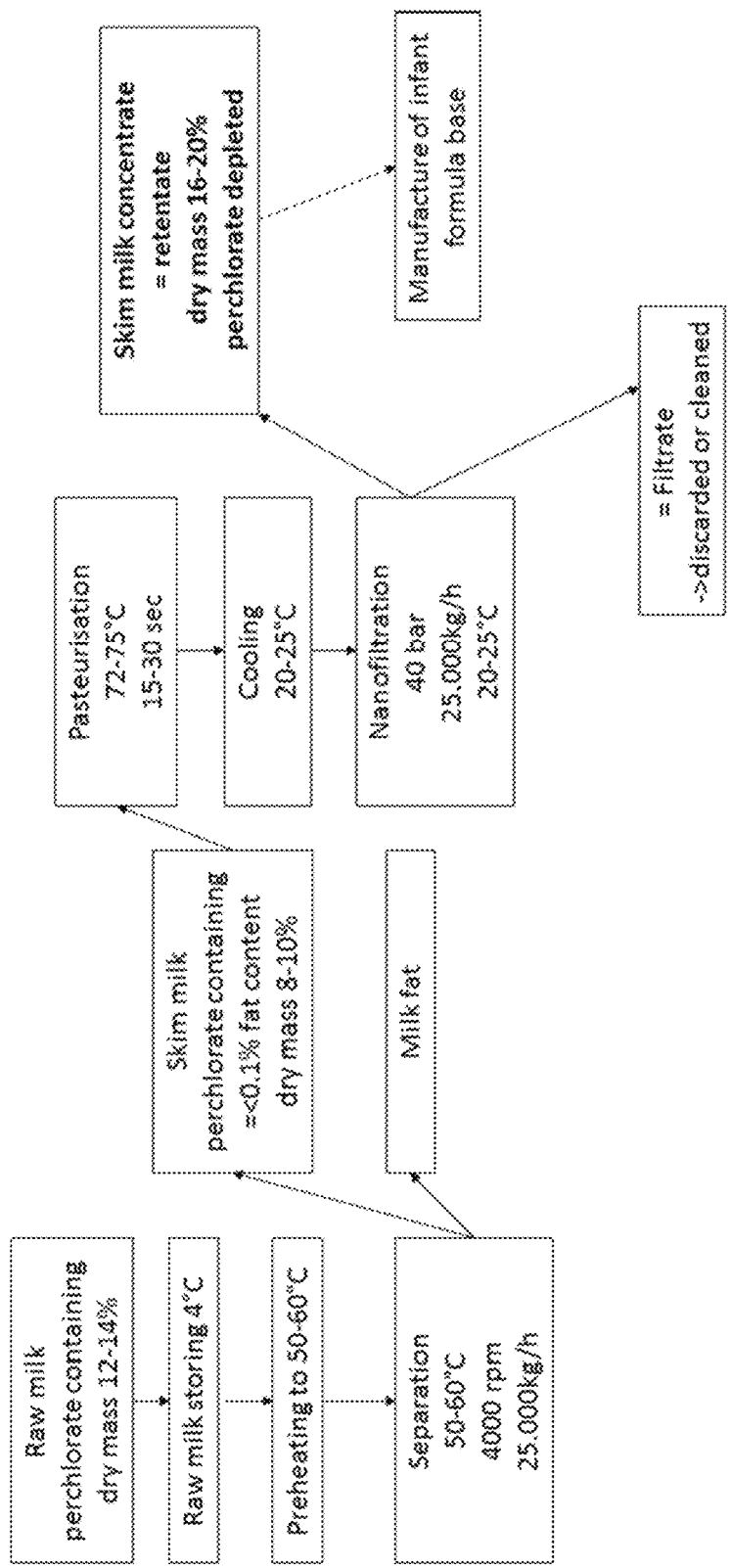
FIG. 2 shows a detailed overview of the workflow applicable for the manufacture of perchlorate depleted skim milk.
Figure 7:
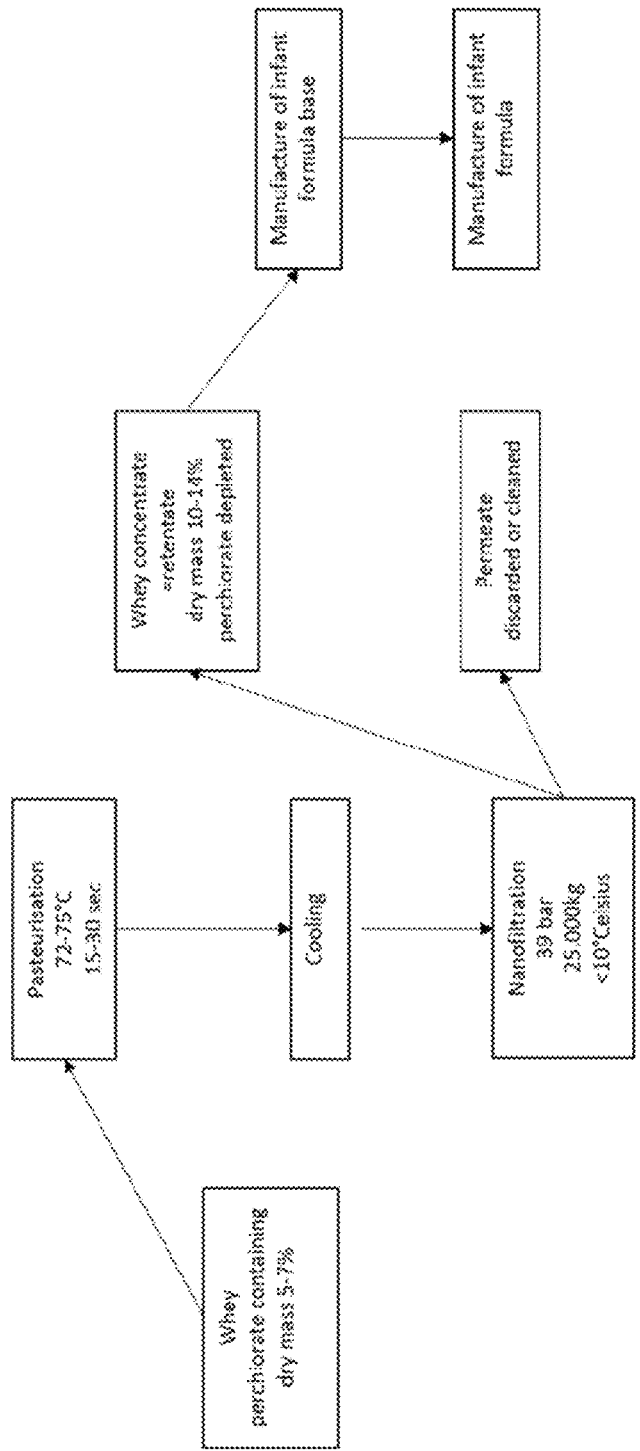
FIG. 7 shows a general schematic overview of the workflow applicable for the manufacture of perchlorate depleted whey.

The infant formula base of the invention was manufactured from the perchlorate depleted retentate fraction (or skim milk concentrate) obtained according to Examples 1 and 2 as depicted in FIG. 2. In particular, skim milk concentrate having a dry mass of about 16 to about 20% or skim milk having a dry mass of about 8 to about 10% was optionally further supplemented and spray dried to obtain an infant formula base useful to produce an infant formula (see FIG. 2). Similarly, the infant formula base of the invention was manufactured from the perchlorate depleted whey concentrate obtained according to Example 2 as depicted in FIG. 7. In particular, whey concentrate having a dry mass of about 10% to about 14% or whey having a dry mass of about 5% to about 10% was optionally further supplemented and spray dried to obtain an infant formula base useful to produce an infant formula (see FIG. 7).

Example 4: Manufacture of an Infant Formula from the Infant Formula Base

For the manufacture of an infant formula, an infant formula base obtained according to Example 3 was further admixed with the following ingredients: whey powder, lactose, mineral and trace elements, vitamins, fat mixtures, special protein compositions, fatty acids, starch and/or amino acids. After admixing, the mixture undergoes spray drying. Exemplary infant formulae manufactured according to the present invention are depicted in Tables 5A-E below.

TABLE 5A

| Per | | 100 gr<br>powder | 100 ml<br>ready to<br>drink | 100<br>kcal |
|---|---|---|---|---|
| Energy | kJ | 2.134 | 277 | |
|  | kcal | 510 | 66 | |
| Fat, of which: | g | 27.0 | 3.5 | 5.3 |
| Saturated fatty acid | g | 8.9 | 1.2 | 1.8 |
| Simple unsaturated Fatty acids | g | 12.3 | 1.6 | 2.4 |
| Complex unsaturated Fatty acids | g | 5.8 | 0.7 | 1.1 |
| Carbohydrates | g | 56.1 | 7.3 | 11.1 |
| of which: Sugar[1] | g | 55.4 | 7.2 | 10.9 |
| Fibers | g | 2.3 | 0.3 | 0.5 |
| Proteins | g | 9.6 | 1.25 | 1.89 |
| Salt[2] | g | 0.38 | 0.05 | 0.08 |
| Sodium | g | 0.15 | 0.02 | 0.03 |
| Potassium | mg | 535 | 70 | 106.1 |
| Chloride | mg | 345 | 45 | 68.2 |
| Calcium | mg | 385 | 50 | 75.8 |
| Phosphor | mg | 210 | 27 | 40.9 |
| Magnesium | mg | 38 | 5.0 | 7.6 |
| iron | mg | 4.0 | 0.5 | 0.8 |
| Zinc | mg | 4.0 | 0.5 | 0.8 |
| Copper | mg | 0.346 | 0.045 | 0.068 |
| Iodine | μg | 115 | 15 | 22.7 |
| Selenium | μg | 10 | 1.3 | 2.0 |
| Manganese | mg | 0.0580 | 0.008 | 0.011 |
| fluoride | mg | <0.040 | <0.005 | <0.008 |
| Vitamin A | μg | 540 | 70 | 106.1 |
| Vitamin D | μg | 9.0 | 1.6 | 2.4 |
| Vitamin E | mg | 6.6 | 0.7 | 1.1 |
| Vitamin K | μg | 38 | 7.3 | 11.1 |
| Vitamin C | mg | 78 | 7.2 | 10.9 |
| Vitamin $B_1$ | mg | 0.45 | 0.3 | 0.5 |
| Vitamin $B_2$ | mg | 0.80 | 0.80 | 1.89 |
| Niacin | mg | 3.1 | 3.1 | 0.08 |
| Vitamin $B_6$ | mg | 0.3 | 0.02 | 0.03 |
| Folic acid | μg | 78 | 70 | 106.1 |
| Vitamin $B_{12}$ | μg | 1.15 | 45 | 68.2 |
| Panthotenic acid | mg | 3.8 | 50 | 75.8 |
| Biotin | μg | 12 | 27 | 40.9 |
| Choline | μg | 85 | 5.0 | 7.6 |
| Inositol | mg | 30 | 0.5 | 0.8 |

TABLE 5A-continued

| Per | | 100 gr powder | 100 ml ready to drink | 100 kcal |
|---|---|---|---|---|
| Further Values | | | | |
| Lactose | g | 54.6 | 7.1 | 10.8 |
| LCP[3] (Omega-3 and-6) | mg | 150 | 20 | 30.3 |
| Galatto-oligosaccharide | g | 0.3 | 0.3 | 0.5 |

[1]Except Lactose. the natural milk sugar
[2]calculated from the natural content of the ingredients
[3]LCP (Omega-3 and-6)

TABLE 5B

| Per | | 100 gr powder | 100 ml ready to drink | 100 kcal |
|---|---|---|---|---|
| Energy | kJ | 2.090 | 288 | |
| | kcal | 500 | 69 | |
| Fat, of which: | g | 25.1 | 3.5 | 5.1 |
| Saturated fatty acid | g | 8.3 | 1.2 | 1.7 |
| Simple unsaturated Fatty acids | g | 11.7 | 1.6 | 2.3 |
| Complex unsaturated Fatty acids | g | 5.1 | 0.7 | 1.0 |
| Carbohydrates | g | 56.7 | 7.8 | 11.3 |
| of which: Sugar[1] | g | 47.2 | 6.5 | 9.4 |
| Starch | g | 9.0 | 1.2 | 1.7 |
| Fibers | g | 2.2 | 0.3 | 0.4 |
| Proteins | g | 10.6 | 1.5 | 2.1 |
| Salt[2] | g | 0.38 | 0.05 | 0.07 |
| Sodium | g | 0.15 | 0.02 | 0.03 |
| Potassium | mg | 605 | 83 | 115.7 |
| Chloride | mg | 314 | 43 | 57.1 |
| Calcium | mg | 399 | 55 | 115.7 |
| Phosphor | mg | 255 | 35 | 57.1 |
| Magnesium | mg | 40 | 5.5 | 8.9 |
| iron | mg | 5.3 | 0.7 | 1.4 |
| Zinc | mg | 3.8 | 0.5 | 0.7 |
| Copper | mg | 0.290 | 0.040 | 0.057 |
| Iodine | µg | 75 | 10 | 18.6 |
| Selenium | µg | 11 | 1.3 | 2.3 |
| Manganese | mg | 0.0540 | 0.008 | 0.011 |
| fluoride | mg | <0.040 | <0.005 | <0.010 |
| Vitamin A | µg | 510 | 70 | 101.4 |
| Vitamin D | µg | 9.0 | 1.2 | 1.7 |
| Vitamin E | mg | 5.4 | 0.7 | 1.0 |
| Vitamin K | µg | 36 | 5.0 | 7.2 |
| Vitamin C | mg | 73 | 10 | 14.5 |
| Vitamin $B_1$ | mg | 0.44 | 0.06 | 0.09 |
| Vitamin $B_2$ | mg | 0.92 | 0.13 | 0.19 |
| Niacin | mg | 2.9 | 0.40 | 0.58 |
| Vitamin $B_6$ | mg | 029 | 0.04 | 0.06 |
| Folic acid | µg | 75 | 10 | 14.5 |
| Vitamin $B_{12}$ | µg | 1.12 | 45 | 0.22 |
| Panthotenic acid | mg | 3.6 | 0.50 | 0.72 |
| Biotin | µg | 12 | 1.7 | 2.5 |
| Carnitin | µg | 14 | 1.9 | 2.8 |
| Choline | µg | 90 | 12 | 17.4 |
| Inositol | mg | 50 | 6.9 | 10 |
| Further Values | | | | |
| Lactose | g | 46.0 | 6.4 | 9.3 |
| LCP[3] (Omega-3 and-6) | mg | 116 | 16 | 23.2 |
| Galatto-oligosaccharide | g | 2.2 | 0.3 | 0.4 |

[1]Except Lactose, the natural milk sugar
[2]calculated from the natural content of the ingredients
[3]LCP (Omega-3 and-6)

TABLE 5C

| Per | | 100 gr powder | 100 ml ready to drink | 100 kcal |
|---|---|---|---|---|
| Energy | kJ | 2.064 | 291 | |
| | kcal | 493 | 70 | |
| Fat, of which: | g | 25 | 3.5 | 5.0 |
| Saturated fatty acid | g | 8.4 | 1.2 | 1.7 |
| Simple unsaturated Fatty acids | g | 11.7 | 1.6 | 2.3 |
| Complex unsaturated Fatty acids | g | 4.9 | 0.7 | 1.0 |
| Carbohydrates | g | 55.1 | 7.8 | 11.1 |
| of which: Sugar[1] | g | 45.5 | 6.4 | 9.1 |
| Starch | g | 8.2 | 1.2 | 1.7 |
| Fibers | g | 3.0 | 0.4 | 0.6 |
| Proteins | g | 10.5 | 1.5 | 2.1 |
| Salt[2] | g | 0.4 | 0.05 | 0.07 |
| Sodium | g | 0.16 | 0.02 | 0.03 |
| Potassium | mg | 575 | 81 | 115.7 |
| Chloride | mg | 285 | 40 | 57.1 |
| Calcium | mg | 500 | 71 | 101.4 |
| Phosphor | mg | 305 | 43 | 61.4 |
| Magnesium | mg | 44 | 6.2 | 8.9 |
| iron | mg | 6.8 | 1.0 | 1.4 |
| Zinc | mg | 3.7 | 0.5 | 0.7 |
| Copper | mg | 0.285 | 0.040 | 0.057 |
| Iodine | µg | 92 | 13 | 18.6 |
| Selenium | µg | 11 | 1.6 | 2.3 |
| Manganese | mg | 0.0540 | 0.008 | 0.011 |
| fluoride | mg | <0.070 | <0.010 | <0.014 |
| Vitamin A | µg | 495 | 70 | 100 |
| Vitamin D | µg | 8.3 | 1.2 | 1.7 |
| Vitamin E | mg | 6.9 | 1.0 | 1.4 |
| Vitamin K | µg | 36 | 5.1 | 7.3 |
| Vitamin C | mg | 71 | 10 | 14.3 |
| Vitamin $B_1$ | mg | 0.43 | 0.06 | 0.09 |
| Vitamin $B_2$ | mg | 0.9 | 0.013 | 0.19 |
| Niacin | mg | 4.3 | 0.60 | 0.86 |
| Vitamin $B_6$ | mg | 0.29 | 0.04 | 0.06 |
| Folic acid | µg | 74 | 10 | 14.3 |
| Vitamin $B_{12}$ | µg | 1.07 | 0.15 | 0.21 |
| Panthotenic acid | mg | 3.6 | 0.50 | 0.71 |
| Biotin | µg | 11 | 1.6 | 2.3 |
| Further Values | | | | |
| Lactose | g | 44.4 | 6.3 | 9.0 |
| Linoleic acid (omega-6) | g | 4.4 | 0.6 | 0.9 |
| Linoleic acid (omega-3) | g | 0.52 | 0.07 | 0.1 |
| Galatto-oligosaccharide | g | 3.0 | 0.4 | 0.6 |

[1]Except Lactose, the natural milk sugar
[2]calculated from the natural content of the ingredients

TABLE 5D

| Per | | 100 gr powder | 100 ml ready to drink | 100 kcal |
|---|---|---|---|---|
| Energy | kJ | 2.064 | 291 | |
| | kcal | 493 | 70 | |
| Fat, of which: | g | 25 | 3.5 | 5.0 |
| Saturated fatty acid | g | 8.4 | 1.2 | 1.7 |
| Simple unsaturated Fatty acids | g | 11.7 | 1.6 | 2.3 |
| Complex unsaturated Fatty acids | g | 4.9 | 0.7 | 1.0 |
| Carbohydrates | g | 55.1 | 7.8 | 11.1 |
| of which: Sugar[1] | g | 45.5 | 6.4 | 9.1 |
| Starch | g | 8.2 | 1.2 | 1.7 |
| Fibers | g | 3.0 | 0.4 | 0.6 |
| Proteins | g | 10.5 | 1.5 | 2.1 |
| Salt[2] | g | 0.4 | 0.05 | 0.07 |
| Sodium | g | 0.16 | 0.02 | 0.03 |

TABLE 5D-continued

| Per | | 100 gr powder | 100 ml ready to drink | 100 kcal |
|---|---|---|---|---|
| Potassium | mg | 575 | 81 | 115.7 |
| Chloride | mg | 285 | 40 | 57.1 |
| Calcium | mg | 500 | 71 | 101.4 |
| Phosphor | mg | 305 | 43 | 61.4 |
| Magnesium | mg | 44 | 6.2 | 8.9 |
| iron | mg | 6.8 | 1.0 | 1.4 |
| Zinc | mg | 3.7 | 0.5 | 0.7 |
| Copper | mg | 0.285 | 0.040 | 0.057 |
| Iodine | µg | 92 | 13 | 18.6 |
| Selenium | µg | 11 | 1.6 | 2.3 |
| Manganese | mg | 0.0540 | 0.008 | 0.011 |
| fluoride | mg | <0.070 | <0.010 | <0.014 |
| Vitamin A | µg | 495 | 70 | 100 |
| Vitamin D | µg | 8.3 | 1.2 | 1.7 |
| Vitamin E | mg | 6.9 | 1.0 | 1.4 |
| Vitamin K | µg | 36 | 5.1 | 7.3 |
| Vitamin C | mg | 71 | 10 | 14.3 |
| Vitamin B$_1$ | mg | 0.43 | 0.06 | 0.09 |
| Vitamin B$_2$ | mg | 0.9 | 0.013 | 0.19 |
| Niacin | mg | 4.3 | 0.60 | 0.86 |
| Vitamin B$_6$ | mg | 0.29 | 0.04 | 0.06 |
| Folic acid | µg | 74 | 10 | 14.3 |
| Vitamin B$_{12}$ | µg | 1.07 | 0.15 | 0.21 |
| Panthotenic acid | mg | 3.6 | 0.50 | 0.71 |
| Biotin | µg | 11 | 1.6 | 2.3 |
| Further Values | | | | |
| Lactose | g | 44.4 | 6.3 | 9.0 |
| Linoleic acid (omega-6) | g | 4.4 | 0.6 | 0.9 |
| Linoleic acid (omega-3) | g | 0.52 | 0.07 | 0.1 |
| Galatto-oligosaccharide | g | 3.0 | 0.4 | 0.6 |

[1]Except Lactose, the natural milk sugar
[2]calculated from the natural content of the ingredients

TABLE 5E

| Per | | 100 gr powder | 100 ml ready to drink | 100 kcal |
|---|---|---|---|---|
| Energy | kJ | 2.064 | 291 | |
| | kcal | 493 | 70 | |
| Fat, of which: | g | 25 | 3.5 | 5.0 |
| Saturated fatty acid | g | 8.4 | 1.2 | 1.7 |
| Simple unsaturated Fatty acids | g | 11.7 | 1.6 | 2.3 |
| Complex unsaturated Fatty acids | g | 4.9 | 0.7 | 1.0 |
| Carbohydrates | g | 55.0 | 7.8 | 11.1 |
| of which: Sugar[1] | g | 43.5 | 6.1 | 8.7 |
| Starch | g | 9.9 | 1.4 | 2.0 |
| Fibers | g | 3.0 | 0.4 | 0.6 |
| Proteins | g | 10.6 | 1.5 | 2.1 |
| Salt[2] | g | 0.38 | 0.05 | 0.07 |
| Sodium | g | 0.15 | 0.02 | 0.03 |
| Potassium | mg | 575 | 81 | 115.7 |
| Chloride | mg | 315 | 44 | 62.9 |
| Calcium | mg | 520 | 73 | 104.3 |
| Phosphor | mg | 305 | 43 | 61.4 |
| Magnesium | mg | 43 | 6.1 | 8.7 |
| iron | mg | 6.9 | 1.0 | 1.4 |
| Zinc | mg | 3.8 | 0.5 | 0.7 |
| Copper | mg | 0.285 | 0.040 | 0.057 |
| Iodine | µg | 90 | 13 | 18.6 |
| Selenium | µg | 11 | 1.6 | 2.3 |
| Manganese | mg | 0.055 | 0.008 | 0.011 |
| fluoride | mg | <0.070 | <0.010 | <0.015 |
| Vitamin A | µg | 495 | 70 | 100 |
| Vitamin D | µg | 8.2 | 1.2 | 1.7 |
| Vitamin E | mg | 6.9 | 1.0 | 1.4 |
| Vitamin K | µg | 36 | 5.1 | 7.3 |
| Vitamin C | mg | 70 | 10 | 14.3 |
| Vitamin B$_1$ | mg | 0.43 | 0.06 | 0.09 |
| Vitamin B$_2$ | mg | 0.82 | 0.012 | 0.17 |
| Niacin | mg | 4.3 | 0.60 | 0.86 |
| Vitamin B$_6$ | mg | 0.28 | 0.04 | 0.06 |
| Folic acid | µg | 74 | 10 | 14.3 |
| Vitamin B$_{12}$ | µg | 1.05 | 0.15 | 0.21 |
| Panthotenic acid | mg | 3.6 | 0.50 | 0.71 |
| Biotin | µg | 11 | 1.6 | 2.3 |
| Further Values | | | | |
| Lactose | g | 42.3 | 6.0 | 8.6 |
| Linoleic acid (omega-6) | g | 4.4 | 0.6 | 0.9 |
| Linoleic acid (omega-3) | g | 0.52 | 0.07 | 0.1 |
| Galatto-oligosaccharide | g | 3.0 | 0.4 | 0.6 |

[1]Except Lactose, the natural milk sugar
[2]calculated from the natural content of the ingredients

The invention claimed is:

1. A process for the manufacture of a perchlorate depleted milk, comprising the steps of:
   a) subjecting perchlorate containing milk to a nanofiltration step to obtain a perchlorate depleted retentate fraction and a perchlorate containing permeate fraction of said milk, and
   b) evaluating a perchlorate content in said retentate fraction and/or said permeate fraction,
   wherein the nanofiltration step makes use of a nanofiltration membrane that has a molecular weight cut-off between 100 and 1000 Daltons.

2. The process of claim 1, wherein the perchlorate containing milk contains 2 ppb or more than 2 ppb perchlorate when a dry mass of the milk is between about 5% and about 13%.

3. The process of claim 1, wherein the nanofiltration membrane has a molecular weight cut-off of about or below 500 Daltons.

4. The process of claim 1, wherein the nanofiltration membrane is characterized by lactose and protein rejection.

5. The process of claim 1, wherein the nanofiltration membrane is negatively charged.

6. The process of claim 1, wherein the nanofiltration membrane is made out of polyamide.

7. The process of claim 1, wherein the nanofiltration membrane is characterized by magnesium rejection by at least 80 and/or calcium rejection by at least 90%.

8. The process of claim 1, wherein the nanofiltration membrane is characterized in that it depletes at least 40% of contained chlorate and/or at least 30% of contained bromide.

9. The process of claim 1, wherein the perchlorate containing milk is organic milk.

10. The process of claim 1, wherein the perchlorate containing milk is skim milk or whey.

11. The process of claim 1, wherein the nanofiltration membrane depletes at least 40% of contained perchlorate by the nanofiltration.

12. The process of claim 1, wherein the perchlorate containing milk contains 2 ppb or more than 2 ppb chlorate and/or 2 ppb or more than 2 ppb bromide when a dry mass of the milk is between about 5% and about 13%.

13. The process of claim 1, wherein the perchlorate depleted retentate fraction obtained in the step (a) is contacted with a perchlorate free solvent and subjected to a further nanofiltration step.

14. The process of claim 13, wherein contacting with the perchlorate free solvent and subjecting to the further nanofiltration step is repeated.

15. The process of claim 1, wherein the perchlorate depleted retentate fraction of said milk comprises less than 2 ppb perchlorate when a dry mass of the milk is between about 5% and about 13%.

16. The process of claim 1, further comprising: formulating said perchlorate depleted retentate fraction of said milk into a milk-based infant formula.

17. The process of claim 16, wherein the perchlorate depleted retentate fraction of said milk contains less than 2 ppb perchlorate when a dry mass of the milk is between about 5% and about 13%.

18. The process of claim 16, wherein said milk-based infant formula is spray dried or processed to powder.

19. The process of claim 1, further comprising: composing an infant formula base from the perchlorate depleted retentate fraction of claim 1.

\* \* \* \* \*